United States Patent
Mori et al.

(10) Patent No.: US 10,280,980 B2
(45) Date of Patent: May 7, 2019

(54) COOLING STRUCTURE FOR BEARING DEVICE

(71) Applicant: NTN CORPORATION, Osaka (JP)

(72) Inventors: Masatsugu Mori, Kuwana (JP); Mamoru Mizutani, Kuwana (JP); Yuushi Onda, Kuwana (JP); Kenji Tamada, Kuwana (JP); Yasuyoshi Hayashi, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/342,279

(22) Filed: Nov. 3, 2016

(65) Prior Publication Data
US 2017/0051790 A1   Feb. 23, 2017

Related U.S. Application Data

(63) Continuation of application No. 14/430,464, filed as application No. PCT/JP2013/075223 on Sep. 19, 2013, now Pat. No. 9,541,137.

(30) Foreign Application Priority Data

Sep. 24, 2012  (JP) ................................. 2012-209135
Sep. 24, 2012  (JP) ................................. 2012-209136

(Continued)

(51) Int. Cl.
*F16C 37/00*   (2006.01)
*F16C 33/66*   (2006.01)
(Continued)

(52) U.S. Cl.
CPC .......... *F16C 37/007* (2013.01); *B23Q 11/123* (2013.01); *F16C 19/525* (2013.01);
(Continued)

(58) Field of Classification Search
CPC ........ F16C 37/007; F16C 19/02; F16C 19/04; F16C 19/08; F16C 19/18;
(Continued)

(56) References Cited

U.S. PATENT DOCUMENTS 3,149,890 A   9/1964  Selby
3,885,842 A   5/1975  Furutsu
(Continued)

FOREIGN PATENT DOCUMENTS

DE   2703749 A1   8/1978
GB   2051971 A    1/1981
(Continued)

OTHER PUBLICATIONS

Machine Translation of JP 2006-183847 (Year: 2006).*
(Continued)

*Primary Examiner* — Alan B Waits

(57) ABSTRACT

A bearing device has rolling bearings each having an inner ring mounted on a main shaft and an outer ring; an inner ring spacer interposed between the inner rings of the neighboring rolling bearings and mounted on the main shaft; an outer ring spacer interposed between the outer rings of the neighboring rolling bearings; and a cooling structure. The cooling structure includes a nozzle provided in the outer ring spacer to supply a cooling fluid to the rolling bearings by blowing the cooling fluid to an outer peripheral surface of the inner ring spacer. The nozzle has a discharge port side that is inclined forwardly with respect to a direction of rotation of the main shaft. The outer peripheral surface of the inner ring spacer is shaped to guide the cooling fluid, discharged from the nozzle, towards the neighboring rolling bearings on both sides.

5 Claims, 59 Drawing Sheets

(30) Foreign Application Priority Data

| Sep. 24, 2012 | (JP) | 2012-209137 |
|---|---|---|
| Sep. 24, 2012 | (JP) | 2012-209138 |
| Sep. 24, 2012 | (JP) | 2012-209139 |

(51) Int. Cl.
| F16C 19/54 | (2006.01) |
|---|---|
| B23Q 11/12 | (2006.01) |
| F16C 19/52 | (2006.01) |
| F16C 33/76 | (2006.01) |
| F16C 19/16 | (2006.01) |
| F16C 19/26 | (2006.01) |

(52) U.S. Cl.
CPC .......... *F16C 19/546* (2013.01); *F16C 19/548* (2013.01); *F16C 33/6659* (2013.01); *F16C 33/6662* (2013.01); *F16C 33/76* (2013.01); *F16C 19/163* (2013.01); *F16C 19/26* (2013.01); *F16C 33/6681* (2013.01); *F16C 2322/39* (2013.01)

(58) Field of Classification Search
CPC ..... F16C 19/181–19/184; F16C 19/525; F16C 19/546; F16C 19/548; F16C 33/6659; F16C 33/6662; F16C 33/667; F16C 33/6681; F16C 33/76; F16C 33/1045; F16C 33/105; F16C 33/66; F16C 33/6637; F16C 33/6674

See application file for complete search history.

(56) References Cited

U.S. PATENT DOCUMENTS

| 5,009,523 | A | 4/1991 | Folger |
|---|---|---|---|
| 5,009,524 | A | 4/1991 | Dittenhoefer |
| 5,848,845 | A | 12/1998 | Jeng |
| 6,176,349 | B1 | 1/2001 | Kishi |
| 6,261,003 | B1 | 7/2001 | Dusserre-Telmon |
| 6,357,922 | B1 | 3/2002 | Harbottle |
| 6,428,212 | B1 | 8/2002 | Tanaka |
| 6,443,623 | B2 | 9/2002 | Sugita |
| 6,733,181 | B2 | 5/2004 | Koiwa et al. |
| 6,851,863 | B2 | 2/2005 | Yokota |
| 7,374,019 | B2 | 5/2008 | Kosugi et al. |
| 7,500,311 | B2 | 3/2009 | Shimomura |
| 7,594,757 | B2 | 9/2009 | Verhaegen |
| 7,832,937 | B2 | 11/2010 | Suzuki |
| 8,336,210 | B2 | 12/2012 | Takiuchi |
| 2002/0009245 | A1 | 1/2002 | Sugita et al. |
| 2002/0102040 | A1 | 8/2002 | Koiwa et al. |
| 2004/0213494 | A1 | 10/2004 | Shimomura |
| 2005/0252722 | A1 | 11/2005 | Kosugi et al. |
| 2007/0071382 | A1 | 3/2007 | Suzuki |
| 2014/0217205 | A1 | 8/2014 | Kobayashi et al. |

FOREIGN PATENT DOCUMENTS

| JP | 58-7925 | | 7/1956 | |
|---|---|---|---|---|
| JP | 48-012429 | | 6/1973 | |
| JP | 61-109914 | | 5/1986 | |
| JP | 62-8426 | | 1/1987 | |
| JP | 2-44091 | | 11/1990 | |
| JP | 6-235425 | | 8/1994 | |
| JP | 10-299784 | | 11/1998 | |
| JP | 2000-120705 | | 4/2000 | |
| JP | 2000-161375 | | 6/2000 | |
| JP | 2000-274443 | | 10/2000 | |
| JP | 2000-291674 | | 10/2000 | |
| JP | 2000-296439 | | 10/2000 | |
| JP | 2001-90737 | | 4/2001 | |
| JP | 2001-165177 | | 6/2001 | |
| JP | 2002-54643 | | 2/2002 | |
| JP | 2002-130303 | | 5/2002 | |
| JP | 2003-207094 | | 7/2003 | |
| JP | 2003-278773 | | 10/2003 | |
| JP | 2004-324811 | | 11/2004 | |
| JP | 2005-180531 | | 7/2005 | |
| JP | 2006-125485 | | 5/2006 | |
| JP | 2006183847 | A * | 7/2006 | .......... F16C 33/6659 |
| JP | 2007-10017 | | 1/2007 | |
| JP | 2007-24252 | | 2/2007 | |
| JP | 2007-92886 | | 4/2007 | |
| JP | 2007-303528 | | 11/2007 | |
| JP | 2008-75882 | | 4/2008 | |
| JP | 4261083 | | 2/2009 | |
| JP | 2009-162341 | | 7/2009 | |
| JP | 2010-127399 | | 6/2010 | |
| JP | 2011-75093 | | 4/2011 | |
| JP | 2011-255443 | | 12/2011 | |
| JP | 2012-21581 | | 2/2012 | |
| JP | 2012-26496 | | 2/2012 | |
| JP | 4917110 | B2 | 4/2012 | |
| WO | WO 2008081563 | A1 | 7/2008 | |
| WO | WO 2009028151 | A1 | 3/2009 | |
| WO | WO 2012/073475 | A1 | 6/2012 | |

OTHER PUBLICATIONS

Japanese Decision of Grant dated Aug. 30, 2016 in corresponding Japanese Patent Application No. 2012-209139.
Japanese Decision of Rejection dated Aug. 30, 2016 in corresponding Japanese Patent Application No. 2012-209137.
Extended European Search Report dated Apr. 20, 2016 from European Patent Application No. 13839999.3, 8 pages.
Chinese Office Action dated Jul. 5, 2016 from Chinese Patent Application No. 201380048975.5, 9 pages.
Japanese Notification of Reasons for Rejection dated Apr. 19, 2016 in corresponding Japanese Patent Application No. 2012-209138.
Japanese Office Action dated Feb. 9, 2016 in corresponding Japanese Patent Application No. 2012-209136.
Japanese Office Action dated Mar. 8, 2016 in corresponding Japanese Patent Application No. 2012-209137.
Japanese Office Action dated Mar. 1, 2016 in corresponding Japanese Patent Application No. 2012-209139.
Japanese Notification of Reason(s) for Rejection dated Mar. 29, 2016 in corresponding Japanese Patent Application No. 2012-209135.
International Search Report dated Dec. 24, 2013 in corresponding International Patent Application No. PCT/JP2013/075223.
PCT International Preliminary Report on Patentability dated Apr. 2, 2015 in corresponding International Patent Application No. PCT/JP2013/075223.
Notification of Reasons for Rejection dated Oct. 18, 2016 from Japanese Patent Application No. 2012-209135, 6 pages.
U.S. Office Action dated May 6, 2016 from U.S. Appl. No. 14/430,464.
U.S. Notice of Allowance dated Sep. 16, 2016 from U.S. Appl. No. 14/430,464.
U.S. Appl. No. 14/430,464, filed Mar. 23, 2015, Masatsugu Mori, NTN Corporation.
Chinese Office Action dated Mar. 17, 2017 from Chinese Patent Application No. 201380048975.5, 7 pages.
Japanese Office Action dated May 23, 2017 from Japanese Patent Application No. 2012-209137, 6 pages.
Office Action dated Apr. 24, 2018, in corresponding Japanese Patent Application No. 2017-142625, 6 pgs.
European Office Action dated Feb. 12, 2019 in related European Patent Application 13 839 999.3.

\* cited by examiner

COMPARISON OF INNER RING DROP TEMPERATURE

COOLING STRUCTURE FOR BEARING DEVICE

CROSS-REFERENCE TO RELATED APPLICATIONS

This application is a continuation of U.S. application Ser. No. 14/430,464, filed Mar. 23, 2015, which is a U.S. National Stage Application which claims the benefit under 35 U.S.C. 371 of PCT International Patent Application PCT/JP2013/075223, filed Sep. 19, 2013, which is based on and claims foreign priority benefit of Japanese patent applications No. 2012-209135, No. 2012-209136, No. 2012-209137, No. 2012-209138 and No. 2012-209139, all filed on Sep. 24, 2012, the entire disclosures of which are herein incorporated by reference as a part of this application.

BACKGROUND

1. Field

The present invention relates to a cooling structure for a bearing device and, more particularly, to the cooling structure for a main shaft in a machine tool and the cooling structure in the bearing device that is incorporated in the main shaft.

2. Description of the Related Art

In the main shaft device employed in the machine tool, incompatible technologies of suppression of the temperature rise in the main shaft device and of a speed-up of the main shaft device for increasing the machining ability, both required in bearings used to support a main shaft, are desired for in view of the necessity to secure the machining accuracy and also to increase the machining efficiency. Accordingly, in recent years, various new techniques of cooling the bearings and lubricating them come to be introduced.

Specifically, JP Patent Publication No. 2000-161375 discloses the method of cooling by rendering a cold blast to form a spiral flow by injecting such cold blast into a space, which is delimited between, for example, two bearings, at an angle relative to the direction of rotation. JP Patent Publication No. 2000-296439 discloses the use of an air outlet port for air cooling an inner ring spacer, which port is formed in the main shaft or a bearing housing so that an inner ring of the bearing can be indirectly cooled by blowing the inner ring spacer with a compressed air to thereby air cool the latter. If the inner ring is cooled, there is two functions, i.e., a function of dissipating generated heats by means of the cold blast and a function of reducing the bearing preload through the reduction of the inner ring temperature, and a cumulative effect of suppressing the bearing temperature can be expected by means of those functions. JP Patent Publication No. 2012-026496 discloses the use of a ceramic material, which has a density lower than that of a steel material and also has a high modulus of elasticity at a low linear expansion, as material for the inner ring so that the preload can be relieved while the amount of expansion of the inner ring in a radial direction is reduced.

Also, so long as the method of lubricating the bearing is concerned, Japanese Patent No. 4261083, for example, discloses a technique concerning the air oil lubricating method that can be suitably employed for a high speed operation. This known technique is such that an inclined surface area continued to the raceway surface is provided in an outer diametric surface of the bearing inner ring and a ring shaped nozzle member is provided along the inclined surface area with a gap defined therein. The nozzle member is provided with a nozzle for discharging an air oil towards an inner ring inclined surface area and, accordingly, an oil contained in the air oil discharged from the nozzle can be attached on the inclined surface area assuredly. The oil so attached forms an attachment flow by the effect of an attachment force and a centrifugal force brought about by the rotation, and can be assuredly introduced into the bearing. Therefore, along with the speed-up of the bearing, reduction to a noise is made possible as compared with the conventional oiling method.

If the technique of the above discussed air oil lubricating method is applied to a bearing device in which a plurality of rolling bearings are juxtaposed in an axial direction, the result is such as shown in FIGS. 81 and 82 which show as, for example, a suggested example 1. Namely, as shown in FIG. 81, the bearing device includes two axially juxtaposed rolling bearings 101 and 101 and an outer ring spacer 104 and an inner ring spacer 105 that are interposed respectively between outer rings 102 and 102 of each of the rolling bearings 101 and 101 and between inner rings 103 and 103 of each of the rolling bearings 101 and 101. In the example as shown, the rolling bearing 1 is in the form of an angular contact ball bearing. Each of those rolling bearings 101 and 101 is used with the initial preload applied by means of a widthwise dimensional difference between the outer ring spacer 104 and the inner ring spacer 105.

As clearly shown in FIG. 82, the outer ring spacer 104 is comprised of an outer ring spacer man body 110 and a pair of nozzle members 111 and 111, and a nozzle 112 for supplying the air oil towards the associated rolling bearing 101 is provided in each of the nozzle members 111. Respective discharge ports 112a of the nozzles 112 are opposed to a shoulder surface area (inclined surface area) 103b of the inner ring 103 via a gap δ. The shoulder surface area 103b of the inner ring 103 is formed with a plurality of annular recesses 120 that are juxtaposed in a circumferential direction at respective axial positions confronting the discharge ports 112a of the nozzles 112.

The air oil for use in lubricating the bearings is, after having been supplied from an external air oil supply device 145 shown in FIG. 81, discharged from the nozzle 112 by way of a supply port 140, then through a supply hole 147 and finally through an introducing passage 113 within the outer ring spacer 104. The oil contained in the air oil so discharged is blown onto the inner ring 103 at the annular recess 120 of the inner ring 103 and is then attached on the inner ring 103. The oil so attached forms an attachment flow by the effect of the attachment force and the centrifugal force developed as a result of rotation of the inner ring 103, and is guided along the shoulder surface area 103b, shown in FIG. 82, towards the side of a raceway surface 103a and is finally provided for lubrication of the rolling bearing 101.

FIG. 83A illustrates a sectional view showing a cooling structure for the bearing device designed in accordance with a suggested example 2, FIG. 83B illustrates a sectional view showing, on a large scale, a main portion of the cooling structure in FIG. 83A and FIG. 84 is a cross sectional view taken along the line 84-84 in FIG. 83A. In the structure shown in FIGS. 83A, 83B and 84, in which a cooling air is injected onto an outer diametric surface of an inner ring spacer 180 so as to be oriented in a rotational direction of the shaft to thereby cool the bearing through the inner ring spacer 180, test results of the temperature of each of the bearing inner ring 181 and the outer ring 182 and the noise level at that time, which are obtained through experiments conducted in relation to the rotational speed, are shown in FIGS. 85 and 86. In FIGS. 85 and 86, white plots pertain to the results with no cooling effect and black plots pertain to the results with the cooling effected. As shown in FIG. 85, it is suspected that with the air cooling performed, the temperature of each of the inner ring 181 and the outer ring 182 is lowered during the operation and the increase of the bearing preload is suppressed. It is, however, to be noted that the noise level, when the air cooling is performed, is increased by 20 dB (A) at most as compared with that exhibited when no air cooling is performed.

FIG. 87 shows, as a suggested example, 3, the bearing device J in which four rolling bearings 1A, 1B, 1C and 1D, each in the form of an angular contact ball bearing, are arranged in parallel combinations, the left side two rolling bearings 1A and 1B in one combination and the right side two rolling bearings 1C and 1D in the other combination, and the two intermediate rolling bearings 1B and 1C are held in back-to-back combination relative to each other. In such a bearing device J, supply and discharge passages for the air oil AO and the cooling air A will be such as discussed below. Namely, so long as the air oil AO is concerned, as shown by broken line arrows, the air oil AO is supplied from oil supply ports (not shown), which are provided in axially opposed ends of an intermediate outer ring spacer 4M, towards the two intermediate rolling bearings 1B and 1C and, also, from oil supply ports (not shown), which are provided in the left and right side outer ring spacers 4L and 4R, towards the outer rolling bearings 1A and 1D. On the other hand, so long as the cooling air A is concerned, as shown by the solid line arrows, the cooling air A is discharged from a cooling air discharge port 11M, which is provided in the intermediate outer ring spacer 4M, towards between the intermediate outer ring spacer 4M and the inner ring spacer 5M and, also from cooling air discharge ports 11L and 11R, which are provided in the left and right side outer ring spacers 4L and 4R, towards between the left and right side outer ring spacers 4L and 4R and the inner ring spacers 5L and 5R. The air oil AO after the oil for lubrication has been supplied to the rolling bearings 1A, 1B, 1C and 1D, and the cooling air A after the bearing device J and a main shaft 7 have been cooled, are discharged to the outside of a main shaft device from exhaust ports (not shown) provided in axially opposed ends of each of the outer ring spacers 4L, 4M and 4R.

In the case of the bearing device J shown in FIG. 87, air of the air oil AO, which has been injected from the oil supply port in the intermediate outer ring spacer 4M, flows in the same direction as the cooling air A discharged from a cooling air discharge port 11M of the intermediate outer ring spacer 4M. However, the cooling air A, discharged from the cooling air discharge ports 11L and 11R of the left and right side outer ring spacers 4L and 4R, flows in part towards the intermediate rolling bearings 1B and 1C. Thus, the cooling air A discharged from the cooling air discharge ports 11L and 11R of the left and right side outer ring spacer 4L and 4R flows in a direction counter to the direction of flow of the air oil AO which is injected from the oil supply port of the intermediate outer ring spacer 4M. Therefore, the air cooling air A and the air oil AO collide with each other at an axially outer side portion 140 of the intermediate rolling bearings 1B and 1C and, consequently, it occurs that the flow of the air oil AO becomes not stable. Once this occurs, the oil of the air oil AO will no longer be supplied sufficiently towards the axially outer side portion 140, resulting in the occurrence of an excessive temperature rise.

JP Patent Publication No. 2000-161375, JP Patent Publication No. 2000-296439, JP Patent Publication No. 2012-026496, Japanese Patent No. 4261083

To speed up the bearing, the suppression of the bearing temperature during the operation and the assured supply of the lubricant oil are essential requirements. Since the bearing temperature suppressing technique described in JP Patent Publication No. 2000-161375 and JP Patent Publication No. 2000-296439 referred to above is the cooling of the bearing by the use of a compressed air, there is a problem that a substantial amount of air is consumed, while the device can be configured at a relatively inexpensive cost.

On the other hand, the bearing preload during the operation is affected by the difference in amount of radial expansions of the inner and outer rings. In general, if the inner and outer rings, each made of a steel material, are used to operate, the heat generated in the inner ring is difficult to be dissipated as compared the outer ring side in which the bearing box is forcibly cooled by the oil or the like. As a result, the temperature of the inner ring is higher than that of the outer ring. Accordingly, the amount of expansion on the inner ring side tends to become large as compared with that on the outer ring side due to that resulting from the heat generation in cooperation with the centrifugal force. This constitutes a major factor by which the increase of the preload during the operation may result in.

JP Patent Publication No. 2012-026496 referred to above is aimed at relieving the preload by suppressing the inner ring expansion amount during the operation with the use of the inner ring made of a ceramic material and with the utilization of advantages of the ceramics including the low density, the low linear expansion and the high modulus of elasticity. However, even though the ceramic material is used for the inner ring, the inner ring expansion during the operation tends to be largely affected by the expansion brought about by the temperature rise of a shaft and, accordingly, an effect to relieve the preload of the bearing is low while the advantages of the ceramic material are no longer utilized.

Also, although the lubricating method disclosed in Japanese Patent No. 4261083 referred to above may bring about a favorable result so long as the lubrication is concerned, further increase of the cooling effect so as to meet with the further speed-up is demanded.

SUMMARY

An object of the present invention is to provide a cooling structure for a bearing device, which is capable of efficiently cooling an inner ring of the rolling bearing, an inner spacer ring of the rolling bearing and a main shaft mounted on an inner periphery of each of those components.

In order to accomplish the foregoing object, the cooling structure designed in accordance with the present invention is used for the bearing device including: a plurality of axially juxtaposed rolling bearings, each of which includes an inner ring mounted on a main shaft and an outer ring accommodated in a housing; an inner ring spacer interposed between the inner rings of the neighboring rolling bearings and mounted on the main shaft; and an outer ring spacer interposed between the outer rings of the neighboring rolling bearings and accommodated in the housing. In the cooling structure, a nozzle is provided in the outer ring spacer and supplies a cooling fluid to the rolling bearings by blowing the cooling fluid to an outer peripheral surface of the inner ring or the inner ring spacer, in which the cooling fluid includes a mixture of air and oil, only oil or a compressed air, and the nozzle has a discharge port side that is inclined forwardly with respect to a direction of rotation of the main shaft.

According to this construction, by blowing the cooling fluid to the outer peripheral surface of the inner ring or the inner ring spacer, the inner ring or the inner ring spacer is cooled. Since the nozzle has its discharge port side inclined forwards with respect to the direction of rotation of the main shaft, the cooling fluid forms a swirling flow along the outer peripheral surface of the inner ring or the inner ring spacer to stably flow in the direction of rotation of the main shaft. Accordingly, heats evolved in the inner ring or the inner ring spacer is absorbed and, therefore, it can be achieved to effectively cool. Also, since the inner ring or the inner ring spacer is cooled, the main shaft mounted on the inner periphery thereof is also cooled.

By the way, the reason that the discharge port of the outer ring spacer for the cooling fluid is inclined forwardly with respect to the direction of rotation of the main shaft is that it is effective where, for example, the direction of rotation is fixed such as that of the main shaft of the machine tool, and it has been ascertained as a result of experiments that in the gap between the outer ring spacer and the inner ring spacer, a favorable fluid flow can be achieved and the cooling effect is increased. The cooling fluid discharged from the discharge port of the outer ring spacer is, after having cooled the inner ring spacer and the main shaft, discharged to the outside of the rolling bearing through a bearing space between the inner and outer rings, and therefore, the cooling of the rolling bearing is accomplished simultaneously. As such, by the utilization of the cooling fluid, the rolling bearing can be efficiently and reasonably cooled.

In the cooling structure of the present invention, the cooling fluid referred to above includes a mixture of air and oil or oil alone. When the cooling fluid is blown to the outer peripheral surface of the inner ring or the inner ring spaced from the nozzle provided in the outer ring spacer to supply the cooling fluid to the rolling bearing, the mixture of air and oil, or oil alone, within the cooling fluid is stably supplied to the rolling bearing, and therefore, the rolling bearing can be favorably lubricated.

In the cooling structure of the present invention, the discharge port of the nozzle may confront a shoulder surface continued towards the inner ring spacer side from a raceway surface in the outer peripheral surface of the inner ring with a gap intervening between the discharge port and the shoulder surface. Also, the shoulder surface referred to above may be inclined such that an outer diameter of the inner ring gradually increases away from the raceway surface. If the discharge port of the nozzle is opposed to the shoulder surface of the inner ring with a gap intervening therebetween, the cooling fluid discharged from the discharge port of the nozzle is blown to the shoulder surface of the inner ring. Since the oil in the cooling fluid blown to the shoulder surface is guided along the shoulder surface to the raceway surface, the raceway surface of the inner ring can be favorably lubricated. If the shoulder surface is inclined, the centrifugal force incident to the rotation of the inner ring acts on the oil deposited on the shoulder surface, and the oil is then guided smoothly towards the raceway surface of the inner ring which is on an outer diametric side. Also, when the cooling fluid is directly blown to the shoulder surface of the inner ring, an effect to cool the inner ring is high.

In the cooling structure for the bearing device according to the present invention, the nozzle referred to above may be configured to discharge the cooling fluid towards the outer peripheral surface of the inner ring spacer, in which case the outer peripheral surface of the inner ring spacer is so shaped as to guide the cooling fluid, discharged from the nozzle, towards the neighboring rolling bearings. In this case, the cooling fluid discharged from the discharge port of the nozzle is blown to the outer peripheral surface of the inner ring spacer. The cooling fluid blown to the outer peripheral surface of the inner ring spacer is favorably guided towards the neighboring rolling bearings along the outer peripheral surface of the inner ring spacer and is used for lubrication of the rolling bearings. Also, with the cooling fluid blown directly to the outer peripheral surface of the inner ring spacer, an effect to cool the inner ring spacer is high.

It is recommended that the outer peripheral surface of the inner ring spacer referred to above may be inclined such that a minimum outer diameter, of the outer peripheral surface where the cooling fluid discharged from the nozzle is blown is set to be the smallest of all, and the outer diameter gradually increases towards the rolling bearing, in which case the outer diameter at an axial end of the outer peripheral surface of the inner ring spacer is equal to or larger than the outer diameter of an inner ring spacer side end in the inner ring of the rolling bearing. If the outer peripheral surface of the inner ring spacer is rendered to be the inclined surface of the above described shape, the oil of the cooling fluid discharged from the nozzle and depositing on the outer peripheral surface of the inner ring spacer can be guided smoothly towards the rolling bearings along the outer peripheral surface of the inner ring spacer by the effect of the centrifugal force resulting from the rotation of the inner ring spacer.

Also, the outer peripheral surface of the inner ring spacer may be provided with a circumferential groove, which is positioned at a site where the cooling fluid discharged from the nozzle is blown, and a spiral groove having one end connected with the circumferential groove and approaching the rolling bearing as a circumferential phase is displaced in the direction of rotation of the main shaft. In this case, the oil of the cooling fluid discharged from the nozzle can stagnate within the circumferential groove of the inner ring spacer, and such oil is smoothly guided towards the rolling bearings along the spiral groove incident to the rotation of the inner ring spacer.

The cooling fluid referred to above may be an air oil for transporting a liquefied oil by means of air or an oil mist for transporting by means of the air.

In the cooling structure of the present invention, the cooling fluid referred to above may be a compressed air, in which case the nozzle for discharging the compressed air towards the outer peripheral surface of the inner ring spacer is provided in the outer ring spacer so as to incline forwardly with respect to the direction of rotation, in which a gap delimited between the inner peripheral surface of the outer ring spacer, where the discharge port of the nozzle exists, and the outer peripheral surface of the inner ring spacer, that confronts the discharge port, is chosen to be equal to 0.7 mm or larger, but smaller than half the diameter of the nozzle.

According to this construction, when the compressed air is discharged by means of the nozzle, provided in the outer ring spacer, to the outer peripheral surface of the inner ring spacer, the rolling bearing can be cooled indirectly. Since the nozzle of the outer ring spacer for the compressed air is inclined forwardly with respect to the direction of rotation, the compressed air for cooling purpose is blown from an air supply port, provided in the housing where the outer ring spacer is installed, to the outer peripheral surface of the inner ring spacer through the nozzle. Accordingly, the compressed air forms a swirling flow at the annular gap portion, delimited between the outer peripheral surface of the inner ring spacer and the inner peripheral surface of the outer ring spacer, thereby cooling the inner ring spacer. As a result thereof, the inner ring of the bearing fixed in contact with an end surface of the inner ring spacer can be cooled by the effect of thermal conduction. The compressed air is, after having cooled the inner ring spacer and the main shaft, discharged to the outside of the bearing through a bearing space between the inner and outer rings of the rolling bearing, and therefore, the cooling of the rolling bearing takes place simultaneously. As described above, with the utilization of the compressed air, the rolling bearing can be efficiently and reasonably cooled.

The gap delimited between the inner peripheral surface, where the discharge port of the nozzle exists, and the outer peripheral surface of the inner ring spacer, which confronts the discharge port, is chosen to be half the diameter of the nozzle. Accordingly, by increasing the pressure of the discharge port of the nozzle to thereby suppress an abrupt expansion of the air, the injection noise can be reduced as compared with the conventional cooling effected by the use of the compressed air. The upper limit of the gap referred to above is so set that the inner ring spacer will not contact the outer ring space upon expansion caused as a result of the temperature rise of the inner ring spacer and the centrifugal force generated during the operation and that the entire peripheral sectional surface area of the gap becomes larger than the total sectional surface of the nozzle. With the gap set to 0.7 mm or greater in radius, it has been found as a result of a series of experiments that it has a noise reducing effect along with a cooling effect maintained. When the gap of 0.7 mm or greater is secured regardless of the bearing size (diameter of the spacer), the noise reducing effect in conjunction with the cooling effect can be obtained. If the gap is made smaller than that, it has been ascertained that no required discharge surface area is obtained and the cooling air amount decreases and, therefore, the cooling effect is lowered. Accordingly, without rendering the bearing device to be of a complicated structure, the temperatures of the rolling bearing and the main shaft can be lowered with no need to use any expensive accessory equipment and the noise to the outside can be reduced.

The nozzle referred to above is of a straight shape and may be disposed at a position offset from the straight line, which extends in an arbitrary radial direction in the section perpendicular to an axis of the outer ring spacer, in a direction perpendicular to such straight line. If the position of the nozzle is offset in this manner, the nozzle can be oriented in a tangential direction of the main shaft surface and in the direction of rotation. The greater the offset amount of the nozzle, the larger the temperature drop of the inner ring spacer.

The outer ring spacer referred to above may be of a type provided with a lubricating nozzle for supplying the lubricant oil into the rolling bearing. In such case, the lubricant oil discharged from the lubricating nozzle is used to lubricate the rolling bearing by introducing it to the raceway surface of the inner ring. For the lubricant oil, air oil or air mist may be used.

The lubricating nozzle referred to above may be of a type capable of discharging the lubricant oil towards the raceway surface of the inner ring. In such case, when the lubricant oil is directly discharged to the raceway surface of the inner ring, the state of lubrication during the bearing operation can be maintained favorably at all times.

The rolling bearing referred to above may include a plurality of rolling elements interposed between respective raceway surfaces of the inner and outer rings, and a retainer for retaining the rolling elements, in which case the lubricating nozzle is configured to discharge the lubricant oil towards an outer diametric surface of the inner ring, in which a tip end portion of the lubricating nozzle, which protrudes into a bearing space between the inner and outer rings, is disposed radially inwardly of an inner peripheral surface of the retainer. In this case, the lubricant oil discharged from the lubricating nozzle deposits on an outer diametric surface of the inner ring. The lubricant oil so deposited on the outer diametric surface of the inner ring is used to lubricate the rolling bearing by introducing it to the raceway surface of the inner ring with the utilization of the surface tension of the oil and the centrifugal force. Also, a tip end portion of the lubricating nozzle is disposed radially inwardly of the inner peripheral surface of the retainer, the interference between the lubricating nozzle and the retainer can be avoided, and also the lubricant oil so discharged can be used for lubrication of the retainer through the outer diametric surface and the raceway surface of the inner ring.

In the cooling structure for the bearing device, which is designed in accordance with the present invention, a nozzle for discharging the compressed air towards the outer peripheral surface of the inner ring spacer may be provided in the outer ring spacer so as to incline forwardly with respect to the direction of rotation, in which case a radially protruding projection may be defined in axial opposite side portions of the discharge port of the nozzle in the outer ring spacer or the inner ring spacer, in which a first gap may be formed between a radial tip end portion of the projection and a peripheral surface of the inner ring spacer, and the first gap may be made smaller than a second gap present between the inner peripheral surface of the outer ring spacer, where the discharge port exists, and the outer peripheral surface of the inner ring spacer.

According to the above described construction, since the nozzle is inclined forwardly with respect to the direction of rotation, the compressed air for cooling purpose is blown from the nozzle to the outer peripheral surface of the inner ring spacer. Accordingly, the compressed air so blown forms a swirling flow within an annular gap, delimited between the outer peripheral surface of the inner ring spacer and the inner peripheral surface of the outer ring spacer, to thereby cool the inner ring spacer. As a result, the inner ring of the rolling bearing fixed in contact with the end surface of the inner ring spacer is cooled by the effect of the heat conduction. The compressed air, after having cooled the inner ring spacer and the main shaft, is discharged to the outside of the rolling bearing through a bearing space between the inner and outer rings of the rolling bearing, and therefore, the cooling of the bearing can be achieved.

Also, since of the outer ring spacer and the inner ring spacer, the axially opposite side portions of the discharge port of the nozzle is provided so as to protrude radially, the noise leakage to the outside can be suppressed by interrupting the air injection noise from the nozzle by means of the projection. With respect to the gap delimited between the inner peripheral surface of the outer ring spacer, where the discharge port exists, and the outer peripheral surface of the inner ring spacer confronting such discharge port, it is made relatively large as compared with the gap between the radial tip end portion of the projection and the confronting peripheral surface, so that the pressure will not increase at an outlet portion of the compressed air. The amount of the gap between the radial tip end portion of the projection and the confronting peripheral surface is determined in consideration of the discharge of the compressed air. As discussed hereinabove, without rendering the bearing device to be of a complicated structure, and with no need to use any expensive accessory equipments, the temperature of the rolling bearing and the main shaft can be lowered and, also, the noise to the outside can be reduced.

The minimum axial sectional surface area of the gap delimited between the radial tip end portion of the projection and the confronting peripheral surface may be so chosen as to be of a value within the range of 10 to 15 times the gross sectional surface area of the nozzle. The term "gross sectional surface area" of the nozzle referred to above means the surface area, when each of the nozzles is viewed in section in a plane perpendicular to the axial direction of the nozzle; multiplied by the number of the nozzle used. Also, the term "axial sectional surface area" referred to above means the surface area of an annular portion between the radial tip end portion of the projection and the confronting peripheral surface, when a portion of the bearing device where the gap exists in the section is cut in a plane perpendicular to the axis of the bearing device. Thus, by setting the axial sectional surface area of the gap in the manner described above, it is possible to achieve the reasonable reduction of the noise without accompanying any reduction of the amount of the compressed air. The axial sectional surface area of the gap is a preset value found as a result of experiments.

The projection referred to above may be provided in a widthwise intermediate portion of the outer peripheral surface of the inner ring spacer, in which case a lubricating nozzle for supplying a lubricant oil into the bearing is provided in the outer ring spacer and an axial gap is provided between an axial opposite end surface of the projection and an inner end surface of the lubricating nozzle. The size of the axial gap is so chosen in a manner similar to the radial gap in the projection. The lubricating nozzle referred to previously may be rendered as operable to discharge the lubricant oil towards the raceway surface or the outer diametric surface of the inner ring.

In the cooling structure for the bearing device, which is designed in accordance with the present invention, the cooling fluid may be a compressed air, in which case a plurality of circumferentially juxtaposed holes are provided at a location of the outer peripheral surface of the inner ring spacer where the compressed air is discharged from the discharge port. Also, a plurality of radial holes are radially provided in the inner ring spacer so that the compressed air discharged from the discharge port of the outer ring spacer may contact directly the surface of the main shaft and, also, a circumferential groove for effectively cooling the surface of the main shaft is provided in the inner peripheral surface of the inner ring spacer.

According to this construction, by discharging the compressed air from the discharge port, provided in the outer ring spacer, to the outer peripheral surface of the inner ring spacer, the indirect cooling of the bearing can be accomplished. The compressed air discharged from the discharge port of the outer ring spacer cools the inner ring spacer and the main shaft. Since the discharge port of the outer ring spacer is inclined forwardly with respect to the direction of rotation of the inner ring, the compressed air so discharged impinges upon a circumferential portion of the inner ring spacer. Accordingly, the injecting pressure of the compressed air discharged from the discharge port of the outer ring spacer can be applied to the inner ring spacer, and a function to drive the main shaft can be expected.

Accordingly, without rendering the rolling bearing to be of a complicated structure, and with no need to use any expensive accessory equipments, the temperature of the rolling bearing and the main shaft can be lowered with an inexpensive device. Since the bearing temperature can be lowered during the operation, the increase of the bearing preload is relieved and it is possible to allow the rolling bearing or the bearing device to be further speeded up, that is, it is possible to increase the machining efficiency or the bearing life. With the main shaft and bearing temperature being lowered during the operation thereof, by a quantity that the increase of the bearing preload is relieved, the initial preload can be increased, and the main shaft rigidity can be increased at a low speed, and also, the machining accuracy can be increased. During the operation the temperature of the main shaft is lowered, and therefore, the deterioration of the machining accuracy resulting from the thermal expansion of the main shaft can be reduced. The discharge port of outer ring spacer for the compressed air may be either one or a plural number.

The inner ring may be made of a ceramic material. Since the compressed air discharged from the discharge port of the outer ring spacer cools the inner ring spacer and the main shaft, the radial expansion of the ceramic inner ring incident to the temperature rise of the main shaft can be suppressed and it is expected that material characters of the ceramic can be given full play. As a result, the preload can be relieved and the speed-up can be enabled.

The discharge port of the outer ring spacer is of a straight shape and may be disposed at a position offset from the straight line, which extends in an arbitrary radial direction in the section perpendicular to an axis of the outer ring spacer, in a direction perpendicular to such straight line. If the position of the discharge port is offset in this manner, discharge port can be oriented in a tangential direction of the main shaft surface and in the direction of rotation. The greater the offset amount of the discharge port of the outer ring spacer, the larger the temperature drop of the inner ring spacer. The offset amount of the discharge port of the outer ring spacer may be so chosen to be 0.5 times or larger the radius of the main shaft of a to-be-cooled portion and smaller than the inner diameter of the outer ring spacer. As a result of experiments, when the offset amount of the discharge port is within a range from about 0.5 time the main shaft radius to the amount reaching the vicinity of the tangential line of the main shaft surface, the inner ring has shown the maximum temperature drop. It appears that when the discharge port of the outer ring spacer is offset and the air flow is directed in the inner ring rotating direction, the cooling air stably flows in the direction of rotation and, therefore, heat in the surface of the inner ring spacer is effectively absorbed.

At a position of the outer peripheral surface of the inner ring spacer, at which the compressed air discharged from the discharge port is blown off, a plurality of radially through-holes are juxtaposed in the circumferential direction, and therefore, the air can reach directly the main shaft so as to cool the inner ring spacer and the main shaft. Since in this way the main shaft can be directly cooled with the compressed air, it has been affirmed from the result of the experiments that the temperature drop of the inner ring could have been increased as compared with the case with no hole.

The hole referred to above may be either a throughhole or non-throughhole. In the case of the throughhole, the cooling effect to directly cool the main shaft can be increased as compared with the non-throughhole. Since the hole referred to above is provided in a plural number, the cooling effect to directly cool the main shaft can also be increased. The hole of the inner ring spacer referred to above may be rendered an inclined hole that inclines at an angle reverse to the direction of rotation towards the radially outside.

The outer peripheral surface of the inner ring spacer may be provided with a groove. In this case, the presence of the groove increases the surface area of the outer peripheral surface as compared with the case where no groove is provided, and the heat dissipation from the inner ring spacer surface can be accomplished efficiently. Accordingly, since the inner ring temperature is reduced and the bearing preload is correspondingly reduced, the speed-up of the device can be obtained. The section of the groove of the inner ring spacer as viewed as cut in a plane containing the axis of the inner ring spacer may be of a type representing a V shape or a recessed shape. The groove of the inner ring spacer referred to above may be in the form of a spiral groove. The surface area of the outer peripheral surface of the inner ring spacer can thus be increased.

In place of the groove, the outer peripheral surface of the inner ring spacer may be provided with surface indentations (projection and recess). Even in this case, the surface area of the outer peripheral surface of the inner ring spacer is increased and the heat dissipation from the inner ring spacer surface can be accomplished efficiently.

A groove having the section that is uniform in the axial direction may be provided in the inner peripheral surface of the inner ring spacer. Since the outer peripheral surface of the main shaft is mounted on the inner peripheral surface of the inner ring spacer, the provision of such groove in the inner peripheral surface of the inner ring spacer allows the cooling air to be extended over the entire main shaft surface and, accordingly, the surface area which the cooling air contacts directly the main shaft surface can be increased. Also, by rendering the hole communicating the groove to be a hole of the inclined shape as discussed above, the cooling effect to cool the main shaft directly can be increased. The main shaft surface opposed to the groove of the inner ring spacer may be provided with a groove having a V sectional shape, a recessed sectional shape or a spiral shape. The section referred to above means the section of the main shaft cut in a plan containing the main shaft axis. In such case, the heat dissipating surface area can be further increased and the cooling effect to directly cool the main shaft can be further increased. The section of the hole of the inner ring spacer cut in a plane perpendicular to the axis of the inner ring spacer may be either a rectangular shape or an oval shape.

The outer ring spacer may be provided with an air oil supply port for supplying an air oil into the rolling bearing, in which case the air oil supply port includes a projecting portion configured to project into the rolling bearing so as to confront the outer peripheral surface of the inner ring through an annular gap for the passage of the air oil. In this case, the air oil supplied from the air oil supply port deposits on the outer diametric surface of the inner ring. The oil so deposited on the outer diametric surface of the inner ring is introduced in the raceway surface of the inner ring by the utilization of the surface tension of the oil and the centrifugal force so that such oil can be used for lubrication of the rolling bearing. Also, the compressed air discharged from the discharge port is introduced into the rolling bearing through the annular gap delimited between the outer diametric surface of the inner ring and the projection, and is discharged after the heat has been absorbed within the rolling bearing. As described above, the cooling of the inner ring spacer and the rolling bearing makes it possible to accomplish the effective bearing cooling.

The air oil supply port may include an air oil nozzle for discharging the air oil towards the inner ring at an inner diametric side of the projection. In this case, the nozzle discharges the air oil to the inner ring on an inner diametric side of the projection. Since the projection is inserted into the rolling bearing to discharge the air oil close to the inner ring, the lubrication and the cooling function of the rolling bearing can be enhanced. The air oil supply port referred to above may concurrently serve as the discharged port of the compressed air, and vice versa In this case, the air amount reduction for the supply of the air oil and the hole number reduction dedicated for the air oil can be accomplished and, hence, the device structure can be simplified. Thereby, the reduction in manufacturing cost can be accomplished.

In the construction in which the air oil supply port and the discharge port of the compressed air are concurrently used, a radial throughhole may be provided in the inner ring spacer and, at the same time, a circumferential portion of the inner peripheral surface of the inner ring spacer, on which the main shaft is mounted, may also be provided with an axially extending axial groove, in which case, a circumferential portion of the axial opposite end surfaces in the inner ring spacer is provided with a radial groove which is communicated with the axial groove and extends in the radial direction. In such case, the air oil discharged to the inner peripheral groove, after having passed through the throughhole of the inner ring spacer, cools the main shaft and the inner ring spaced and, also, sequentially flows through the axial groove and the radial groove to effectively cool the inner ring. Also, during the passage of the air oil through the radial groove, the oil deposits on an end surface of the inner ring to form an attachment flow and, therefore, it comes to be assuredly utilized as the lubricant oil of the rolling bearing.

Where the structure is such that the air oil supply port referred to above includes the projection projecting into the rolling bearing and confronting through the annular gap at the outer diametric surface of the inner ring, the radial sectional surface area of the circumferential gap portion formed between the inner diametric surface of the projection and the outer diametric surface of the inner ring may be made larger than the gross surface area of the discharge port of the outer ring spacer. The term "radial sectional surface area" of the circumferential gap portion referred to above means, in the section of each of the bearing device as viewed in a plan cut in a direction perpendicular to the axial direction of the bearing device, the surface area of the circumferential gap portion formed between the inner diametric surface of the projection and the outer diametric surface of the inner ring. The term "gross sectional surface area" of the discharge port referred to above means the sum of the surface areas, when each of the discharge ports is viewed in section in a plane containing perpendicular to the axial direction of the discharge port, multiplied by the number of the discharge ports employed. According to this construction, the air discharged from the discharge port is assuredly introduced into the rolling bearing through the annular gap. This air is discharged after having absorbed the heat within the rolling bearing.

In the construction in which the air oil supply port and the discharge port of the compressed air are communalized or the construction in which the inner ring spacer is provided with the axial groove and the radial groove, the nozzle for discharging the air oil, which is aimed at lubricating the rolling bearing, may be dispensed with. In such case, the device construction can be simplified and, thereby, the manufacturing cost can be reduced. A compressed air supply device for supplying the compressed air or the air for cooling purpose may be provided independent from the air oil supply device, or an empty circuit of the air oil supply device may be utilized without oil supply.

The air oil outlet port for discharging the air oil may be provided, in which case arrangement may be made to allow the cooling air, after the inner ring spacer has been cooled, to be discharged from the air oil outlet port. Thus, by commonalizing the discharge path for the air oil and the discharge path for the cooling air, the device structure can be simplified.

In the cooling structure for the bearing device, which is designed in accordance with the present invention, three or more rolling bearings may be juxtaposed in the axial direction, in which case the outer ring spacers and the inner ring spacers are disposed between the outer rings of the neighboring rolling bearings and between the inner rings of the neighboring rolling bearings, respectively, and the cooling fluid includes the mixture of air and oil. In such case, the two outer ring spacers neighbor to each other through the intermediate rolling bearing and one of these two outer ring spacers is operable to supply a mixture for the air and oil to the intermediate rolling bearing, and the relationship between the flow rate or pressure of the cooling fluid discharged from the discharge port of one of the two outer ring spacers, which is positioned on an upstream side with respect to the direction of flow of the cooling fluid that is supplied to the intermediate rolling bearing, and from the discharge port of the other of the two outer ring spacers, which is positioned on a downstream side with respect to the direction of flow of the cooling fluid, is such that the cooling fluid discharged from the cooling fluid discharge port of the outer ring spacer positioned on the downstream side is avoided reversing to the flow of the cooling fluid within the intermediate rolling bearing.

According to this construction, when the air for cooling purpose is discharged from the discharge port towards the outer peripheral surface of the inner ring spacer, the cooling air impinging upon the inner ring spacer absorbs heats evolved in the bearing device and the main shaft supported by this bearing device. Accordingly, the bearing device and the main shaft can be efficiently cooled. Since it is of the structure in which in the intermediate rolling bearing the cooling air does not flow in a direction counter to the direction of flow of the mixture of the air and the oil, in the intermediate rolling bearing the flow of the mixture of the air and the oil is not hampered by the cooling air and, hence, the mixture of the air and the oil is favorably supplied into the intermediate rolling bearing.

In order that in the intermediate rolling bearing discussed above the cooling air does not flow in the direction counter to the direction of flow of the mixture of the air and the oil, to quote one example, the provision of a cooling fluid supply device for supplying the air for cooling purpose to each of the discharge ports has to be made so that by means of the setting of the flow rate of the cooling fluid to be supplied from the cooling fluid supply device to each of the discharge ports, and the flow rate of the cooling fluid discharged from the cooling fluid discharge port in one of the outer ring spacers on the upstream side can be made larger than the flow rate of the cooling fluid discharged from the discharge port in the other of the outer ring spacers on the downstream side. It is to be noted that the number of the cooling air discharge ports for each of the outer ring spacers may be either one or a plural number. In the case of the plural number, the flow rate of the cooling air discharged from the cooling air discharge port in the outer ring spacer means the gross flow rate of the cooling air discharged from each of the cooling air discharge ports.

As another example, the diameter of the discharge port in the outer ring spacer on the downstream side is made larger than the diameter of the discharge port in the outer ring spacer on the upstream side. By changing the diameter of the cooling air discharge ports on the downstream and upstream sides, the pressure inside a space delimited between the inner ring spacer and the outer ring spacer positioned on the downstream side becomes lower than the pressure inside a space delimited between the inner ring spacer and the outer ring spacer positioned on the upstream side. In such case, it depends on the sameness between the flow rate of the compressed air discharged from each of the cooling air discharge ports. The number of the cooling air discharge port for each of the outer ring spacers may be either one or a plural number and, in the case of the plural number, for each of the outer ring spacer, it depends on the sameness of the gross flow rate of the cooling air discharged from each of the cooling air discharge ports.

Where three or more rolling bearings are positioned, the number of the discharge ports in the outer ring spacer on the upstream side may be larger than the number of the discharge ports in the outer ring spacer on the downstream side. By changing the numbers of the cooling air discharge ports between the upstream and downstream sides, the flow rate of the cooling air discharged from the cooling air discharge port in the outer ring spacer positioned on the upstream side becomes larger than the flow rate of the cooling air discharged from the cooling air discharge port in the outer ring spacer on the downstream side. Even in this case, it depends on the sameness of the flow rate of the compressed air discharged from each of the cooling air discharge ports.

In any of those cases discussed above, since the pressure gradient of the cooling air is established from the upstream side towards the downstream side of the flow of the mixture of air and oil, no counter flow of the cooling air does not occur. Accordingly, the mixture of air and oil can be favorably supplied to the rolling bearing.

In the construction described above, one of the two outer ring spacers neighboring to each other through the intermediate rolling bearing has a first oil supply port for supplying the mixture of air and oil to the intermediate rolling bearing, whereas the other of the outer ring spacers has a second oil supply port for supplying the mixture of air and oil to an end rolling bearing neighboring to the intermediate rolling bearing to this outer ring spacer. In such case, the direction of flow of the mixture of air and oil supplied from the first oil supply port to the intermediate rolling bearing, and the direction of flow of the mixture of air and oil supplied from the second oil supply port to the end rolling bearing remain the same, and where the mixture of air and oil supplied from the first oil supply port flows from the intermediate rolling bearing to the end rolling bearing through between the other outer ring spacer and the inner ring spacer confronting this outer ring spacer. In such case, an air outlet port for discharging the air, forming a component of the mixture of air and oil, which is supplied to the intermediate rolling bearing and the end rolling bearings may be provided at one site on a downstream side end with respect to the direction of flow of the mixture of air and oil.

The air of the mixture of air and oil supplied to each of the rolling bearings is, after having passed through each of those rolling bearings, discharged to the outside of the housing through the discharge hole provided in the housing in which the bearing device is accommodated. If the air outlet port for guiding the air from inside of the rolling bearing to the discharge hole is provided for each of the rolling bearings, on the downstream side of the direction of flow of the air in an exhaust tube the air flowing from the upstream side and the air flowing from the air outlet port to the exhaust tube collide against each other making the air hard to flow smoothly. Accordingly, the flow of the mixture of air and oil within the rolling bearing does also become worse and there is the possibility that the oil will not be sufficiently supplied to the rolling bearing. In contrast thereto, if as is the case with the above described construction the air outlet port is provided at one site on the downstream side end with respect to the direction of low of the mixture of air and oil, the site at which the air, flowing through the air outlet hole, and the air, flowing from the air outlet port into the discharge hole, may collide against each other is minimized. Accordingly, the flow of the mixture of air and oil within the rolling bearing becomes favorable.

Where the air outlet port is provided in the above described site, an air outlet hole communicated with the air outlet port for guiding the air to the outside of the bearing device may be provided for each of the air outlet ports. If so constructed, the site at which the air flowing through the discharge hole and the air flowing from the air outlet port into the discharge hole collide against each other can be completely eliminated and, hence, the flow of the mixture of the air and the oil within the rolling bearing can become further favorable.

In the construction described above, the air outlet port for discharging the cooling air, discharged from the cooling air discharge port, from the space between the outer ring spacer and the inner ring spacer may be provided at the same axial position as the cooling air discharge port of the outer ring spacer. In this case, the cooling air discharged from the cooling air discharge port expands in the axial direction within the space between the outer ring spacer and the inner ring spacer, but no axial flow of the cooling air occur. For this reason, the flow of the cooling air in a direction counter to the mixture of the air and the oil then flowing through the intermediate rolling bearing will hardly occur.

The machine tool of the present invention is of a type in which any of the cooling structures each for the foregoing bearing device according to the present invention is incorporated. Where any one of the cooling devices for the bearing devices is incorporated, the bearing temperature during the operation can be lowered to relieve the increase of the bearing preload and, therefore, a further speed-up of the bearing, that is, the increase of the machining efficiency and the bearing life can be obtained. As a result of the lowering of the main shaft and the rolling bearing temperature during the operation, the initial preload can be increased by a quantity by which the increase of the bearing preload is increased. Therefore, the rotary shaft rigidity at a low speed and the machining accuracy can be increased. During the operation, the temperature of the main shaft is lowered, and accordingly, any deterioration of the machining accuracy resulting from the thermal expansion of the main shaft can be reduced.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
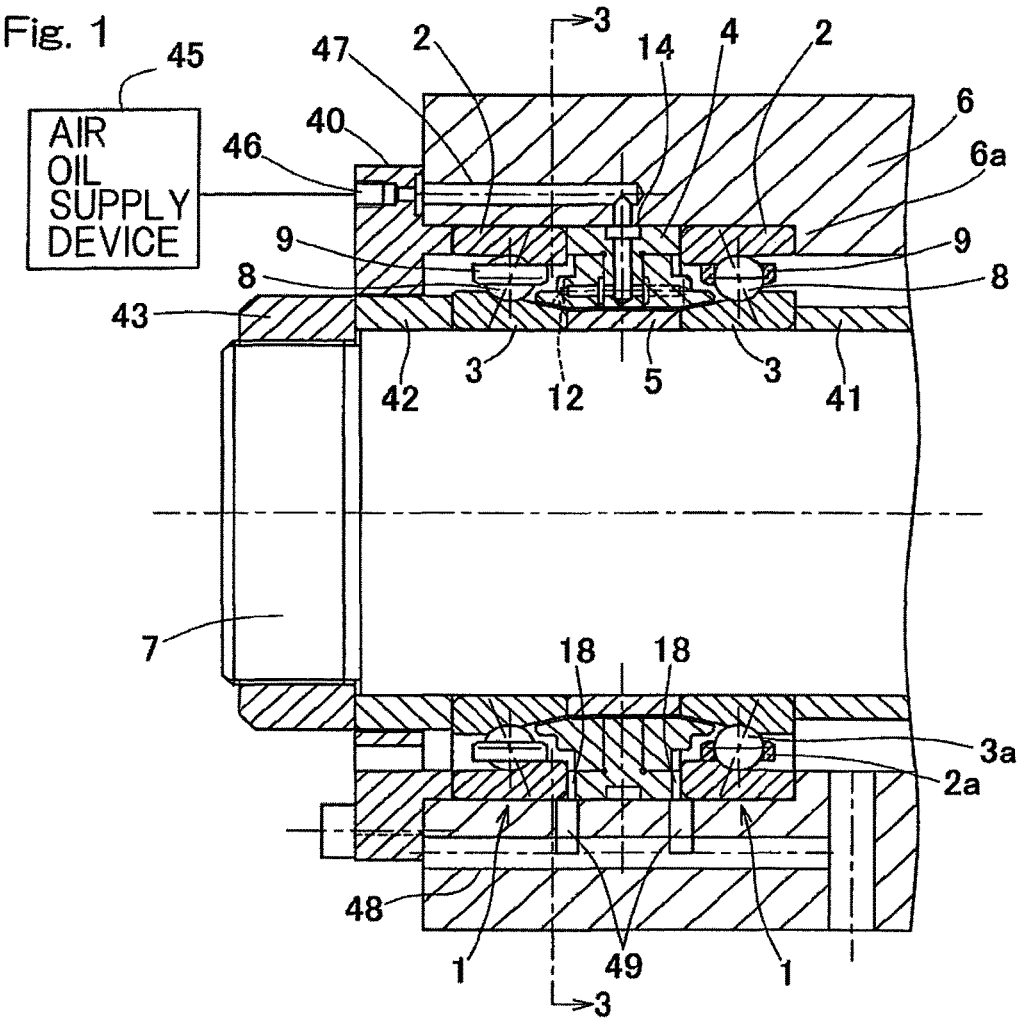
FIG. 1 is a longitudinal sectional view of a main shaft device in which a bearing device equipped with a cooling structure, which structure is designed in accordance with a first preferred embodiment of the present invention, is incorporated.

A cooling structure used in a bearing device according to a first preferred embodiment of the present invention will first be described with particular reference to FIGS. 1 to 4. The cooling structure employed in this bearing device is applied to, for example, a machine tool main shaft device as will be discussed in detail later. It is, however, to be noted that it is not limited only to the machine tool main shaft device. In the description that follows, a cooling method for a bearing is also included. As shown in FIG. 1, the bearing device shown therein includes two rolling bearings 1 and 1 which are axially juxtaposed relative to each other, an outer ring spacer 4 interposed between outer rings 2 and 2 of the rolling respective bearings 1 and 1 and an inner ring spacer 5 interposed inner rings 3 and 3 of the respective rolling bearings 1 and 1. The rolling bearing 1 is in the form of an angular contact ball bearing, and includes a plurality of rolling elements 8 interposed between respective raceway surfaces 3a and 2a of the inner and outer rings 3 and 2. The rolling elements 8 are each retained by a retainer 9 and spaced an equal distance from each other in a circumferential direction. The retainer 9 is so structured as to represent a ring shape of an outer ring guiding type. The two rolling bearings 1 and 1 are disposed in back-to-back relation to each other and, by means of a widthwise dimensional difference of the outer ring spacer 4 and the inner ring spacer 5, an initial preload applied to each of those rolling bearings 1 and 1 is set.

FIG. 1 illustrates the bearing device used to support a main shaft of a machine tool. The outer rings 2 and 2 of the rolling bearings 1 and 1 and the outer ring spacer 4 are mounted on an inner peripheral surface of a housing 6, and the inner rings 3 and 3 of the rolling bearings 1 and 1 and the inner ring spacer 5 are mounted on an outer peripheral surface of a main shaft 7. The outer rings 2 and 2 and the outer ring spacer 4 are, for example, loosely fitted to the housing 6, and the axial position thereof is defined by a stepped portion 6a of the housing 6 and an end face lid 40 for the housing 6. Also, the inner rings 3 and 3 and the inner ring spacer 5 are, for example, closely fitted to the main shaft 7, and the axial position thereof is defined by positioning spacers 41 and 42 on respective sides thereof. The positioning spacer 42 shown on a left side of FIG. 1 is fixed by means of a nut 43 threaded onto the main shaft 7.

Figure 2:
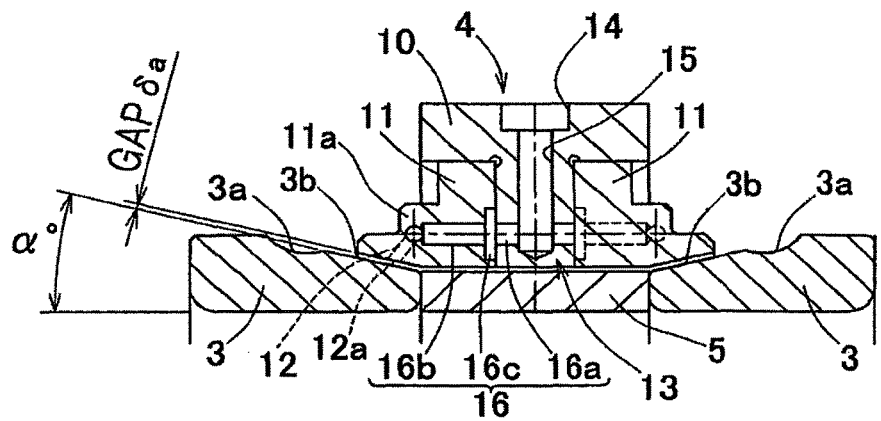
FIG. 2 is a diagram showing, on an enlarged scale, a portion of FIG. 1.

As shown in FIG. 2, the outer ring spacer 4 includes an outer ring spacer main body 10 of a generally T-sectioned shape and a pair of ring shaped nozzle members 11 and 11 that are disposed on respective opposite sides of a site corresponding to a center leg portion of the shape of the figure "T". Each of the nozzle members 11 includes a nozzle 12 for supplying an air oil, which is a cooling fluid, towards the rolling bearing 1. The nozzle 12 is provided at a projecting portion 11*a* of the nozzle member 11 so as to protrude into a bearing space between the inner and outer rings 3 and 2. The nozzle 12 has a discharge port 12*a* open towards an inner peripheral surface of the projecting portion 11*a*, and this inner peripheral surface is opposed to a shoulder surface 3*b*, comprised of an inclined surface continued to the raceway surface 3*a* of the inner ring 3, with a gap δa intervening therebetween. The gap δa is of a size rendered to be, for example, smaller than half the bore diameter of the nozzle 12. This is for the purpose that, considering the problem associated with noises, the pressure of the air oil discharged from the nozzle 12 will not drop abruptly.

The angle α of inclination of the shoulder surface 3*b* of the inner ring 3 is set to be an angle at which oil of the air oil blown onto the shoulder surface 3*b* can form an attachment flow on the shoulder surface 3*b* and can then be introduced into the raceway surface 3*a*. Specifically, the angle α is proportional to the dmn value (dm: the pitch circle diameter mn of the rolling elements 8, n: the maximum rotational speed $\min^{-1}$) which becomes an index to the rotational speed of the main shaft 7, and an approximate value thereof can be obtained from the following equation 1 (quoted from "Ea-oiru Junkatsu ni Okeru Kyokyu-yuryo no Bishouka (Microminiaturization of Oil Supply in Air Oil Lubrication)", NTN TECHNICAL REVIEW No. 72 (2004) 15):

$$\alpha° = 0.06 \times dmn \text{ value}/10{,}000 \qquad \text{Eq. 1}$$

Figure 3:
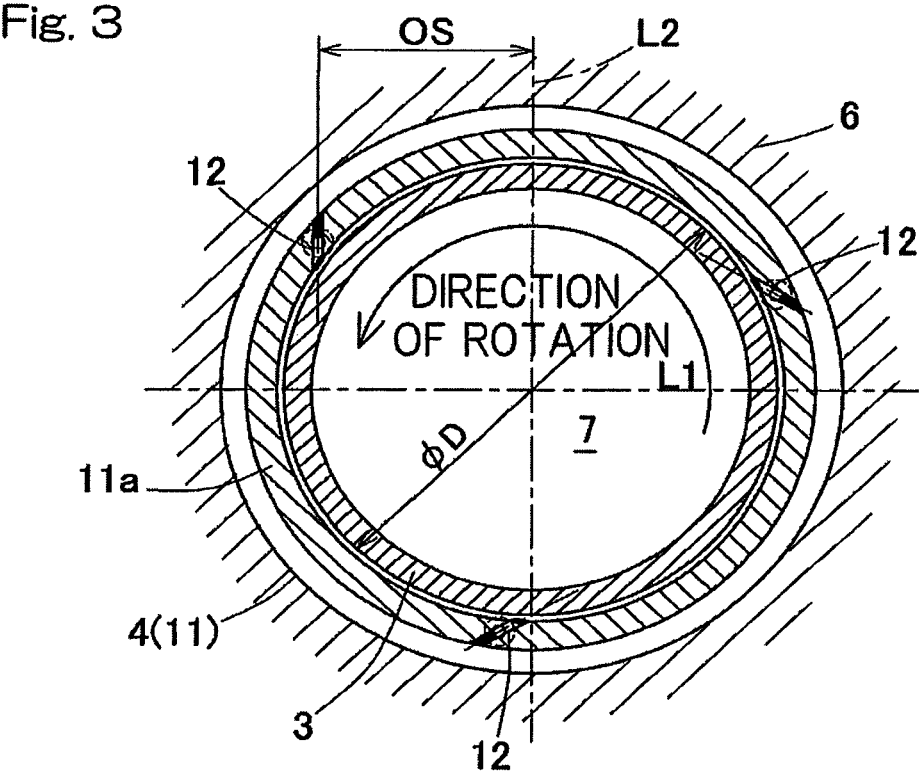
FIG. 3 is a cross sectional view of a portion of the cross section taken along the line 3-3 in FIG. 1.
Figure 4:
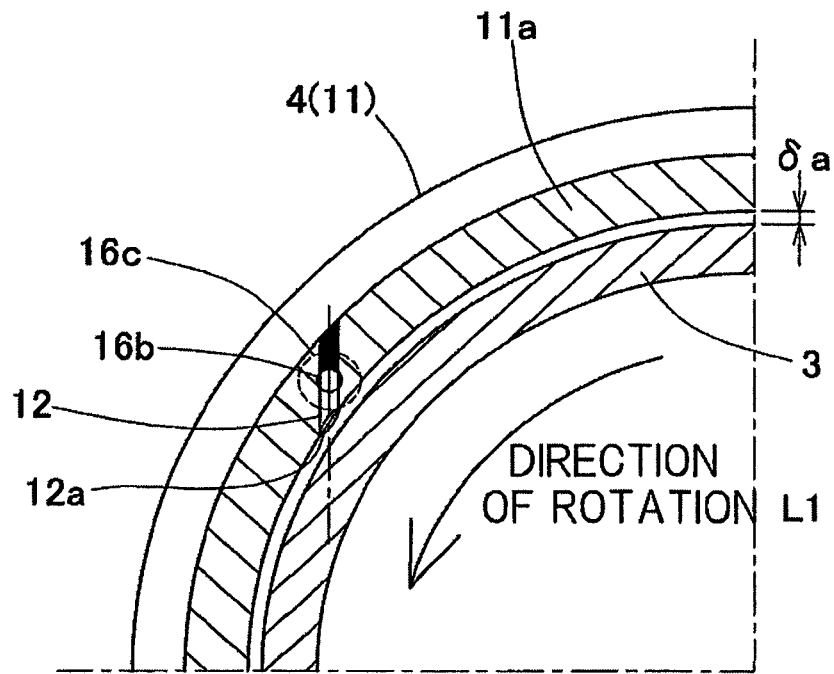
FIG. 4 is a fragmentary enlarged diagram showing a portion of FIG. 3.

As shown in FIG. 3 and FIG. 4 which is a fragmentary enlarged diagram thereof, the nozzle 12 referred to above is employed in a plural number, for example, three in this embodiment, and those nozzles 12 are disposed having been spaced an equal distance from each other in the circumferential direction. Each of those nozzles 12 is of a straight shape, and the discharge port 12*a* side thereof is inclined forwardly (towards the leading side) with respect to the direction L1 of rotation of the main shaft 7. In other words, each of those nozzles 12 is held at a position offset from a linear line L2, which extends in an arbitrary radial direction in a section vertical to the longitudinal axis of the outer ring spacer 4, in a direction perpendicular to such linear line L2. Its offset amount OS is chosen to be within the range of, for example, 0.4D to 0.5D relative to the outer diametric dimension D of the inner ring 3. It is to be noted that the only one nozzle 12 may be provided in the circumferential direction.

Referring to FIG. 2, the outer ring spacer main body 10 and the nozzle member 11 are provided with an introducing path 13 through which the air oil is introduced into the nozzle 12. This introducing path 13 includes an outer introducing port 14 in the form of an annular groove formed in an outer peripheral surface of the outer ring spacer main body 10, a plurality of radially extending holes 15 (equal in number to that of the nozzles 12) extending radially inwardly from the outer introducing port 14, and an axially extending hole 16 extending axially from a hole bottom portion of this radially extending hole 15, in which the tip of the axially extending hole 16 is communicated with one end of the nozzle 12 opposite to the discharge port 12*a*. The axially extending hole 16 has a first portion 16*a*, which is formed in the outer ring spacer main body 10, and a second portion 16*b*, which is formed in the nozzle member 11. A counter-sunken hole portion 16*c* of a diameter greater than any of the first and second portions 16*a* and 16*b* is provided on a side surface of the nozzle member 11 which forms a junction portion of the first and second portions 16*a* and 16*b*. It is to be noted that where there is only one nozzle 12 in the circumferential direction, the outer introducing port 14 may be a counter-sunken hole.

As shown in FIG. 1, a portion of the outer ring spacer main body 10, which protrudes axially beyond an outer periphery of the nozzle member 11, is provided with a cutout 18 which defines an air outlet port for the air oil. With the outer ring 2 of the rolling bearing 1 positioned in adjoining relation with the outer ring spacer 4, the cutout 18 comes to represent an open shape by which the bearing space of the rolling bearing 1 is communicated with the outside of the bearing device.

An air oil supply device 45 is provided in the outside of the main shaft device, and the air oil fed from the air oil supply device 45 is supplied to the outer introducing port 14 in the outer ring spacer 4 after having passed through a supply port 46 of the end face lid 40 and a supply hole 47 within the housing 6. Also, the housing 6 is provided with an exhaust hole 48. This exhaust hole 48 is communicated with the cutout 18 in the outer ring spacer 10 through a connecting hole 49.

In the bearing device of the structure described hereinabove, the air oil supplied from the air oil supply device 45 is discharged from the nozzle 12 after having passed through the introducing path 13 in the outer ring spacer 4. Since the size of the gap δa is chosen to be smaller than half the bore diameter of the nozzle 12, generation of noises can be suppressed without allowing the pressure of the air oil, discharged from the nozzle 12, to abruptly drop. The air oil so discharged is blown onto the shoulder surface 3*b* of the inner ring 3 so that the oil of the air oil can deposit on the shoulder surface 3*b*. This oil is guided smoothly towards the raceway surface 3*a* on the large diameter side along the shoulder surface 3*b*, which is the inclined surface, by the effect of the centrifugal force developed as a result of rotation of the inner ring 3. Since the angle α of inclination of the shoulder surface 3*b* is so chosen as to be represented by the angle expressed by the previously discussed equation Eq. 1, a favorable attachment flow of the oil can be obtained. As hereinabove described, since the oil of the air oil is stably supplied to the rolling bearing 1, the rolling bearing 1 can be favorably lubricated at all times.

Also, as shown in FIG. 4, since the air oil is blown onto the inner ring 3 simultaneously with lubrication, the inner ring 3 is cooled. Since the nozzle 12 is such that the discharge port 12*a* side thereof is inclined forwardly with respect to the direction of rotation of the main shaft 7 relative to the radial direction of the main shaft 7, the air oil forms a swirling flow along the outer peripheral surface of the inner ring 3 and then flows stably in the direction of rotation of the main shaft 7. Accordingly, heat developed on the surface of the inner ring 3 can be deprived and can therefore cool it effectively. A series of experiments conducted have proven that when the offset amount OS of the nozzle 12 shown in FIG. 3 is so chosen as to be within the range of 0.4 to 0.5 times the outer diametric dimension D of the inner ring 3, the cooling effect becomes the most favorable. With the inner ring 3 so cooled, the main shaft 7 mounted on the inner periphery of the inner ring 3 can be also cooled.

Figure 5:
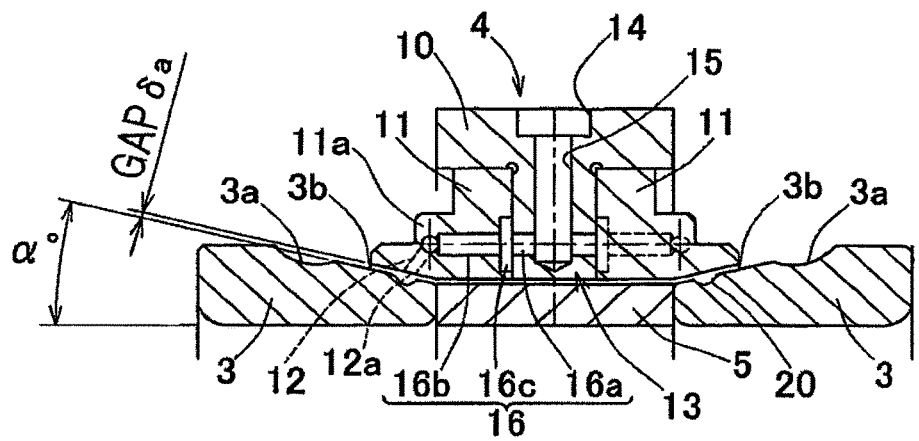
FIG. 5 is a longitudinal sectional view showing a modified form of a portion shown in FIG. 2.

As is the case with a modified example shown in FIG. 5, an annular recess 20 may be provided at an axial position of the shoulder surface 3*b* of the inner ring 3, at which the air oil is blown thereto. If this annular recess 20 is provided, the flow velocity of the air oil discharged from the nozzle 12 increases, and the attachment flow of the oil along the shoulder surface 3b takes place favorably.

Figure 6:
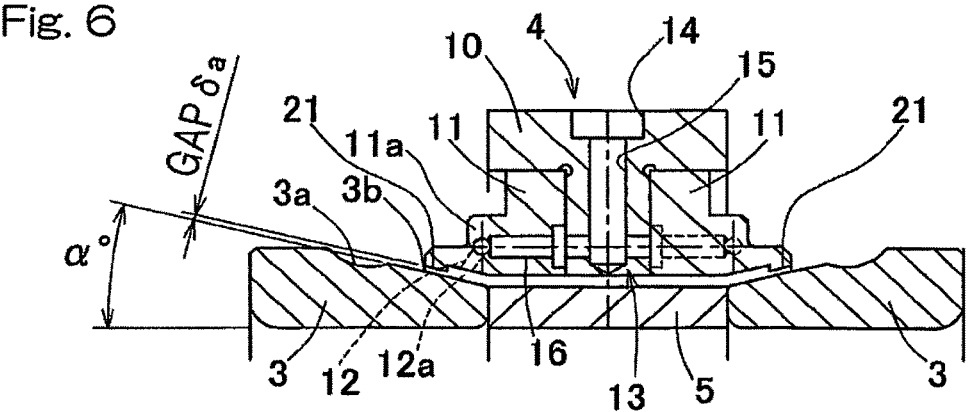
FIG. 6 is a longitudinal sectional view showing another modified form of that portion shown in FIG. 2.

As is the case with another modified example shown in FIG. 6, a projection 21 having an inner diameter smaller than the other may be provided in an axial end in an inner peripheral surface of the nozzle member 11. The gap δb between the projection 21 and the shoulder surface 3b of the inner ring 3 is so chosen that the dimension of the gap δb multiplied by the circumferential length of the gap δb at the position of the nozzle 12 may become about ten times the total hole diametric surface area of the nozzle 12. The total hole diameter surface of the nozzle 12 means the surface area equal to the hole diameter surface area of the single nozzle 12 multiplied by the number of the nozzle 12. With the gap δb being so defined in the manner described above, the projection 21 functions as a sound insulating wall effective to prevent injecting sounds of the air oil, then being discharged from the nozzle 12, from leaking towards a bearing 1 side.

The cooling fluid may be an oil mist for transporting an atomized oil by means of the air. Also, the cooling fluid may be an oil lubrication consisting of only oil. The oil lubrication is supposed to bring about a cooling effect of the inner ring 3 more efficiently than the air oil lubrication and the oil mist lubrication. Even in the case of the oil lubrication, it may be of a structure identical with that according to the previously described first embodiment of the present invention or its modified form which has been shown and described with reference to FIGS. 5 and 6.

Figure 7:
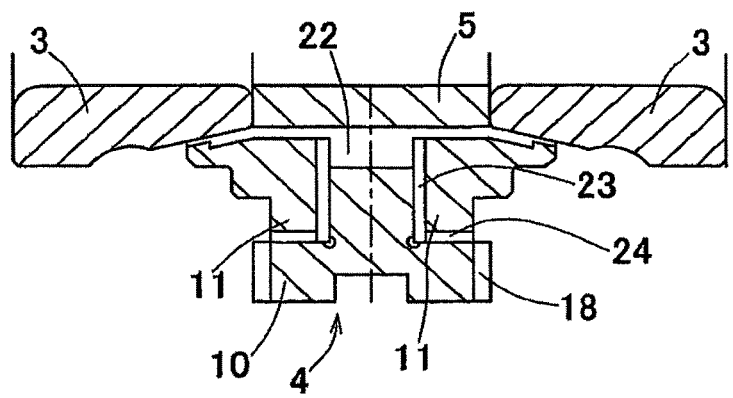
FIG. 7 is a longitudinal sectional view showing an oil discharge section of the modified form shown in FIG. 6.

Since in the oil lubrication no injecting noise of the air generates, the projection 21 defining the sound insulating wall in the construction shown in and described with particular reference to FIG. 6 need not be employed. It is noted, however, that the projection 21 in a manner similar to FIG. 6 may be provided to allow the projection 21 to function for suppressing the amount of the oil flowing into the rolling bearing 1. The amount of the lubricant oil can be controlled by adjusting the dimensions of the gap δb, and the lubrication with a small quantity oil utilizing the attachment flow at the shoulder surface 3b of the inner ring 3, while the inner ring 3 is cooled, can be enabled. The angle α of the shoulder surface 3b of the inner ring 3 in the instance of the oil lubrication is also determined similarly by the previously discussed equation Ep. 1 employed in the instance of the air oil lubrication. Also, the angle of the nozzle 12 relative to the direction L1 of rotation may be inclined at 0° or at a slight angle in a direction counter to the raceway surface 3a of the inner ring 3, which is reverse to that in the instance of the air oil lubrication, so that the amount of the oil inflowing into the rolling bearing 1 will not become excessive.

Where in the instance of the oil lubrication the projection 21 is provided in the nozzle member 11, the amount of a portion of the oil discharged from the nozzle 12, which is discharged through the gap δb between the projection 21 and the shoulder surface 3b of the inner ring 3 is limited, and therefore, the need arises to reconsider the discharge of the rest of that oil. FIG. 7 illustrates one example of an oil discharge section designed in connection with the discharge of the oil. In this example, the inner peripheral surface of the outer ring spacer main body 10 is set back radially outwardly of the inner peripheral surface of the nozzle member 11 to define an oil reservoir 22 in an area between the outer ring spacer main body 10 and the inner ring spacer 5, and also, oil discharge grooves 23 and 24 are formed in an inner side surface and an outer side surface of the nozzle member 11 adjoining the outer ring spacer main body 10, which grooves 23 and 24 are communicated respectively with the oil reservoir 22 and an axially outer side of the nozzle member 11. When suction is made by means of, for example, an oil discharge pump (not shown), the oil within the oil reservoir 22 can be discharged to the outside of the bearing device through the oil discharge grooves 23 and 24 and the cutout 18 referred to previously.

Other preferred embodiments of the present invention will be described hereinafter. In the description that follows, component parts similar to those shown and described in connection with the preceding embodiments of the present invention are shown by like reference numerals and, therefore, the details thereof are not reiterated for the sake of brevity. Where only a part of the construction is described, the remaining part of the construction is to be understood as similar to that in the preceding embodiment or embodiments. The identical constructions provide the same functions and effects. It is also to be noted that it is possible not only to combine components specifically described in connection with each of the foregoing and following embodiments of the present invention, but also to partially combine two or more of the foregoing and following embodiments of the present invention.

Figure 8:
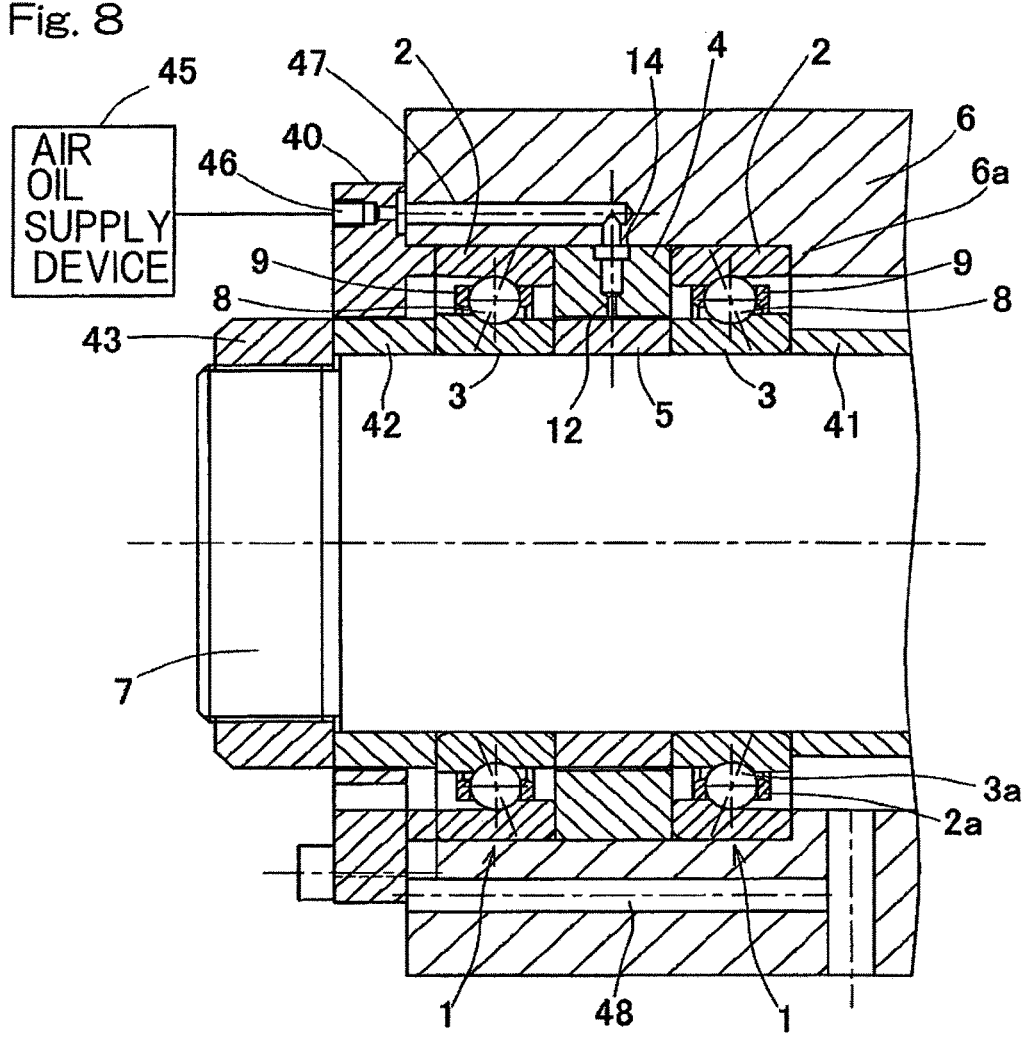
FIG. 8 is a longitudinal sectional view of the main shaft device in which the bearing device equipped with the cooling structure, which structure is designed in accordance with a second preferred embodiment of the present invention, is incorporated.

FIGS. 8 to 12 illustrates the cooling structure employed in the bearing device designed in accordance with a second preferred embodiment of the present invention. As shown in FIG. 8, even this bearing device includes axially juxtaposed rolling bearings 1 and 1, an outer ring spacer 4 and an inner ring spacer 5, and supports the main shaft 7 of the machine tool in a manner similar to those shown and described in connection with the previously mentioned first embodiment of the present invention. Component parts similar to those employed in the previously described first embodiment are shown by like reference numerals, noting that the detailed description of those similar components are not reiterated for the sake of brevity.

Figure 9:
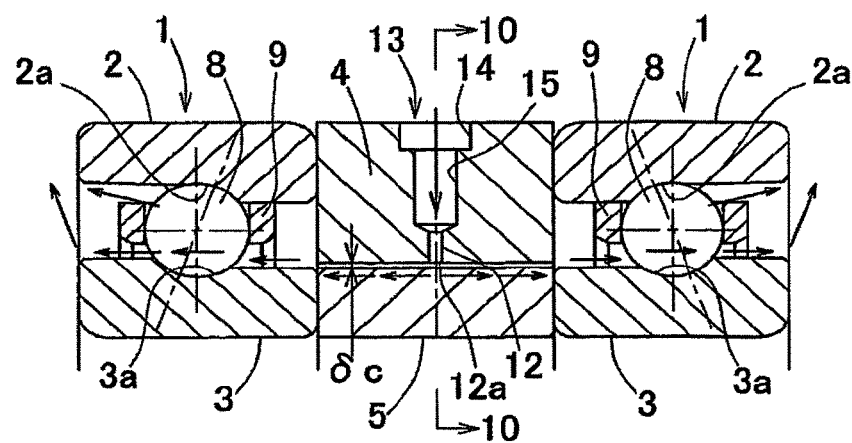
FIG. 9 is a longitudinal sectional view of the bearing device.

The second embodiment of the present invention differs from the previously described first embodiment in that, as shown in FIG. 9, the outer ring spacer 4 is made of a single member and the nozzle 12 for supplying the air oil towards the rolling bearing 1 is provided at an axially intermediate portion of the outer ring spacer 4. The discharge port 12a of the nozzle 12 opens at the inner peripheral surface of the outer ring spacer 4. The inner peripheral surface of the outer ring spacer 4 is opposed to the outer peripheral surface of the inner ring spacer 5 with a gap δc intervening therebetween.

Figure 10:
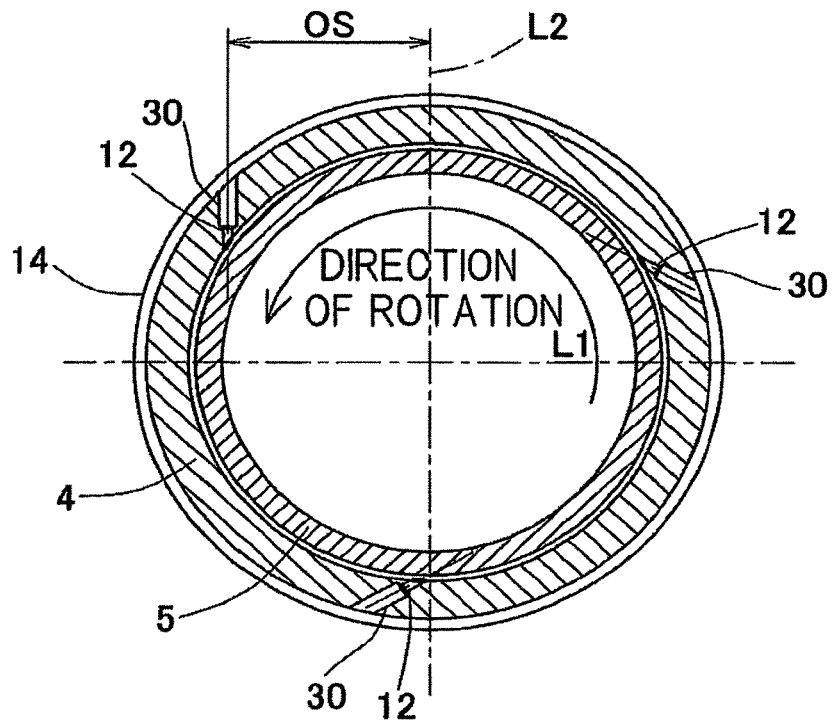
FIG. 10 is a cross sectional view taken along the line 10-10 in FIG. 9.
Figure 11:
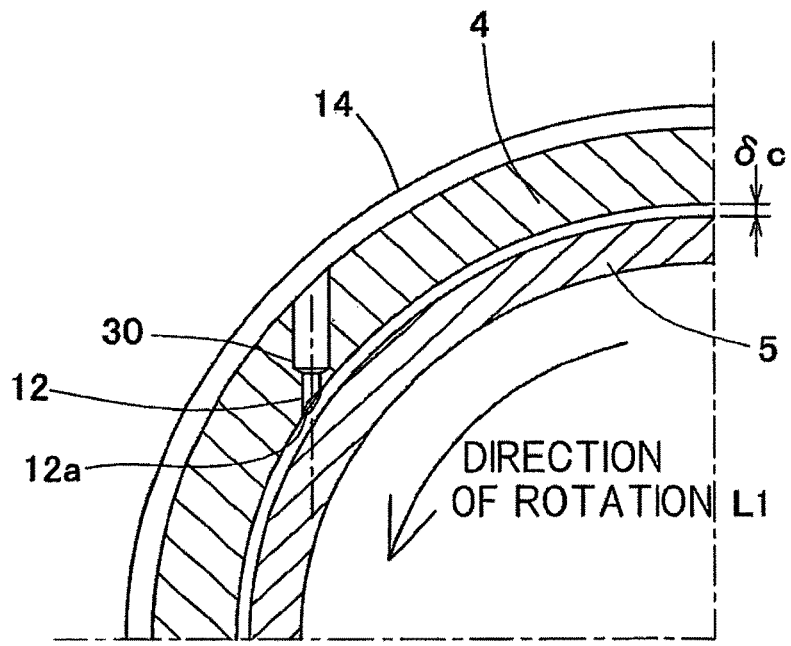
FIG. 11 a fragmentary enlarged diagram showing a portion shown in FIG. 10.

As shown in FIG. 10 and FIG. 11, which illustrates a fragmentary enlarged view thereof, the nozzle 12 is employed in a plural number, for example, three in this embodiment and those nozzles 12 are disposed having been spaced an equal distance from each other in the circumferential direction. Each of those nozzles 12 is of a straight shape and the discharge port 12a side thereof is inclined forwardly (towards the leading side) with respect to the direction L1 of rotation of the main shaft 7. In other words, each of those nozzles 12 is held at a position that is offset (the offset amount OS) from a linear line L2, which extends in an arbitrary radial direction in a section vertical to the longitudinal axis of the outer ring spacer 4, in a direction perpendicular to such linear line L2. It is to be noted that the only one nozzle 12 may be provided in the circumferential direction.

Referring to FIG. 9, the outer ring spacer 4 is provided with an introducing path 13 through which the air oil is introduced into the nozzle 12. This introducing path 13 includes an outer introducing port 14 in the form of an annular groove, which is formed in the outer peripheral surface of the outer ring spacer 4 best shown in FIG. 10, and a communicating hole 30, equal in number to the number of the nozzle 12 and fluid connecting the outer introducing port 14 and the nozzle 12 together. It is to be noted that where there is only one nozzle 12 in the circumferential direction, the outer introducing port 14 may be a counter-sunken hole. In the outer ring spacer 4 employed in the second embodiment, the cutout 18 (shown in and described with particular reference to FIG. 1), which has been shown and described as provided in the outer ring spaced 4 for the discharge of the air oil in the foregoing first embodiment, is not employed.

The bearing device of the construction described above is such that the air oil supplied from the air oil supply device 45 is discharged from the nozzle 12 after having passed through the introducing path 13 in the outer ring spacer 4. As shown by the arrow in FIG. 9, the air oil so discharged is blown onto the outer peripheral surface of the inner ring spacer 5 and then flows towards the rolling bearing 1 on both sides after having passed through the gap δc between the outer ring spacer 4 and the inner ring spacer 5, finally being discharged to the outside of the bearing through the bearing space. When the air oil flows across the bearing space, the oil contained in the air oil is deposited at various parts of the rolling bearing 1 and is thus provided for lubrication.

Also, since the air oil is blown onto the inner ring spacer 5 simultaneously with the lubrication, the inner ring spacer 5 is cooled. Since the nozzle 12 is such that the discharge port 12a side thereof is inclined forwardly with respect to the direction of rotation of the main shaft 7 relative to the radial direction of the main shaft 7, the air oil forms a swirling flow along the outer peripheral surface of the inner ring spacer 5 and then flows stably in the direction of rotation of the main shaft 7. Accordingly, heat developed on the surface of the inner ring spacer 5 can be deprived and can therefore cool it effectively. With the inner ring spacer 5 so cooled, the inner ring 3 and the main shaft 7, both held in contact with the inner ring spacer 5, can be also cooled.

Figure 12:
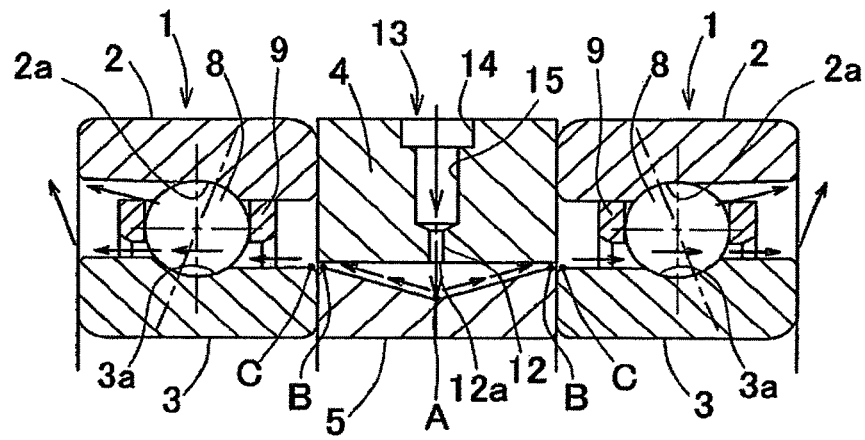
FIG. 12 is a longitudinal sectional view showing a modified form of the bearing device shown in FIG. 9.
Figure 13:
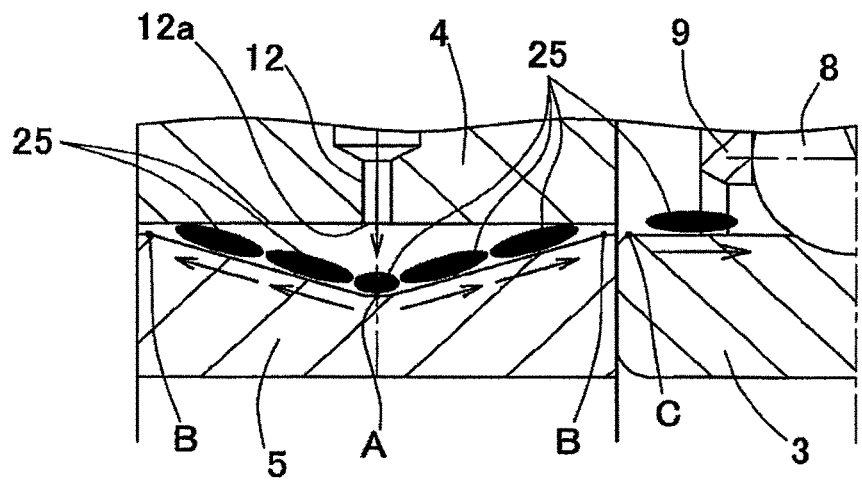
FIG. 13 is a fragmentary enlarged diagram showing a portion of FIG. 12.

FIGS. 12 and 13 illustrate a modified form of the second preferred embodiment of the present invention. In this bearing device, the outer peripheral surface of the inner ring spacer 5 is so shaped and so configured as to have a sectional shape in the form of a V-shaped inclined surface in which the outer diameter of a site A, at which the air oil discharged from the nozzle 12 is blown, is smallest and the outer diameter gradually increases from the site A towards an axially outer end B facing to the rolling bearing 1. The outer diameter of axially outer ends B and B in the outer peripheral surface of the inner ring spacer 5 are made equal to or larger than the outer diameter of an inner ring spacer side end C in the inner ring 3 of the rolling bearing 1. Accordingly, as shown in FIG. 13, oil 25 of the air oil discharged from the nozzle 12 is deposited on the outer peripheral surface of the inner ring spacer 5, and such oil 25 can be guided smoothly towards the rolling bearing 1 along the outer peripheral surface of the inner ring spacer 5 by the effect of the centrifugal force brought about by the rotation of the inner ring spacer 5.

Figure 14:
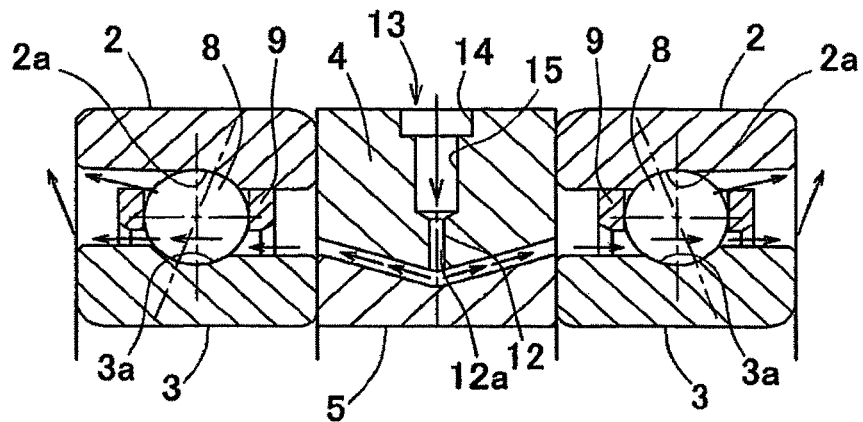
FIG. 14 is a longitudinal sectional view showing another modified form of the bearing device shown in FIG. 9.
Figure 15:
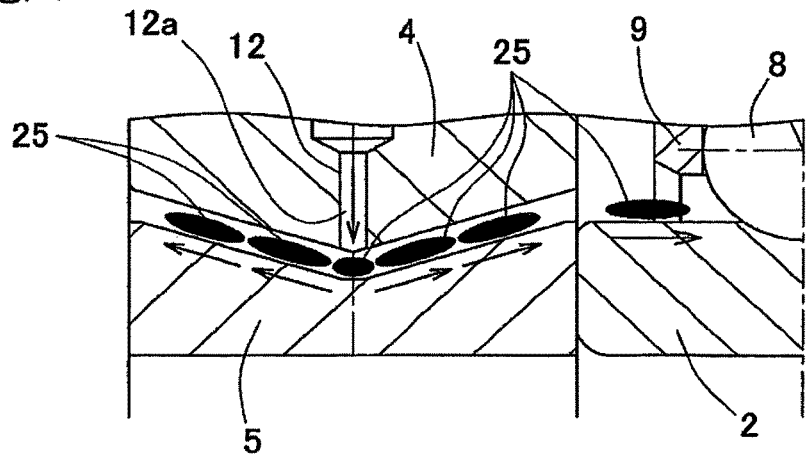
FIG. 15 is a fragmentary enlarged diagram showing a portion of FIG. 14.

Also, as in another modified example shown in FIGS. 14 and 15, the inner peripheral surface of the outer ring spacer 4 may be so shaped as to have a sectional shape similar to the shape of a mountain that is parallel to the outer peripheral surface of the inner ring spacer 5. In such case, the gap between the outer ring spacer 4 and the inner ring spacer 5 becomes narrow over the entire region in the axial direction. By so designing, the air of the air oil flows towards the rolling bearing 1 at a fast speed. By the flow of such air, the oil attaching to the outer peripheral surface of the inner ring spacer 5 flows smoothly towards the rolling bearing 1.

Figure 16:
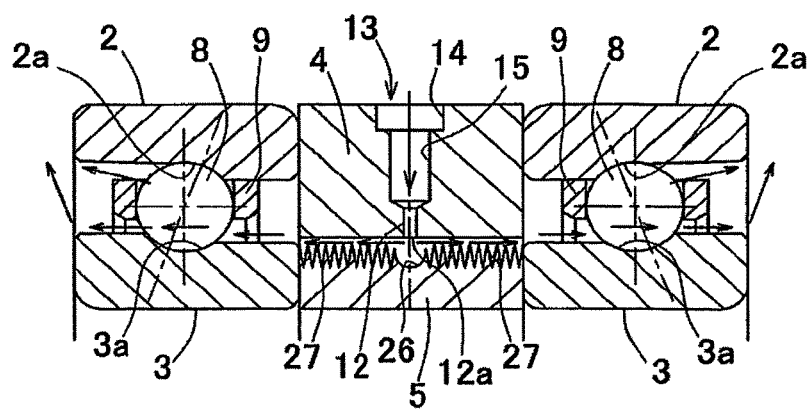
FIG. 16 is a sectional view showing a further modified form of the bearing device shown in FIG. 9.
Figure 17:
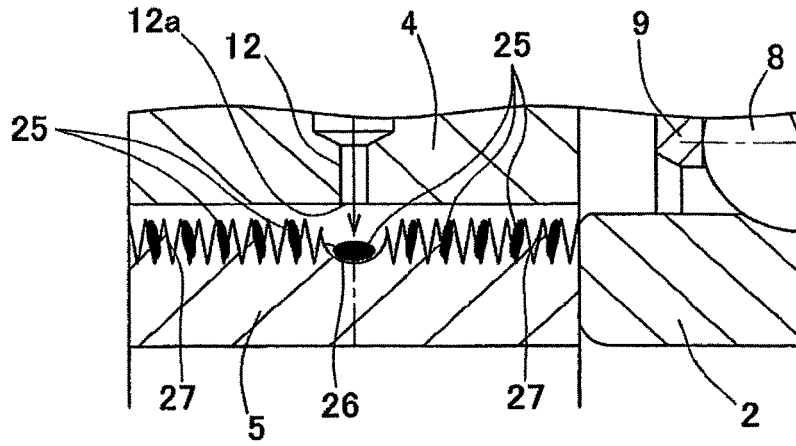
FIG. 17 is a fragmentary enlarged diagram showing a portion of FIG. 16.

FIGS. 16 and 17 illustrate a further modified example. The bearing device according to this further modified example is such that the outer peripheral surface of the inner ring spacer 5 is provided with a circumferential groove 26, which is positioned at the site onto which the air oil discharged from the nozzle 12 is blown, and spiral grooves 27 and 27 each having one end connected with the circumferential groove 26 and approaching the rolling bearing 1 as the circumferential phase displaces in the direction L1 of rotation of the main shaft 7. In this case, the oil 25 of the air oil discharged from the nozzle 12 is pooled within the circumferential groove 26 in the inner ring spacer 5, and such oil 25 is smoothly fed towards the rolling bearing 1 side along the spiral groove 27 incident to the rotation of the inner ring spacer 5. In other words, the oil 25 is fed by the utilization of an effect of a screw pump.

Figure 18:
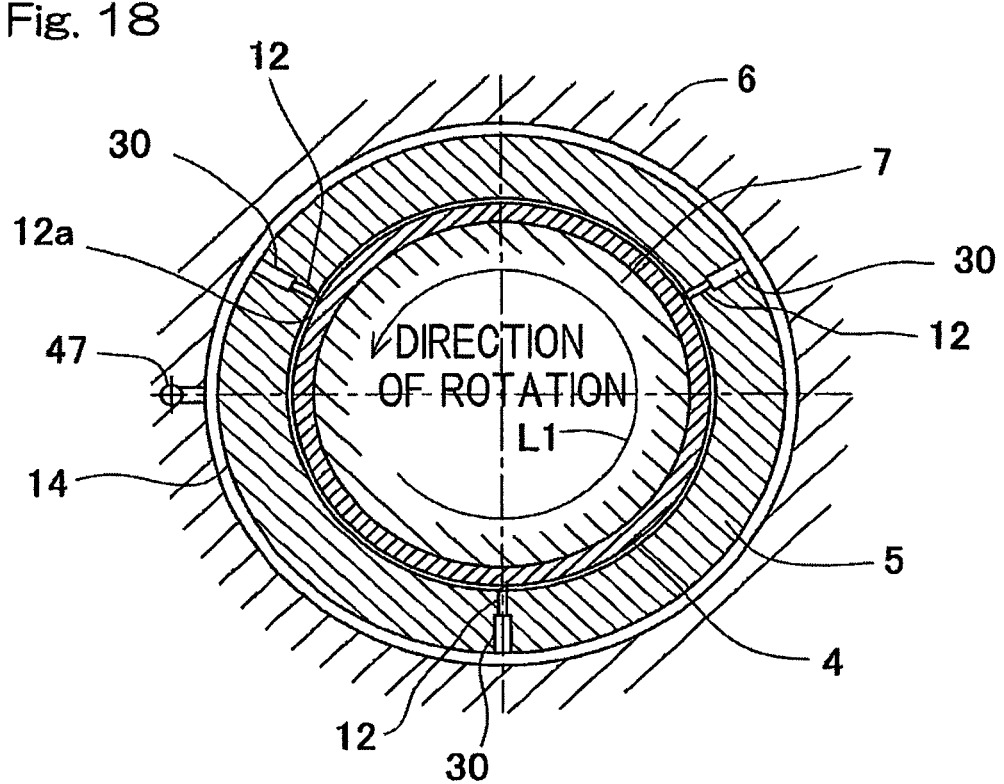
FIG. 18 is a longitudinal sectional view corresponding to the cross section taken along the line 10-10 in FIG. 9, showing the bearing device as a reference example.

Although departing from the scope of the present invention, where lubrication of the rolling bearing 1 and cooling of the bearing device and the main shaft 7 are carried out by blowing the cooling fluid such as, for example, the air oil onto the outer peripheral surface of the inner spacer 5 by means of the nozzle 12 provided in the outer ring spacer 4, as shown in FIG. 18, even though the discharge port 12a of the nozzle 12 is not inclined forwardly with respect to the direction L1 of rotation of the main shaft 7, a certain cooling effect can be obtained despite that the cooling effect is not so good as that afforded by the use of that inclined.

The cooling structure used in the bearing device designed in accordance with a third preferred embodiment of the present invention will now be described in detail with particular reference to FIGS. 19 to 24. In those figures, component parts similar to those shown in FIGS. 1 to 7 and described in connection with the first embodiment of the present invention are shown by like reference numeral and, therefore, the details thereof are not reiterated for the sake of brevity. The difference between this third embodiment and the previously described first embodiment lies in the cooling structure shown in FIG. 20. Third to sixth preferred embodiments of the present invention, which will be hereinafter described in detail, differ from the previously described first and second embodiments in that the nozzle 12A for discharging a compressed air towards the outer peripheral surface of the inner ring spacer 5 is provided in the outer ring spacer 4 to be inclined forwardly with respect to the direction of rotation relative to the radial direction of the main shaft 7 and in that a gap delimited between the inner peripheral surface of the outer ring spacer 4, where the discharge port 12Aa of the nozzle 12A exists, and the outer peripheral surface of the inner ring spacer 5 which confronts the discharge port 12Aa is so chosen as to be greater than 0.7 mm and smaller than half the diameter of the nozzle 12A.

Figure 19:
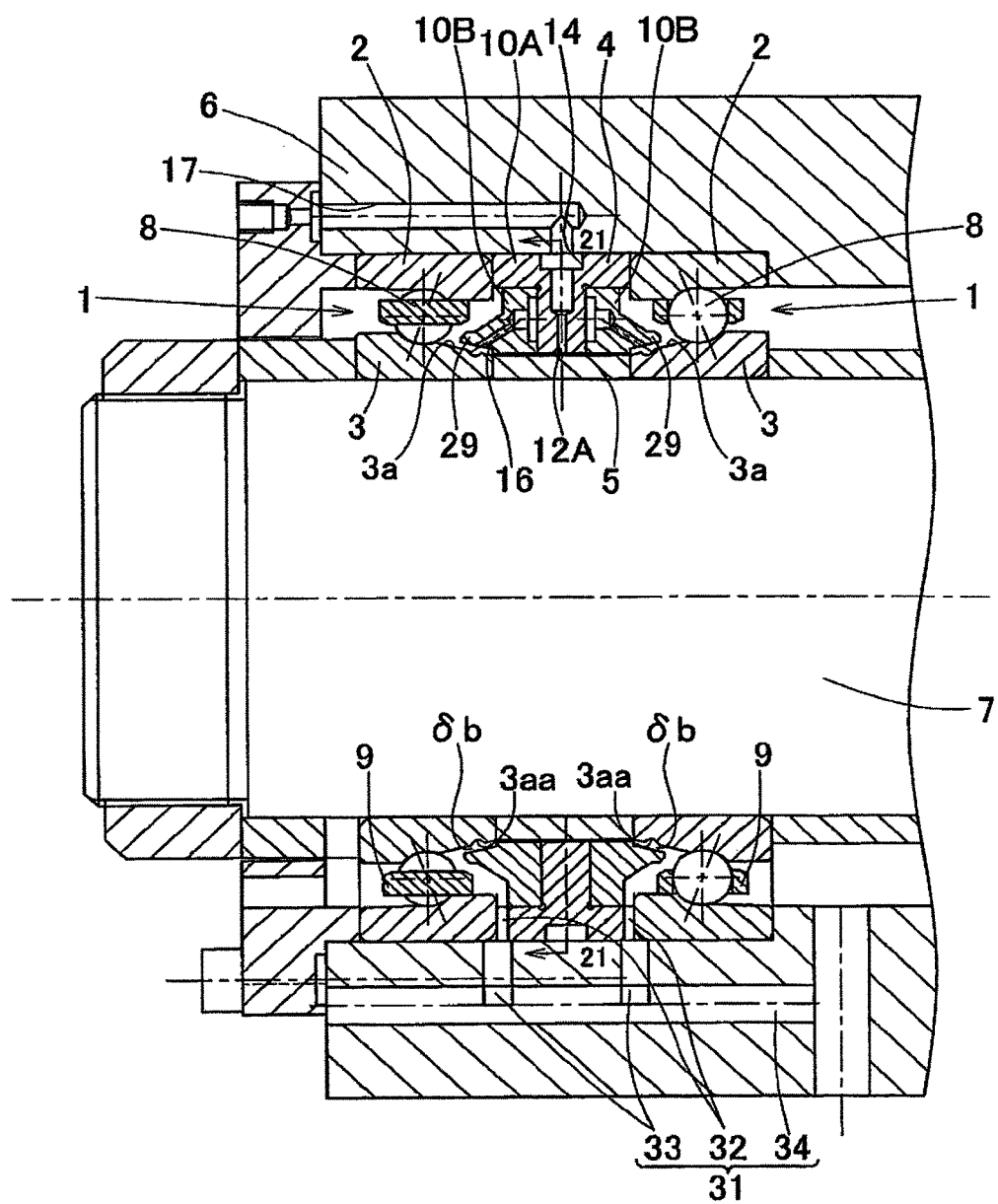
FIG. 19 is a longitudinal sectional view of the main shaft device in which the bearing device equipped with the cooling structure, which structure is designed in accordance with a third preferred embodiment of the present invention, is incorporated.
Figure 20:
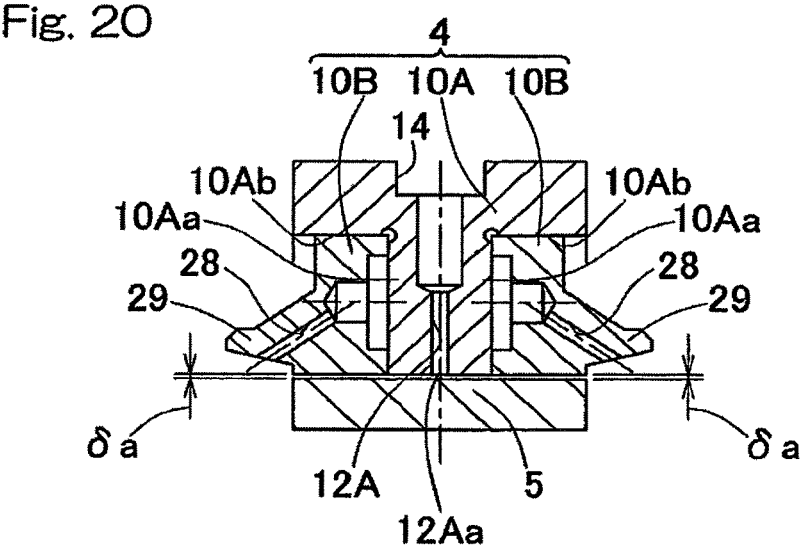
FIG. 20 is an enlarged sectional view showing a portion of the cooling structure employed in the bearing device.
Figure 21:
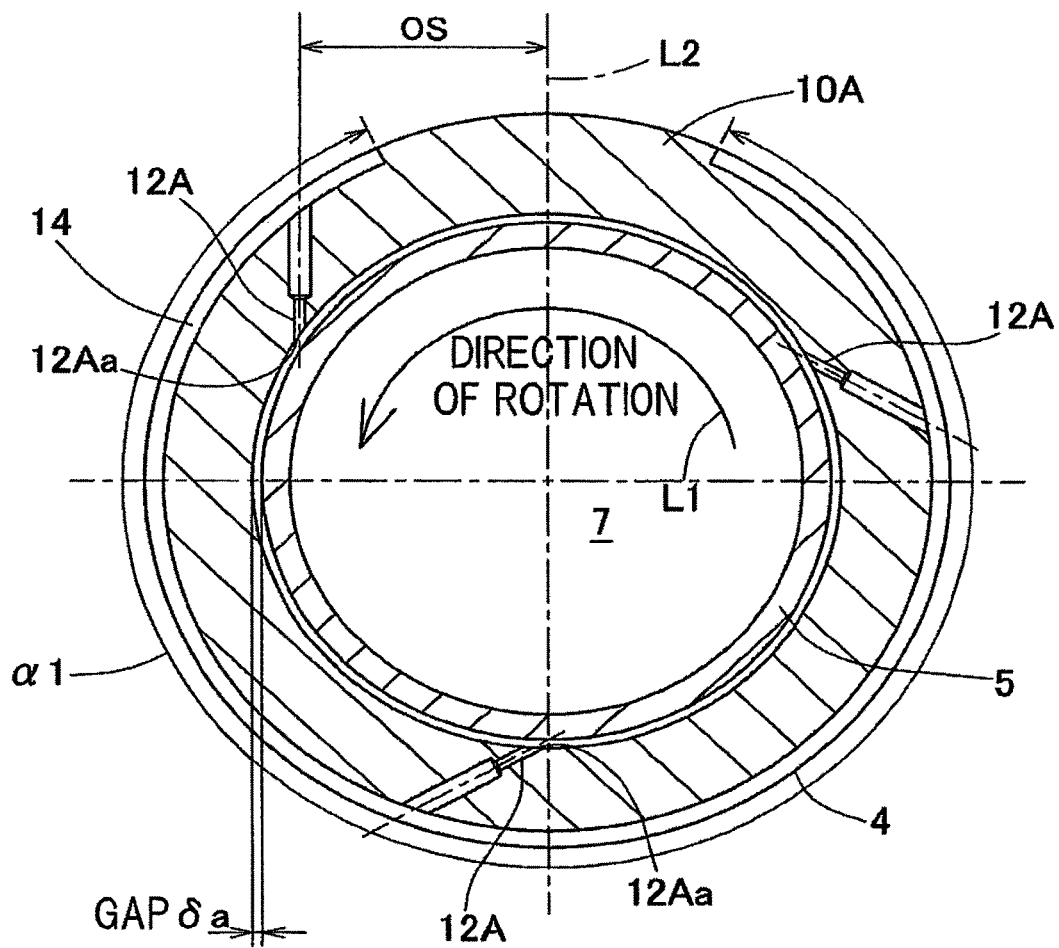
FIG. 21 is a cross sectional view taken along the line 21-21 in FIG. 19.

As shown in FIG. 20 which is an enlarged sectional view of an important portion of the cooling structure in the bearing device shown in FIG. 19, the outer ring spacer 4 employed in this embodiment includes an outer ring spacer main body 10A and lubricating nozzles 10B and 10B (as will be detailed later) which are formed separately and independently from the outer ring spacer main body 10A. The outer ring spacer main body 10A is so constructed as to have a generally T-shaped section. The ring shaped lubricating nozzles 10B and 10B are engaged in both side portions of the outer ring spacer main body 10A to be fixedly held in symmetrical relation to each other. As shown in FIG. 21, respective discharging directions of those nozzles 12A are inclined forwardly with respect to the direction L1 of rotation of the main shaft 7. The plurality of those nozzles 12A are disposed in circumferentially equidistantly displaced relation to each other. Each of the nozzles 12A may be of a straight shape and is held at a position offset from the straight line L2, which extends in an arbitrary radial direction in the section perpendicular to the longitudinal axis of the outer ring spacer 4, in a direction transverse to the straight line L2. The reason for the offset of the nozzle 12A is that the cooling effect can be improved by causing the discharged air to function as a swirling flow in the direction of rotation of the main shaft 7. The offset amount of the nozzle 12A is set to be within the range of 0.4D to 0.5D relative to the outer diametric dimension (D) of the inner ring spacer 5. This range is determined from a result of experiment so that the maximized cooling effect can be obtained.

The outer ring spacer main body 10A has its outer peripheral surface provided with an outside introducing port 14 defined therein for introducing a compressed air which is a cooling air. This outside introducing port 14 is provided at an axially intermediate portion of the outer peripheral surface of the outer ring spacer 4 and is also formed to represent an arcuate shape communicated with each of the nozzles 12A. The outside introducing port 14 is provided over an angle range α1 which occupies a large part of the circumferential direction except for a circumferential position at which an air oil supply port (not shown, but as will be described later) is provided in the outer peripheral surface of the outer ring spacer main body 10A. The introducing path for the compressed air is constituted by a path independent from the air oil for bearing lubrication use. Accordingly, as shown in FIG. 19, the cooling air supply port 17 is provided in the housing 6, and the outside introducing port 14 is communicated with the cooling air supply port 17. In an external part of the housing 6, a supply device (not shown) for supplying the compressed air to the cooling air supply port 17 is provided to be fluid connected with the latter through tubing.

Figure 83A:
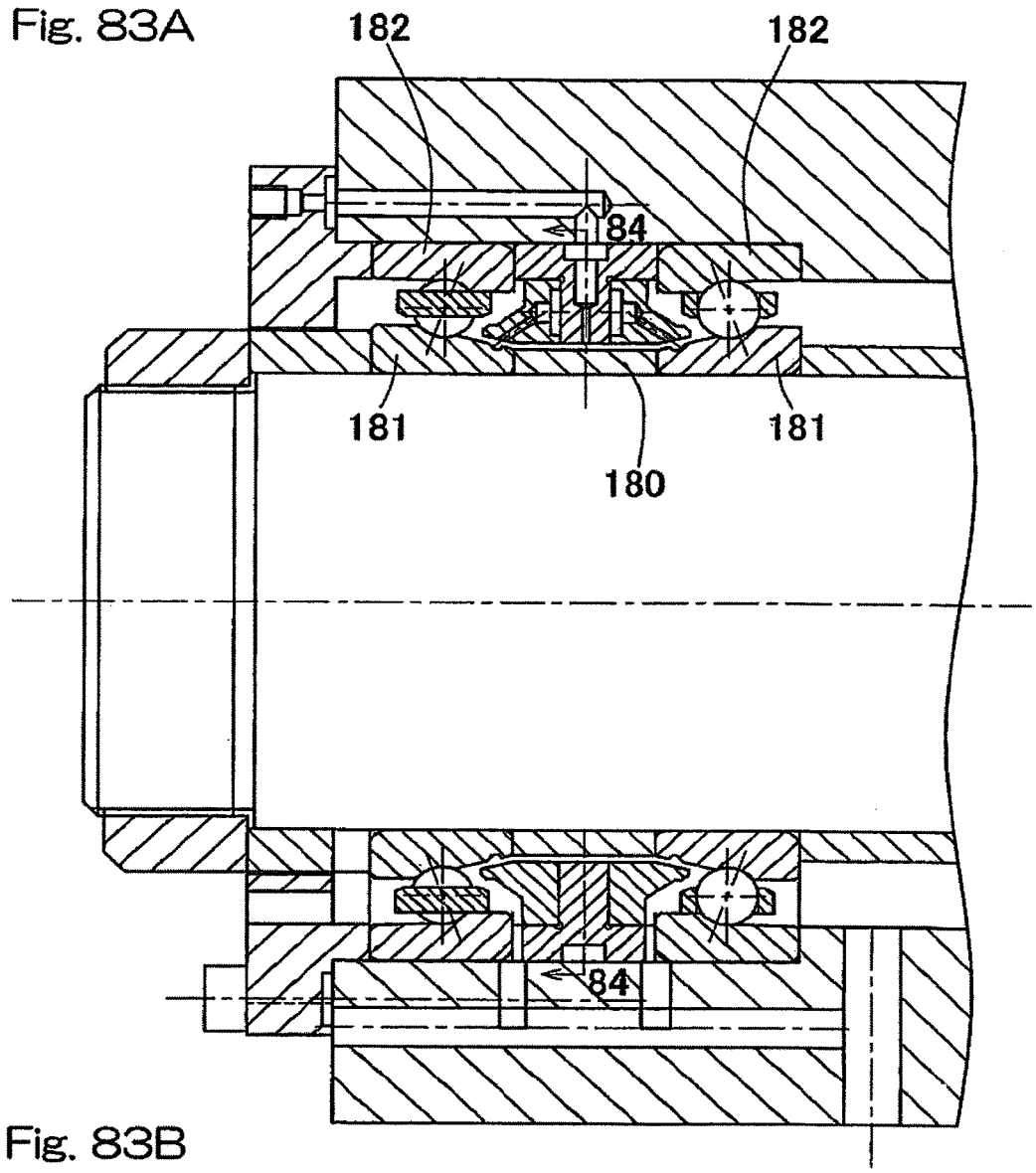
FIG. 83A is a longitudinal sectional view showing the cooling structure for the bearing device designed in accordance with the previously discussed suggested example 2.
Figure 83B:
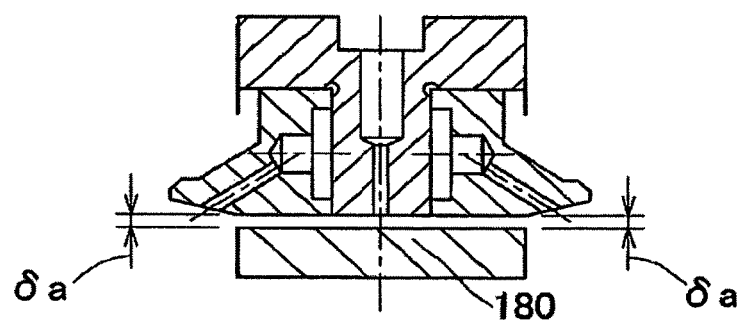
FIG. 83B is an enlarged sectional view showing a portion of the cooling structure.
Figure 84:
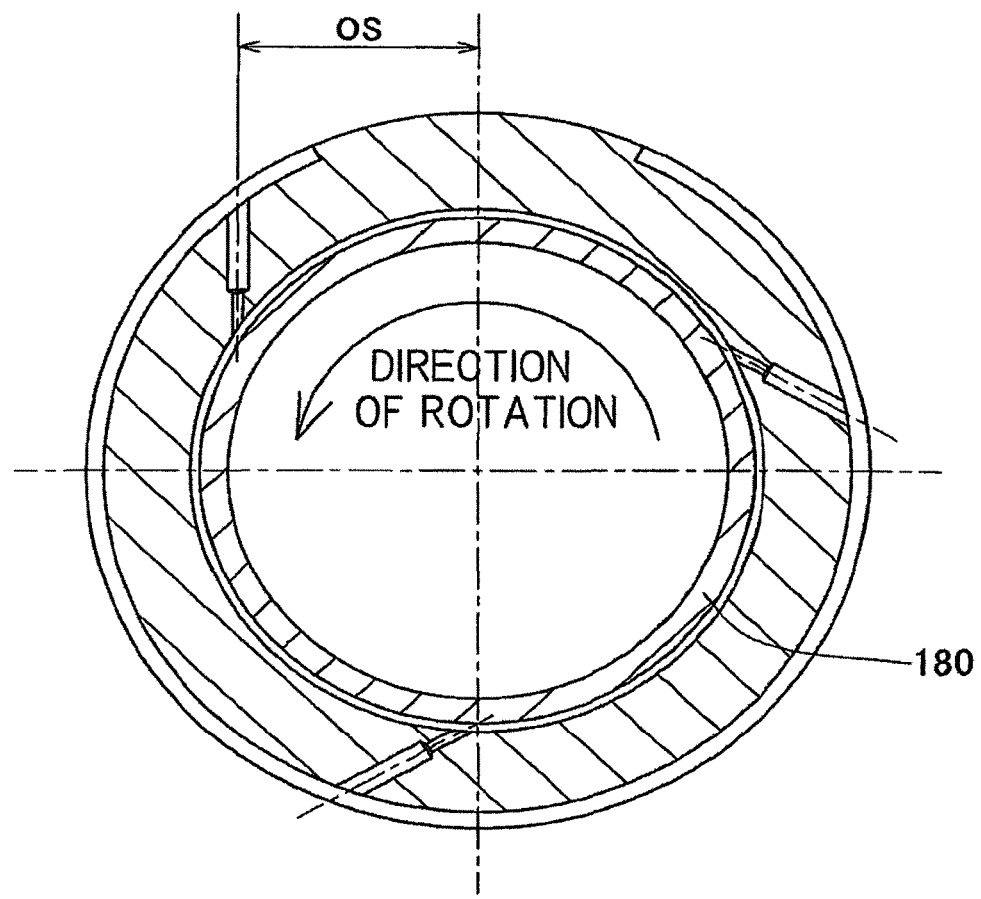
FIG. 84 is a cross sectional view taken along the line 84-84 in FIG. 83A.
Figure 85:
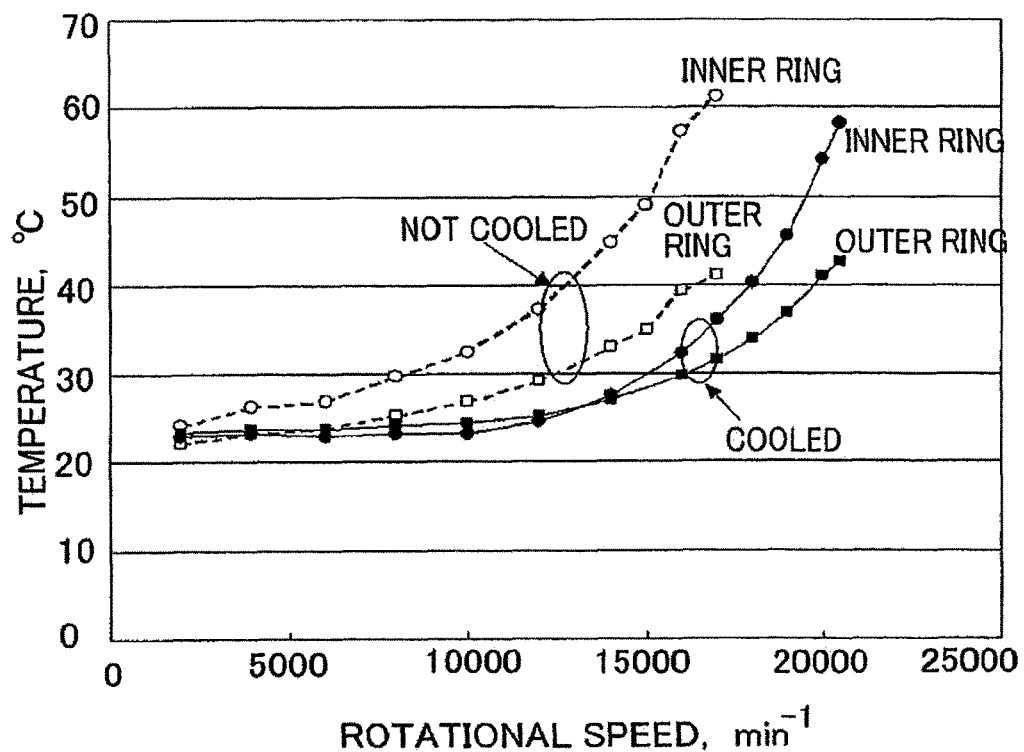
FIG. 85 is a characteristic chart showing the relationship between the rotational speed and the temperature in the bearing device, which depends on the presence or absence of cooling.
Figure 86:
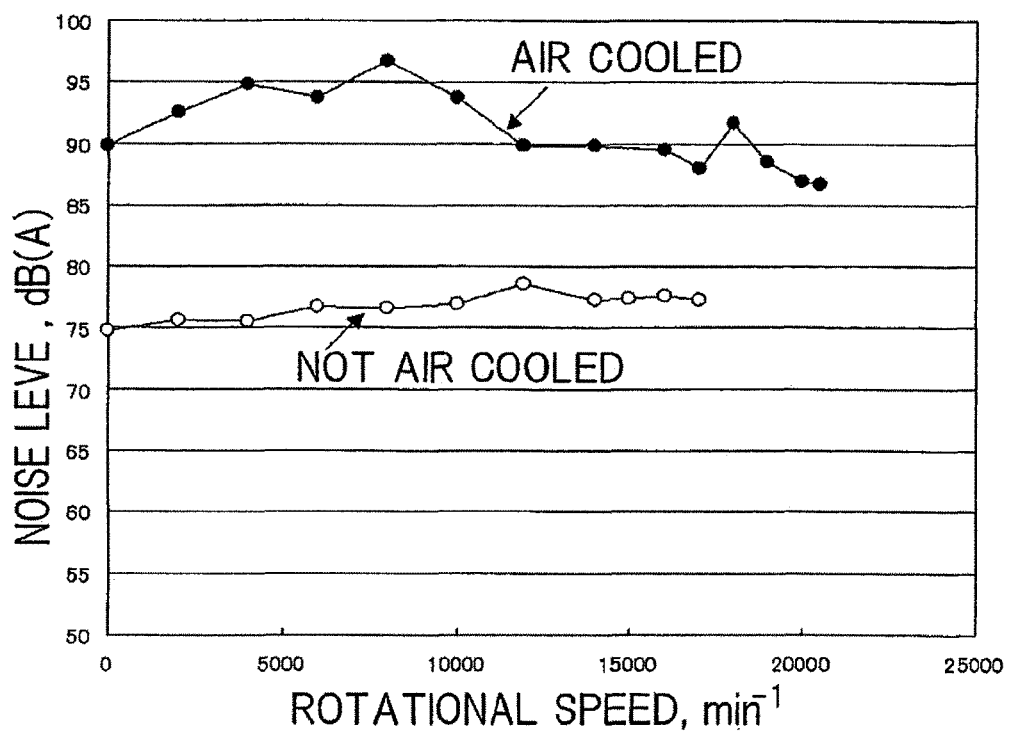
FIG. 86 is a characteristic chart showing the relationship between the rotational speed and the noise level in the bearing device, which depends on the presence or absence of cooling.
Figure 87:
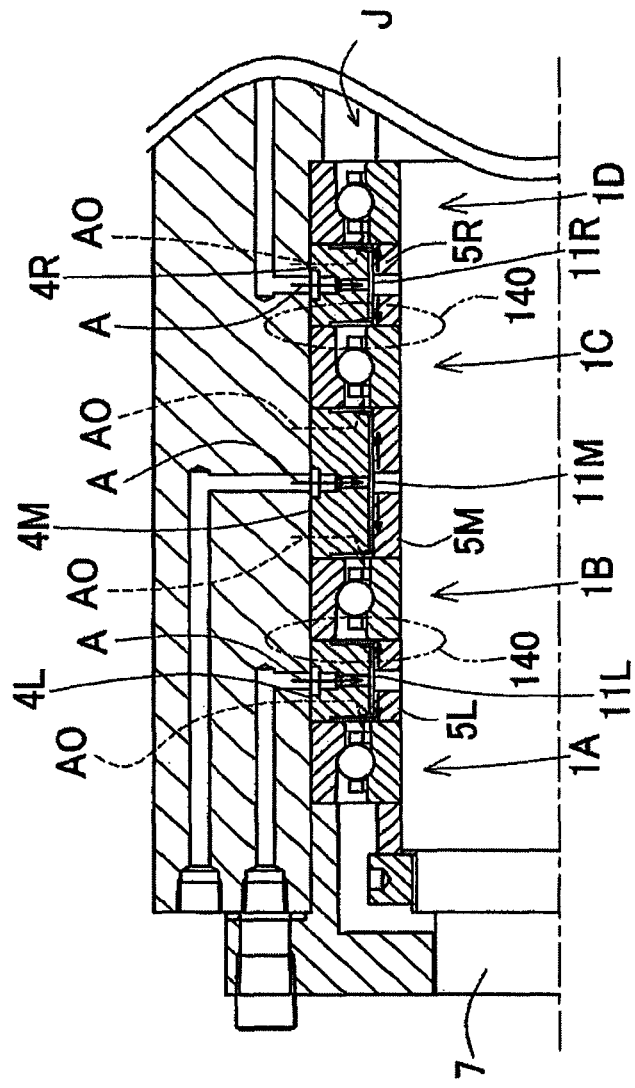
FIG. 87 is a diagram showing an upper half of the longitudinal sectional view of the main shaft device in which the bearing device equipped with the conventional cooling structure, which structure is in accordance with the suggested example 3 referred to above, is incorporated.

Means for reducing the noises or a reduced noise achieving means will now be described. A major point of this reduced noise achieving means lies in the size of a radial gap δa that is, as shown in FIG. 20, defined between the inner ring spacer 5 and the outer ring spacer 4, which includes the lubricating nozzles 10B and 10B and the outer ring spacer main body 10A. In the case of the conventional construction shown in FIG. 83B, this gap has a radius of 1 mm or greater for the convenience of, for example, the assemblability and the processing accuracy. If the air cooling is carried out with this gap made to 1.2 mm, such bearing temperatures and noise levels as shown in FIGS. 92 and 93 are resulted in. It can be understood that with the air cooling performed, the temperature drop becomes large, but the increase of the noise level brought about by the cooling air is remarked. The sound source of those noises is an injecting sound at the time the discharge takes place from a cooling air nozzle. It is assumed that this injecting sound results from an abrupt expansion of a high pressure air at a nozzle outlet portion.

Figure 22:
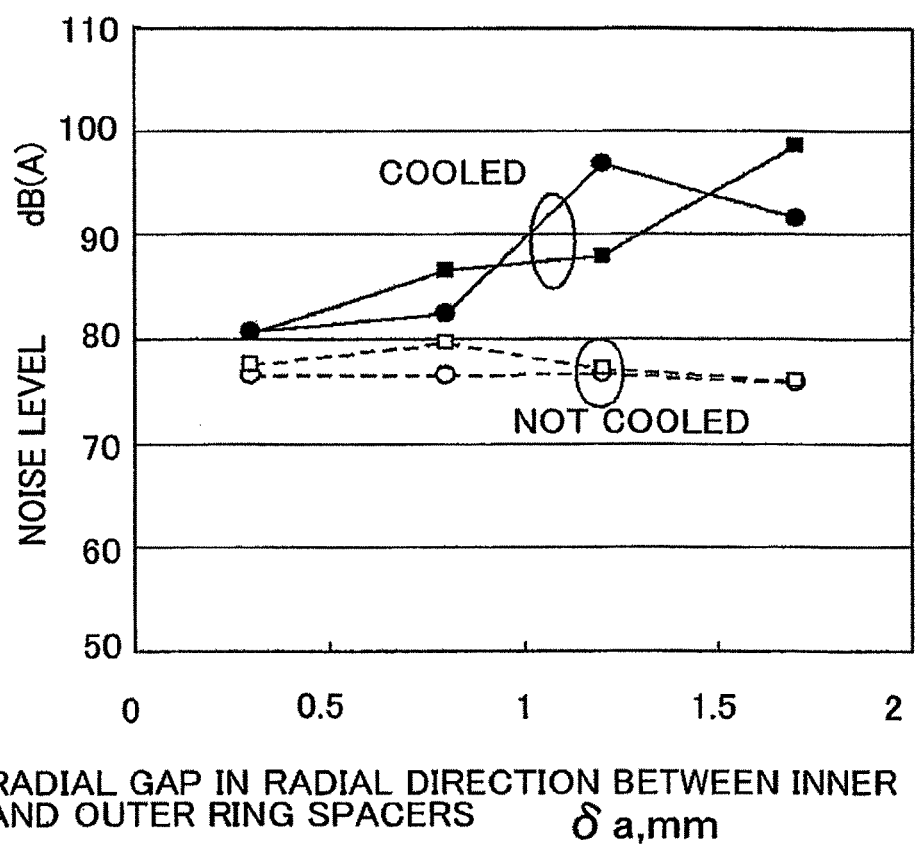
FIG. 22 is a characteristic chart showing the relationship between radial gaps of inner and outer ring spacers and noise levels.

The embodiment now under discussion is aimed at reducing the injecting sound by suppressing the abrupt pressure change at the outlet portion. More specifically, as shown in FIG. 20, the gap δa delimited between the inner ring spacer 5 and the outer ring spacer 4 is made smaller than that in the conventional construction. In other words, the radial gap δa between the inner peripheral surface of the outer ring spacer 4, where the discharge port 12Aa of the nozzle 12A exists, and the outer peripheral surface of the inner ring spacer 5, which faces the discharge port 12Aa, is so chosen as to be within the range of 0.7 mm to half the diameter of the nozzle 12A. Also, in this embodiment, the entire inner peripheral surface of the outer ring spacer 4 and the entire outer peripheral surface of the inner ring spacer 5 are so formed as to be represented by respective cylindrical surfaces. Accordingly, the entire inner peripheral surface of the outer ring spacer 4 is provided so as to radially face the outer peripheral surface of the inner ring spacer 5. FIG. 22 illustrates results of experiments conducted with the use of an angular contact ball bearing of 70 mm in inner diameter φ to determine the relationship with the noise level at the bearing rotational speed of 8,000 min$^{-1}$ and also at the bearing rotational speed of 17,000 min$^{-1}$ while the gap δa has been changed from 0.3 mm to 1.7 mm. The noise level was measured at a position aligned with the longitudinal axis of a main shaft front end and spaced the horizontal direction 45°×1 m.

In the chart of FIG. 22, data associated with white plots represent the result obtained without the cooling performed, and it will readily be seen that the influence brought about by the gap δa on the noise level is small. On the other hand, data associated with black plots in the chart of FIG. 22 represent the result obtained with the air cooling performed at the discharge pressure of 400 kPa, and it will readily be seen that reduction of the gap δa leads to reduction of the noise level. When the gap δa is 1.7 mm large, the noise level is 95 dB (A), but when the gap δa is reduced down to 0.3 mm, the noise level is reduced down to 80 dB (A). This appears to be because, when the gap δ δa is reduced, the pressure at the discharge port 12Aa of the nozzle 12A become high and the abrupt expansion of the air is therefore suppressed. In such case, it is suspected that the size of the gap δa relative to the diameter of the nozzle 12A appears to affect the pressure distribution at the nozzle outlet port.

From the foregoing consideration and experimental result, in order to effectively suppress the air injecting sound, it appears that the gap δa should be of a size smaller than half the diameter of the nozzle 12A. It is, however, to be noted that the optimum value of the size of the gap δa should be determined with due considerations paid to, for example, the air flow required for cooling and its discharge, problems associated with contact occurring during the operation or the like. According to the result of experiments described below, it is recommended that the gap δa should be of a size greater than 0.7 mm in radius. If it be smaller than 0.7 mm, no required passage surface area can be obtained and the quantity of the cooling air will decrease, and it has, therefore, been ascertained the cooling effect will be lowered.

Figure 23:
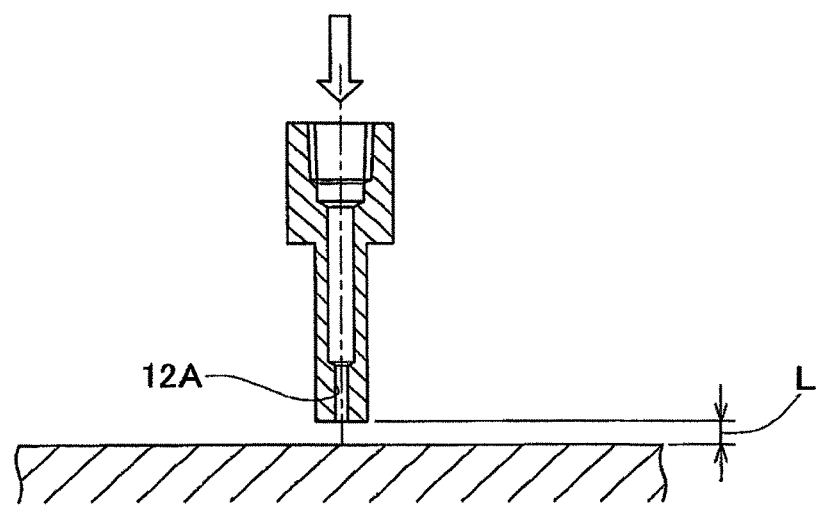
FIG. 23 is a longitudinal sectional view used to explain a testing method for examining the relationship between the noise level and the distance from a nozzle end of the cooling structure.

FIG. 23 illustrates a diagram used to explain a method of testing the relationship between the noise and the distance from the nozzle end of the cooling structure according to the embodiment of the present invention now under discussion. Test conditions used during the test is as follows (equally applicable to the test shown in FIG. 29). It is to be noted that the distance from the nozzle end (tip of the discharge port) to an injection surface is expressed by L.

Diameter of the nozzle discharge port: φ 2 mm, single
Air supply pressure: Constant at 300 kPa
Noise measurement position: 500 mm spaced horizontally from the nozzle end (tip of the nozzle discharge port)

Figure 24:
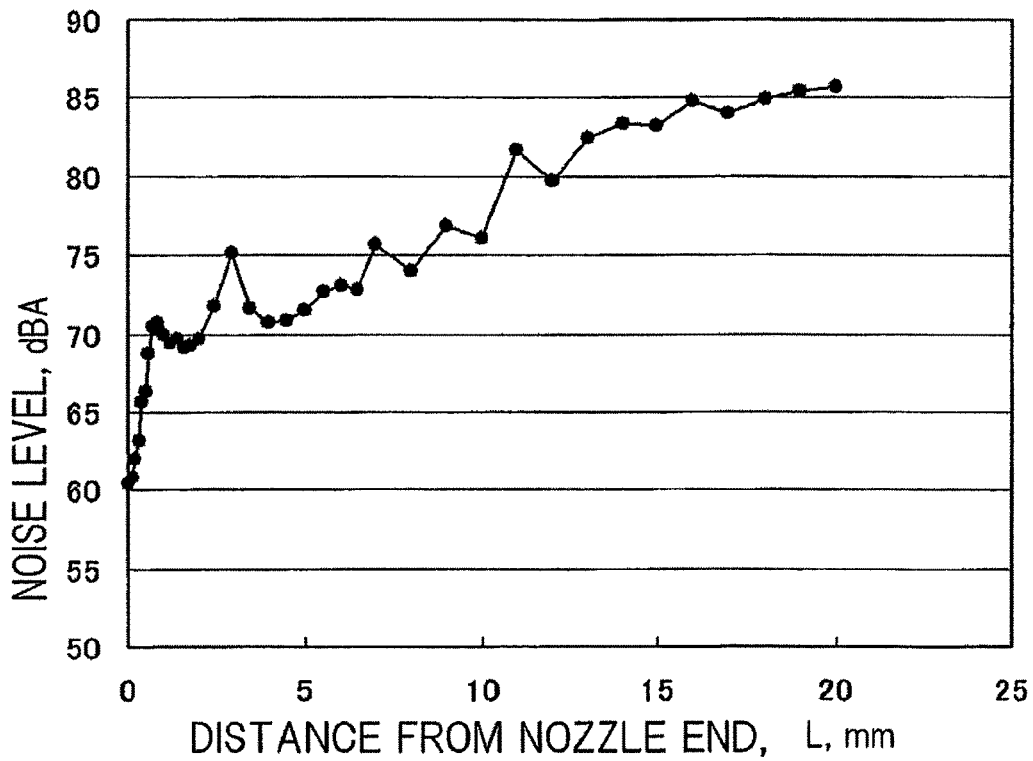
FIG. 24 is a characteristic chart showing the relationship between the noise level and the distance from the nozzle end of the cooling structure.

FIG. 24 illustrates a characteristic chart showing the relationship between the noise and the distance L from the nozzle end of this cooling structure. According to the chart shown in FIG. 24, it will readily be understood that the noise generally increases in proportion to the distance from the nozzle end. In other words, in order to reduce the noise, it is effective to reduce the distance between the nozzle end and the injection surface as small as possible. In the cooling structure according to the embodiment of the present invention now under discussion, the distance (gap) between the inner peripheral surface of the outer ring spacer, where the discharge port of the nozzle exists, and the outer peripheral surface of the inner ring spacer opposed to the discharge port varies due to the centrifugal force developed during the operation and the inner ring spacer expansion quantity resulting from the temperature rise. Therefore, it will readily be seen that the distance (gap) is preferably of an approximate size at which no contact take place between the inner and outer ring spacers, the most effective reduction of the noise can be accomplished.

It is, however, to be noted that, in the chart of FIG. 24, when the distance from the nozzle end is smaller than 0.7 mm, it appears that a tendency for a discharge resistance to reduce the air quantity arises. Accordingly, in the present invention which is aimed at cooling, the distance from the nozzle to the inner ring spacer is desired to be reduced to a value as small as possible while the required air quantity is secured. In view of this, it can be said that for the distance from the nozzle end to the injection surface, selection of the value greater than 0.7 mm at which the contact problem during the operation and the problem associated with the reduction in cooling effect can be avoided appears to be reasonable.

The lubricating structure will now be described in detail. As shown in FIG. 19, the outer ring spacer 4 includes the lubricating nozzles 10B and 10B for supplying the air oil into the bearing. Each of those lubricating nozzles 10B is so formed as to protrude into the bearing space with its tip end portion 29 confronting an inner ring diametric surface 3a through an annular gap δb for the passage of the air oil. In other words, the tip end portion 29 of the lubricating nozzle 10B is so disposed within the bearing space as to overhang the inner ring outer diametric surface 3a. Also, the tip end portion of the lubricating nozzle 10B, which protrudes into the bearing space, is disposed radially inwardly of an inner peripheral surface of the retainer 9.

As shown in FIG. 20, in the outer ring spacer main body 10A, opposite side surfaces 10Aa and 10Aa and inner peripheral surfaces 10Ab and 10Ab, all of which are contact surfaces with the lubricating nozzles 10B, are all subjected to a grinding process. Respective corner portions of each side surface 10Aa and the inner peripheral surface 10Ab are provided with indents for grinding. The grinding process is also applied to an inner side surface and an outer peripheral surface of each lubricating nozzle 10B. Also, an abutting surface of each lubricating nozzle 10B, which contacts with the side surface 10Aa, is provided with an annular sealing member (not shown) for avoiding an air oil leakage.

The outer ring spacer main body 10A is provided with an air oil supply hole (not shown) communicated with each of the lubricating nozzles 10B and 10B. Each air oil supply hole is formed radially inwardly a predetermined depth from the outer peripheral surface of the outer ring spacer main body 10A and is communicated with the lubricating nozzle 10B in the vicinity of a hole bottom portion. An air oil supply port 28 within each lubricating nozzle 10B is formed in the shape of a throughhole inclined at angle so as to gradually reach an inner diametric side from a base end side towards a bearing side which is a target. Each air oil supply port 28 employed in this embodiment is inclined at such an angle of inclination that, as shown in FIG. 19, the air oil discharged under a predetermined from the tip end portion 29 of the lubricating nozzle 10B can be discharged into an annular recessed portion 3aa in the inner ring outer diametric surface 3a. At a position of the inner ring outer diametric surface 3a which confronts the tip end portion 29 of the lubricating nozzle 10B, there is provided an annular gap δb. This annular gap δb is so defined as described subsequently. The annular gap δb is so defined that the radial sectional surface area of the annular gap δb formed between the inner ring outer diametric surface 3a and the inner peripheral surface of the tip end portion 29 may become larger than the total sectional surface area of the nozzle 12A in the outer ring spacer 4.

A bearing box supply hole (not shown) for the air oil is provided in the housing 6, and the air oil supply hole is communicated with this bearing box supply hole. In the outside of the housing 6, an air oil supply device, not shown, for supplying the air oil to the bearing box supply hole is provided to be fluid connected with the latter by means of tubing. During the operation, the air oil supplied from the air oil supply device is discharged sequentially through the bearing box supply hole→the air oil supply hole→the air oil supply port 28 and finally through the inner ring outer diametric surface 3a. The air oil deposited on the inner ring outer diametric surface 3a is utilized for lubrication of the bearing by introducing it to the raceway surface of the inner ring 3 by the utilization of the surface tension of the oil and the centrifugal force.

A discharging structure will be described subsequently. In this bearing deice, an air oil outlet port 31 for discharging the air oil is provided. The air oil outlet port 31 includes an outlet groove 32, provided in a portion of the outer ring spacer main body 10A in the circumferential direction, a bearing box outlet groove 33, which is formed in the housing 6 and communicated with the outlet groove 32, and a bearing box outlet hole 34, which is formed in the housing 6 and communicated with the bearing box outlet groove 33. The outlet groove 32 in the outer ring spacer 4 is formed over a circumferential position, which is diagonal to the position where the air oil supply hole is provided, and is communicated with the bearing box outlet hole 34, extending axially, via the bearing box outlet groove. Air and oil both provided for lubrication of the bearing 1 are discharged to the outside axially through the bearing space and also discharged to the outside through the outlet groove 32 by way of a path that is defined by the bearing box outlet groove 33 and the bearing box discharge hole 34. Also, in this embodiment, a discharge path for the air oil and an outlet path for the cooling air are communalized, and the cooling air, after having cooled the inner ring spacer 5, is discharged from the air oil outlet port 33.

Functions and effects will be discussed hereinafter. With the use of the inner ring spacer 5 and the outer ring spacer 4 and by discharging a compressed air by means of the nozzle 12A, provided in the outer ring spacer 4, onto the outer peripheral surface of the inner ring spacer 5, the cooling of the bearing can be accomplished indirectly. Since the nozzle 12A for the compressed air, provided in the outer ring spacer 4, is inclined forwardly with respect to the direction L1 of rotation, the compressed air for cooling purpose is blown from the cooling air supply hole 17, provided in the housing 6, onto the outer peripheral surface of the inner ring spacer 5 through the nozzle 12A. Accordingly, the compressed air becomes a swirl flow at an annular gap portion, defined between the outer peripheral surface of the inner ring spacer 5, and the inner peripheral surface of the outer ring spacer 4, thus cooling the inner ring spacer 5. As a result, the inner ring 3, which is fixed in contact with an end surface of the inner ring spacer 5, is cooled through thermal conduction. The compressed air is, after having cooled the inner ring spacer 5 and the main shaft 7 and others, discharged to the bearing outside after having passed within the bearing space, and at this time cooling of the rolling bearing 1 is simultaneously performed. Thus, with the use of the compressed air, the bearing can be efficiently and reasonably cooled.

The $\delta a$ delimited between the inner peripheral surface of the nozzle 12A, where the discharge port 12Aa exists, and the outer peripheral surface of the inner ring spacer 5 which confronts the discharge port 12Aa is so chosen as to be of a size smaller than half the diameter of the nozzle 12A. Therefore, the injection noise can be reduced by increasing the pressure of the discharge port 12Aa of the nozzle 12A to thereby suppress the abrupt expansion of the air, as compared with the conventional case in which the cooling is accomplished with the use of the compressed air. It has been ascertained as a result of a series of experiments that when the gap $\delta a$ is of a size greater than 0.7 mm in radius, the noise reducing effect can be sustained together with the cooling effect. It has also been ascertained that if, however, the gap $\delta a$ is smaller than 0.7 mm, the required passage surface area will no longer be obtained and the cooling air amount decrease and, therefore, the cooling effect tends to be lowered.

Accordingly, without the bearing device to be of a complicated structure, the temperature of the bearing 1 and the main shaft 7 can be reduced with no need to use any expensive accessory equipments, and also the noises to the outside can be reduced. Thanks to the capability of reducing the bearing temperature during the operation, an increase of the bearing preload can be relieved and a further increase of the speed, that is, the machining efficiency or extension of the bearing life can be accomplished. As a result of the reduction of the bearing temperature during the operation, the initial preload can be increased by a quantity in which the increase of the bearing preload is relieved, and therefore, the main shaft rigidity at a low speed can be increased and also, it can be expected to increase the machining accuracy. The main shaft temperature decreases during the operation, and deterioration in processing accuracy resulting from the thermal expansion of the main shaft 7 can be reduced.

Since the nozzle 12A is in the form of a straight and is offset as hereinbefore discussed, the nozzle 12A is oriented in a tangential direction of a main shaft surface and also in a rotational direction. The larger the offset amount of the nozzle 12A, the more possible to increase the descend of the inner ring temperature. The air oil discharged from the lubricating nozzle 10B is deposited on the inner ring outer diametric surface 3a and, by the utilization of the surface tension of the oil and the centrifugal force, the oil so deposited is introduced into the raceway surface of the inner ring 3 for lubrication of the bearing. Also, since the tip end portion 29 of the lubricating nozzle 10B is disposed radially inwardly of the inner peripheral surface of the retainer 9, the interference can be avoided between the lubricating nozzle 10B and the retainer 9, and also the lubricant oil discharged can be used for lubrication of the retainer 9 through the inner ring outer diametric surface 3a and the raceway surface.

Figure 25:
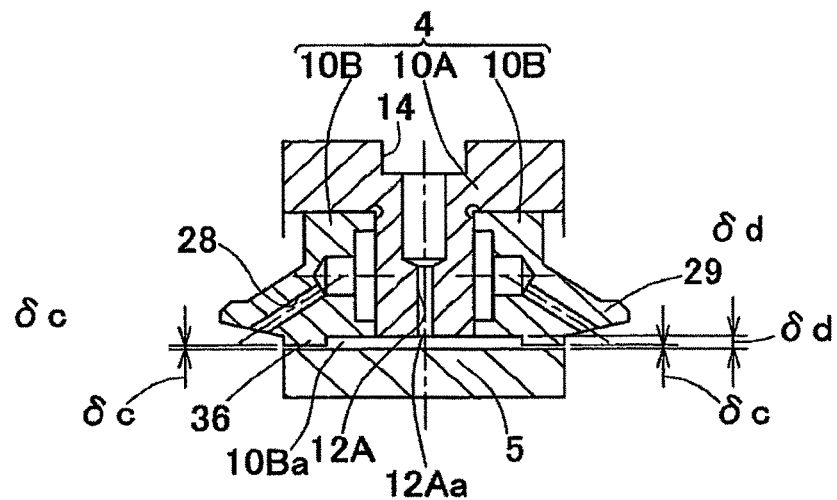
FIG. 25 is an enlarged longitudinal sectional view of the cooling structure for the bearing device designed in accordance with a fourth preferred embodiment of the present invention.

As is the case with a fourth preferred embodiment of the present invention shown in FIG. 25, a portion of the outer ring spacer 4, that is, axially opposite side portions of the discharge port 12Aa of the nozzle 12A may be provided with radially inwardly protruding recessed portions 36 and 36, respectively. Thanks to those projecting portions 36 and 36, the leakage of noise to the outside is suppressed by interrupting the air injection noise from the nozzle 12A. In this embodiment, an axially outer side portion of an inner diametric portion of each lubricating nozzle 10B in the outer ring spacer 4 are provided with the projecting portion 36 that protrudes radially inwardly. This projecting portion 36 is disposed axially inwardly of a tip end portion of the air oil supply port 28. In the inner diametric portion of each lubricating nozzle 10B, the inner peripheral surface 10Ba having no projecting portion 36 formed therein is continued to the inner peripheral surface of the outer ring spacer main body 10A in the generally same diameter.

Also, a gap $\delta c$ between a radially tip end portion of the projecting portion 36 and the outer peripheral surface of the inner ring spacer 5, which confronts the projecting portion 36, is smaller than a gap $\delta d$ between the inner peripheral surface of the outer ring spacer 4, where the discharge port 12Aa exists, and the outer peripheral surface of the inner ring spacer 5, which confronts the discharge port 12Aa. In other words, the gap $\delta d$ delimited between the inner ring spacer 5 and the outer ring spacer 4 at the cooling air discharge port is made relatively large so that the outlet pressure of the air will not become high.

The size of the radial gap $\delta c$ between the projecting portion 36 and the outer peripheral surface of the inner ring spacer 5 is so chosen, in consideration of the discharge of the cooling air, as to be a gap surface area which will become about ten times relative to the total sectional surface area of the nozzle 12A. This gap surface area is the product of the radial gap $\delta c$ multiplied by the circumferential length of the projecting portion 36. This is the value obtained from the result of experiments and, by adjusting the radial gap $\delta c$ within the value, a reasonable noise reduction can be accomplished without the cooling air quantity being reduced.

It is to be noted that although in the construction shown in FIG. 25, a projecting portion 36 is provided by forming a step in the inner diametric portion of the lubricating nozzle 10B, the projecting portion 36 may be provided with no step so formed. In other words, the radial gap $\delta c$ may be constructed over the entire width in which the inner diametric surface of the lubricating nozzle 10B and the inner ring spacer 5 are opposed to each other, and the axial length of the projecting portion 36 may be increased as compared with that in the construction shown in FIG. 25. In this case, there is no need to perform a step forming process on the inner diametric portion of the lubricating nozzle 10B, and the number of process steps can be reduced. Although in FIG. 25 the projecting portion 36 has been shown and described as formed in the outer ring spacer 4, conversely an annular projecting portion that protrudes radially outwardly may be provided on the axially opposite side portion of the outer peripheral surface of the inner ring spacer 5. Even in this case, effects similar to those afforded by the previously described third embodiment of the present invention shown in FIG. 19 can be obtained.

Figure 26:
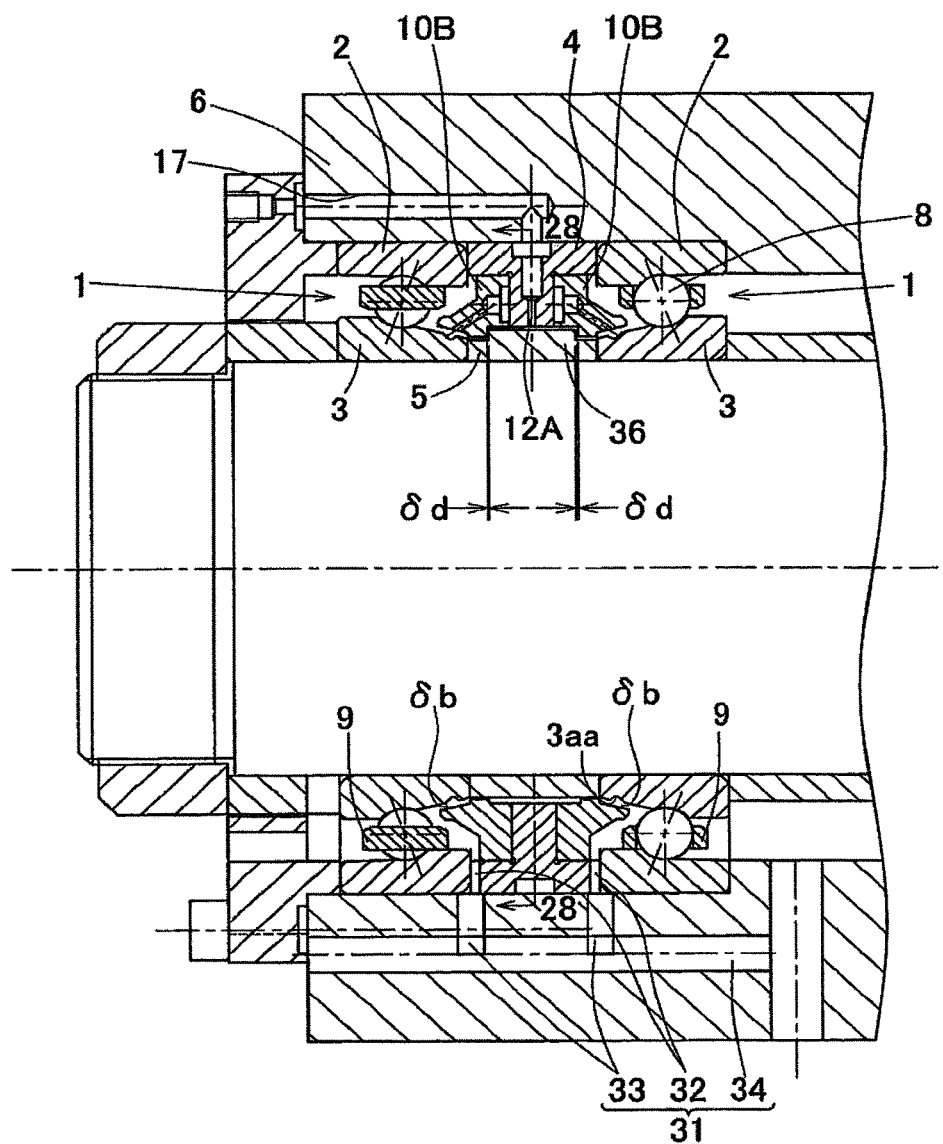
FIG. 26 is a sectional view showing a portion of the cooling structure in the bearing device, which is partially modified.
Figure 27:
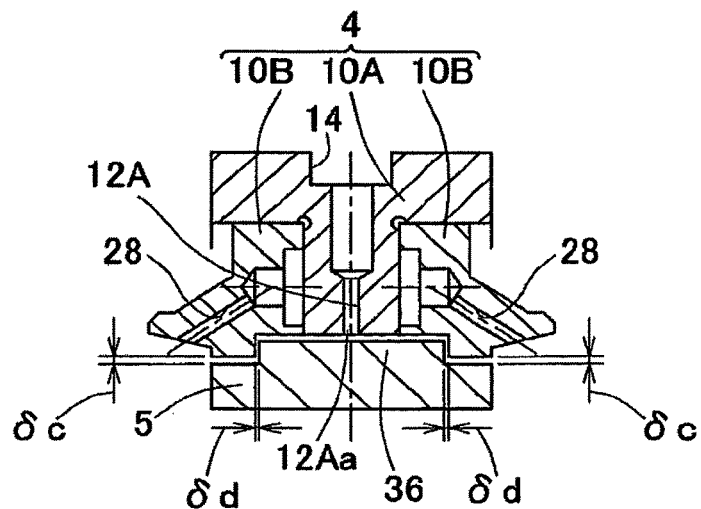
FIG. 27 is an enlarged sectional view showing a portion of the cooling structure in the bearing device.
Figure 28:
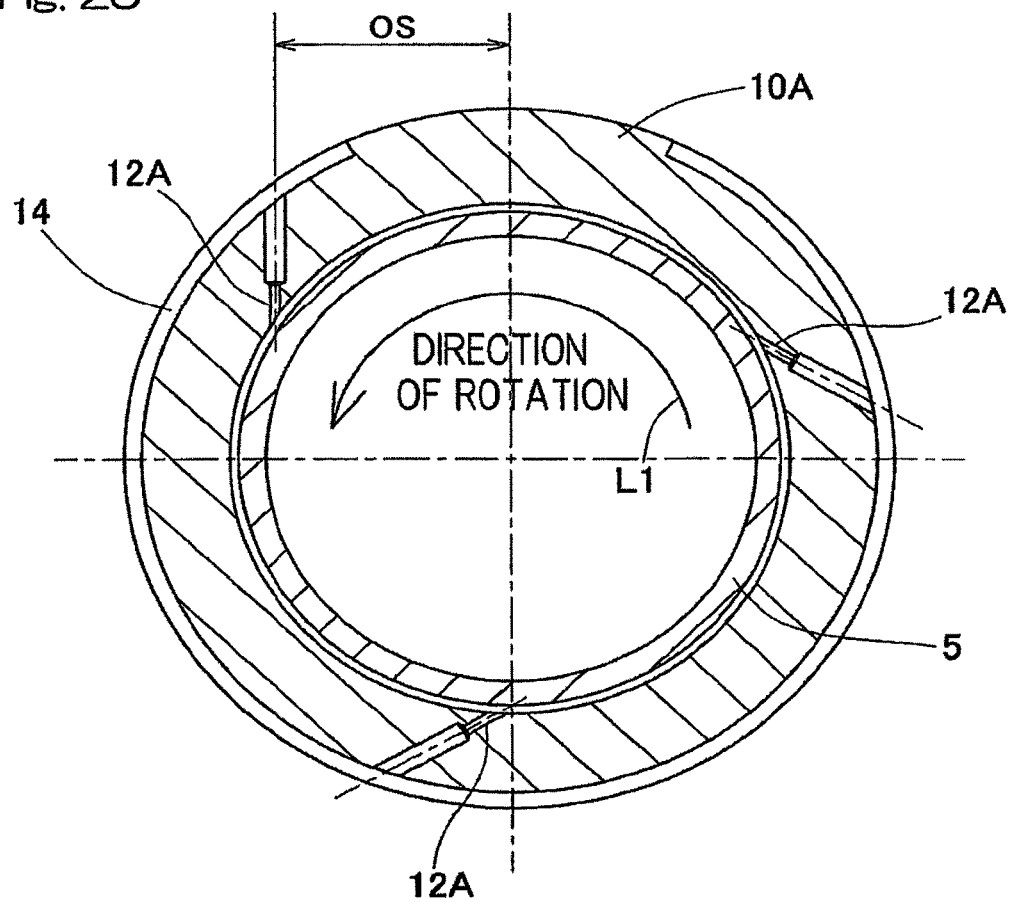
FIG. 28 is a cross sectional view taken along the line 28-28 in FIG. 26.

As shown in FIGS. 26 and 27, the projecting portion 36 may be provided at a widthwise intermediate portion in the outer peripheral surface of the inner ring spacer 5, in which case an axial gap $\delta d$ is provided between the axially opposite side surfaces of the projecting portion 36 and the inner end surface of the lubricating nozzle 10B. The size of the axial gap $\delta d$ is rendered to define the gap surface area which is about 10 times relative to the total sectional surface area of the nozzle 12A in consideration of the discharge of the cooling air, as is the case with the previously described radial gap $\delta c$. Since the minimum sectional surface area in this gap surface area is formed in the innermost diametric portion within the range having an axial minute gap, the gap surface area having the circumferential length of this innermost diametric portion multiplied by the axial gap $\delta d$ may be used as reference. FIG. 28 is a cross sectional view taken along the line 28-28 in FIG. 26. Even in the construction shown in and described with reference to FIGS. 26 and 27, as is the case with the previously described third embodiment of the present invention, as shown in FIG. 28, the nozzle 12A is inclined forwardly with respect to the direction of rotation, and the position of the nozzle 12 is offset (this is equally applicable also to FIG. 25). According to this construction, since the axial gap δd and the radial gap δc are employed, the injection noise can be stepwise reduced in the axial gap δd and the radial gap δc and, therefore, as compared with the construction shown in and described with particular reference to FIG. 25, the injecting noise insulating effect can be further increased.

Figure 29:
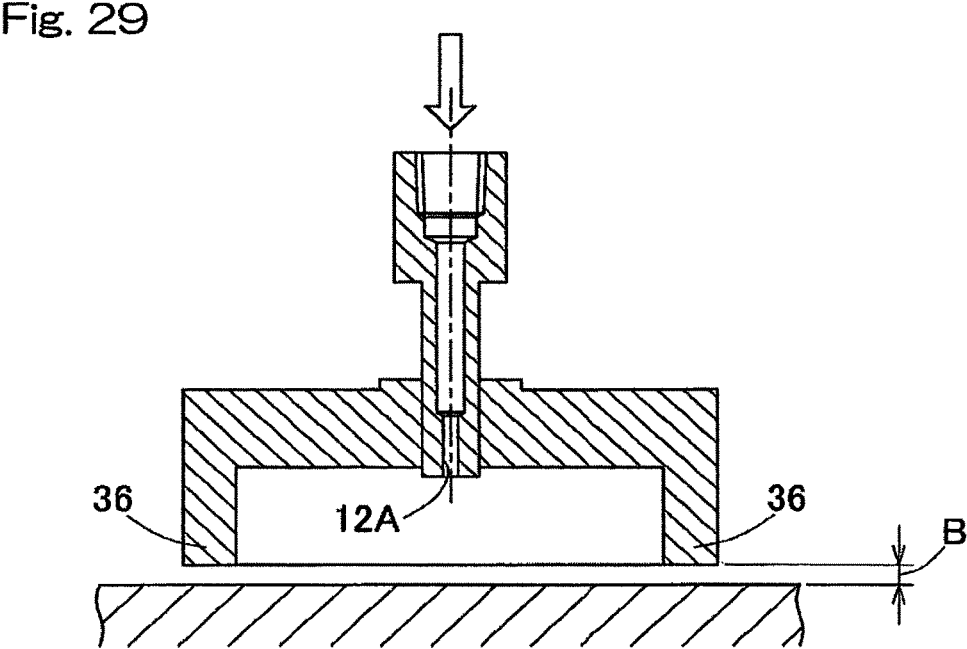
FIG. 29 is a longitudinal sectional view used to explain a testing method for examining the sound insulating effect, resulting from the gap amount at a sound insulating wall end portion, relative to an injection noise of a nozzle providing a source of the noises.

FIG. 29 illustrates a diagram used to explain a method of testing the sound insulating effect that is brought about by the gap amount at a sound insulating wall end portion relative to the injection noise from the nozzle 12A which forms a source of noises. Test conditions used during this test are identical with those shown in and described with reference to FIG. 23.

Figure 30:
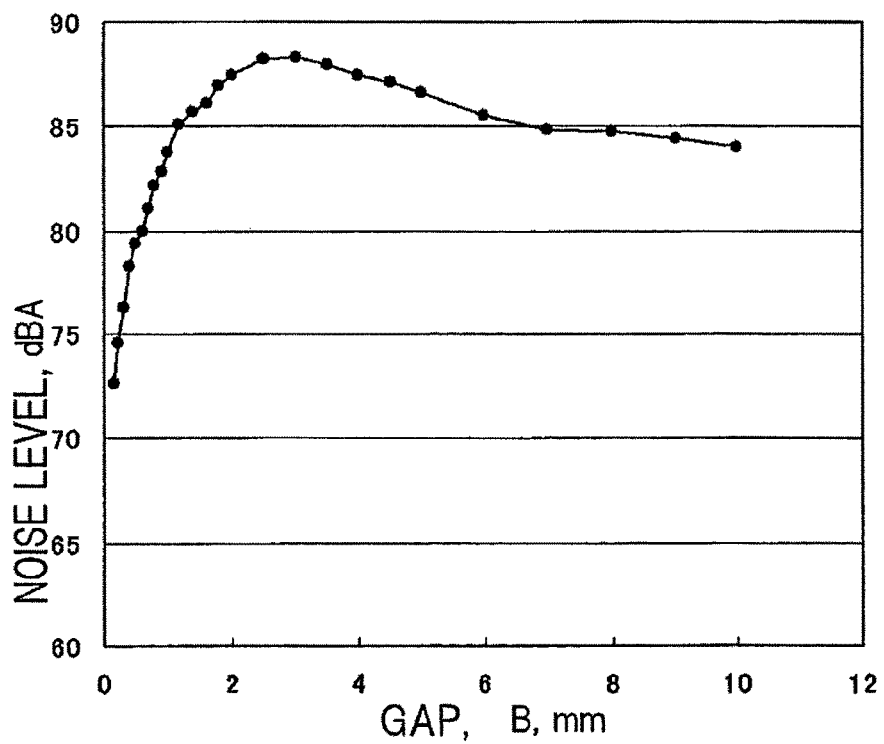
FIG. 30 is a characteristic chart showing the relationship between the gap amount at the noise insulating wall end portion of the cooling structure and the noise.

FIG. 30 illustrates a characteristic chart showing the relationship between the gap amount B in the sound insulating wall end portion and the noise. The noise level, when the distance L from the nozzle end portion to the injection surface is, for example, 13.5 mm and no sound insulating wall is employed, is about 83 dB as can readily be seen from the result shown in FIG. 24. When the sound insulating wall in the form of the projecting portion 36 is provided as shown in FIG. 29, and the gap amount B of the sound insulating wall end portion is set to, for example, 0.15 mm, the noise level has decreased about 10 dBA, as shown in FIG. 30, as compared with that in the case with no sound insulating wall employed. It will readily be seen that the noise level is proportional to the gap amount B if the gap amount B of the sound insulating wall end portion is up to 2 mm. Although the result has shown that the maximum value of the sound level is shown when the gap amount B is about within the range of 2 to 4 mm, it has been ascertained that this results from resonance.

Considering that the sound insulating effect can be obtained when the gap amount of the sound insulating wall end portion is made small, the gap amount is desired to be as small as possible. The gap amount B of the sound insulating wall end portion comprised of the projecting portion 36 in the case of FIG. 25 appears desirable if the outer peripheral surface of the inner ring spacer 5 during the operation is to such an extent that it will not contact the inner peripheral surface of the outer ring spacer 4 upon radial expansion. Specifically, it is recommended to set the radial gap amount, which is about five times relative to the amount of expansion of the inner ring spacer at the maximum rotating speed used, when considering the securement of the machining accuracy of the spacer and the gap amount subsequent to the expansion. By way of example, assuming that the amount of expansion of the inner ring spacer during the operation is 0.5 mm in radius, the low noise of about 10 dBA will be attained when the gap amount to be set is about 0.25 mm (the gap during the operation is 0.25 mm-0.05 mm). Also, in the modified example shown in FIG. 27, the reduction of the gap in a quantity corresponding to the expansion generated by the centrifugal force during the operation is small, and therefore, the set gap amount can be made small as compared with that in the fourth embodiment of the present invention shown in FIG. 25 and, hence, the sound insulating effect becomes further high.

Figure 31:
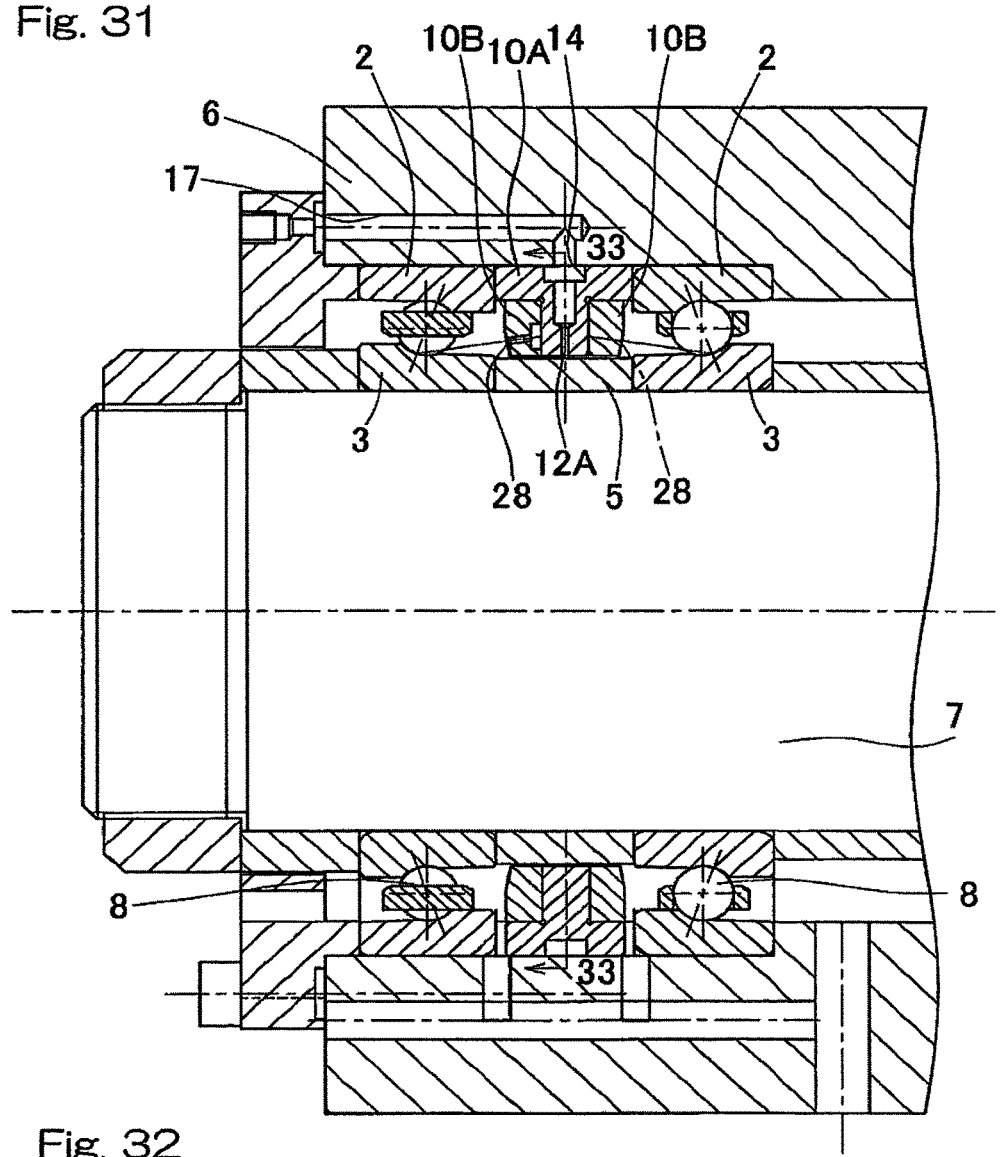
FIG. 31 is a longitudinal sectional view of the main shaft device in which the bearing device equipped with the cooling structure, which structure is designed in accordance with a fifth preferred embodiment of the present invention, is incorporated.
Figure 32:
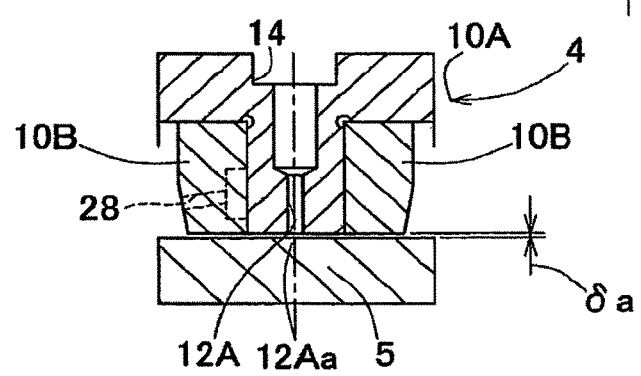
FIG. 32 is an enlarged sectional view showing a portion of the cooling structure in the bearing device.
Figure 33:
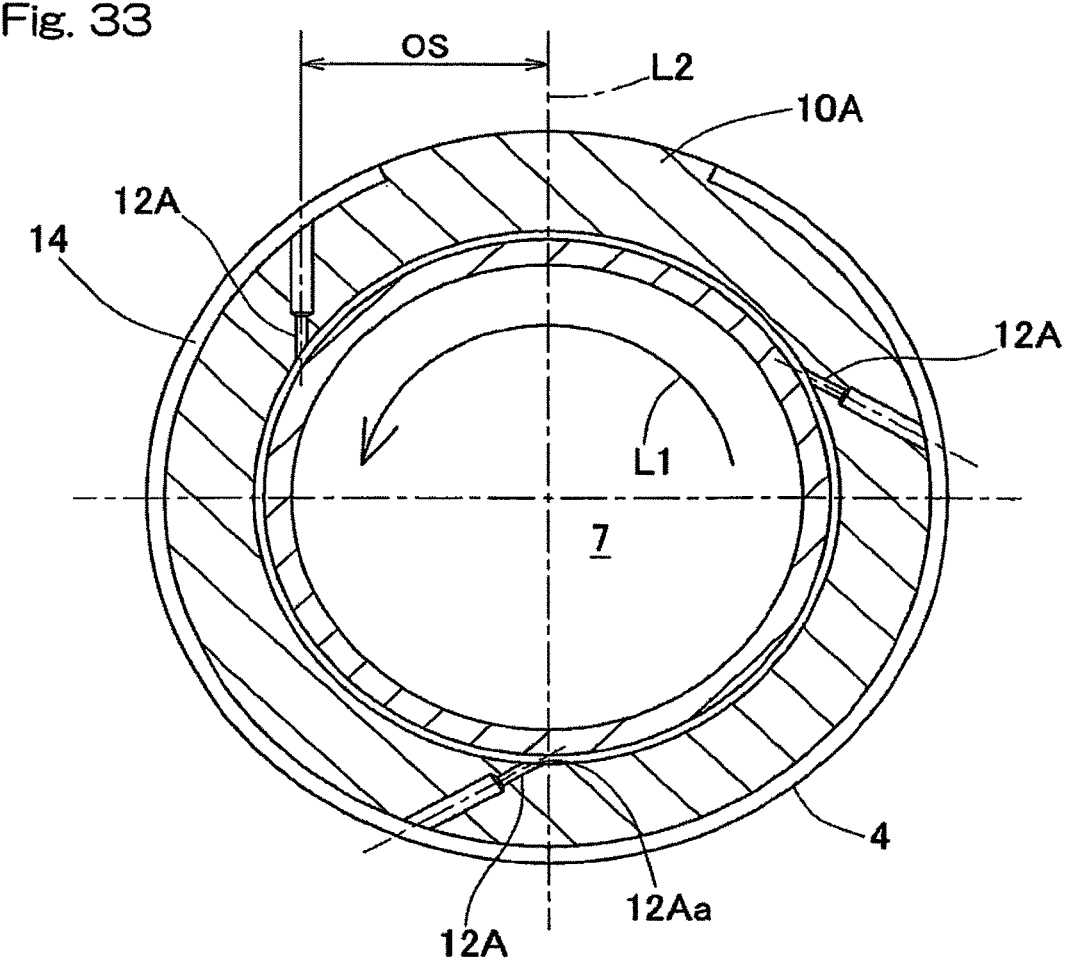
FIG. 33 is a cross sectional view taken along the line 33-33 in FIG. 31.

Arrangement may be made that the air oil is discharged directly from the lubricating nozzle 10B towards the raceway surface of the inner ring 3 as is the case with a fifth preferred embodiment of the present invention shown in FIG. 31. FIG. 32 illustrates a fragmentary enlarged sectional view of that portion of FIG. 31. In this embodiment, so that the air oil discharged under a predetermined pressure from the air oil supply port 28 of the lubricating nozzle 10B may impinge upon the neighborhood of the boundary between the inner ring raceway surface and the rolling element 8, the angle of inclination of the air oil supply port 28 is defined. In this embodiment, the low noise is accomplished by a concept similar to that according to the previously described first embodiment of the present invention, in which the inner diametric dimension of the outer ring spacer main body 10A and of the lubricating nozzle 10B are identical with each other and the gap δa between the outer ring spacer 4 and the inner ring spacer 5 is employed in a manner similar to that shown and described in connection with the first embodiment of the present invention. FIG. 33 is a cross sectional view taken along the line 33-33 in FIG. 31. Even in the construction shown in FIGS. 31 and 32, as shown in FIG. 33, the nozzle 12A is inclined forwardly with respect to the direction L1 of rotation, and the position of the nozzle 12A is offset (this equally applied to FIG. 34 as will be mentioned later).

Figure 34:
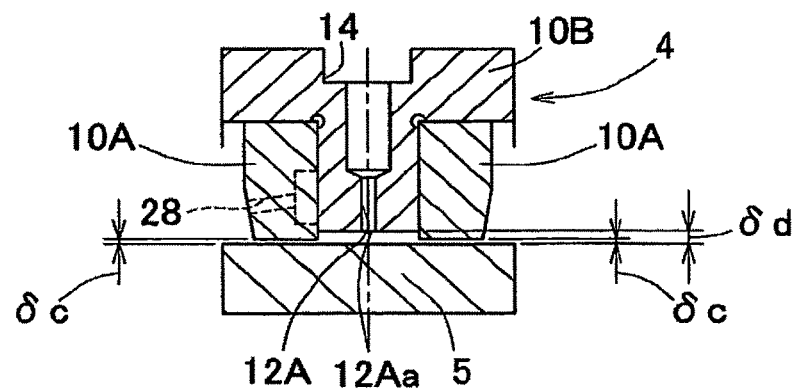
FIG. 34 is an enlarged sectional view showing the portion of the cooling structure in the bearing device, which is partially modified.

As shown in FIG. 34, arrangement may be made that the air oil is directly discharged from the lubricating nozzle 10B towards the raceway surface of the inner ring and that the inner diametric portion of the lubricating nozzle 10B is so made as to protrude radially inwardly beyond the inner peripheral surface of the outer ring spacer main body 10B. Also, the gap δc between the inner diametric portion of the lubricating nozzle 10B and the outer peripheral surface of the inner ring spacer 5 is smaller than the gap δd between the inner peripheral surface, where the discharge port 12Aa of the outer ring spacer 4 exists, and the outer peripheral surface of the inner ring spacer 5 that is opposed to the discharge port 12Aa in a manner similar to the embodiment shown in and described with particular reference to FIG. 25. Even in the embodiment shown in and described with reference to FIG. 34, by defining the radial gap δc in a manner similar to that shown in and described with reference to FIG. 25, without reduction of the cooling air amount, and the reasonable noise reduction can be accomplished.

As is the case with a sixth preferred embodiment of the present invention shown in and described with reference to FIGS. 35 and 36, in the bearing device in which grease lubrication takes place, a barrier wall 37 may be provided. This barrier wall 37 is provided at the axial opposite end portions of the inner ring spacer 5 so as to protrude towards an outer diametric side, and serves to avoid the inflow of the compressed air A, which has been discharged from the discharge port 12Aa, into a bearing space S1 delimited between the inner and outer rings 3 and 2. In this embodiment, the barrier wall 37 is of a tapered shape in which the amount of protrusion towards the outer diametric side gradually increases towards the rolling bearing 1 in the axial direction. Also, an axial end surface of the outer ring spacer 4 is provided with the cutout 18 which serves as an exhaust port for the compressed air discharged from the discharge port 12Aa. The cutout 18 is of, for example, as shown in FIG. 37, a rectangular sectional shape. When the outer ring 2 of the rolling bearing 1 is disposed in adjoining relation to the outer ring spacer 4, the cutout 18 assumes the shape of an opening that communicates a spacer space S2, delimited between the outer ring spacer 4 and the inner ring spacer 5, and the outside of the bearing device J with each other. In this construction described above, in order to enable the outer ring spacer 4 to be assembled (in order to avoid the interference between the inner periphery of the outer ring spacer 4 and the barrier wall 37), the inner ring spacer 5 is in the form of two split inner ring spacer segments that are so divided at, for example, an axial intermediate portion.

Figure 35:
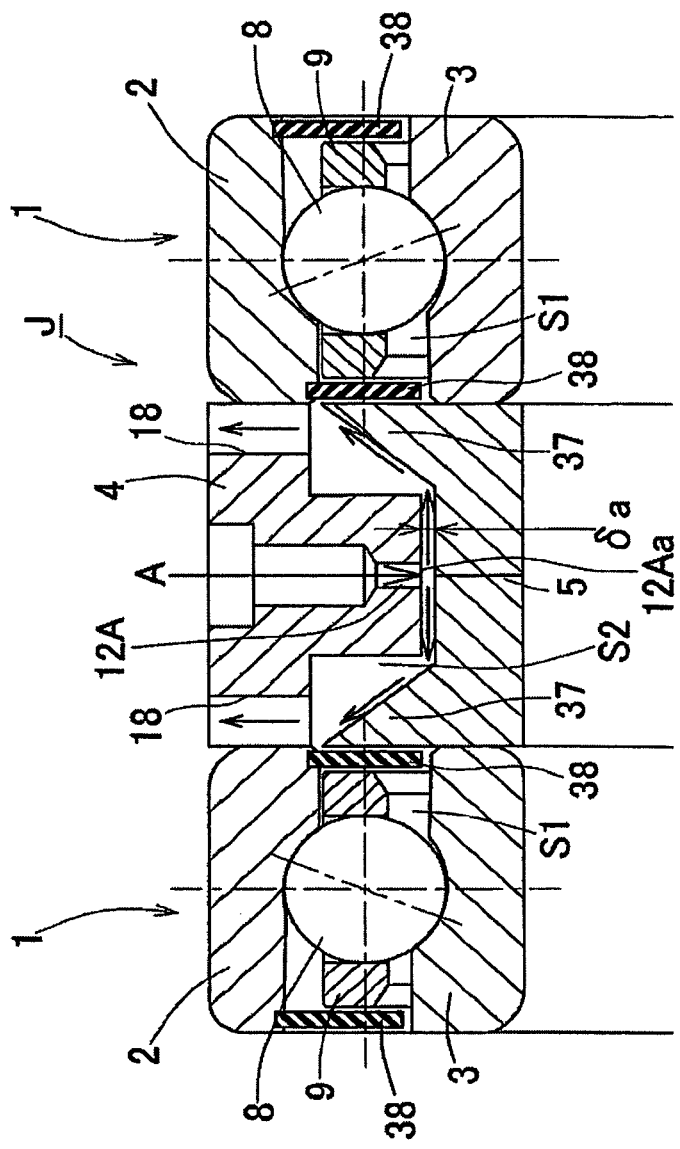
FIG. 35 is a longitudinal sectional view of the bearing device according to a sixth and twenty third preferred embodiments of the present invention.
Figure 36:
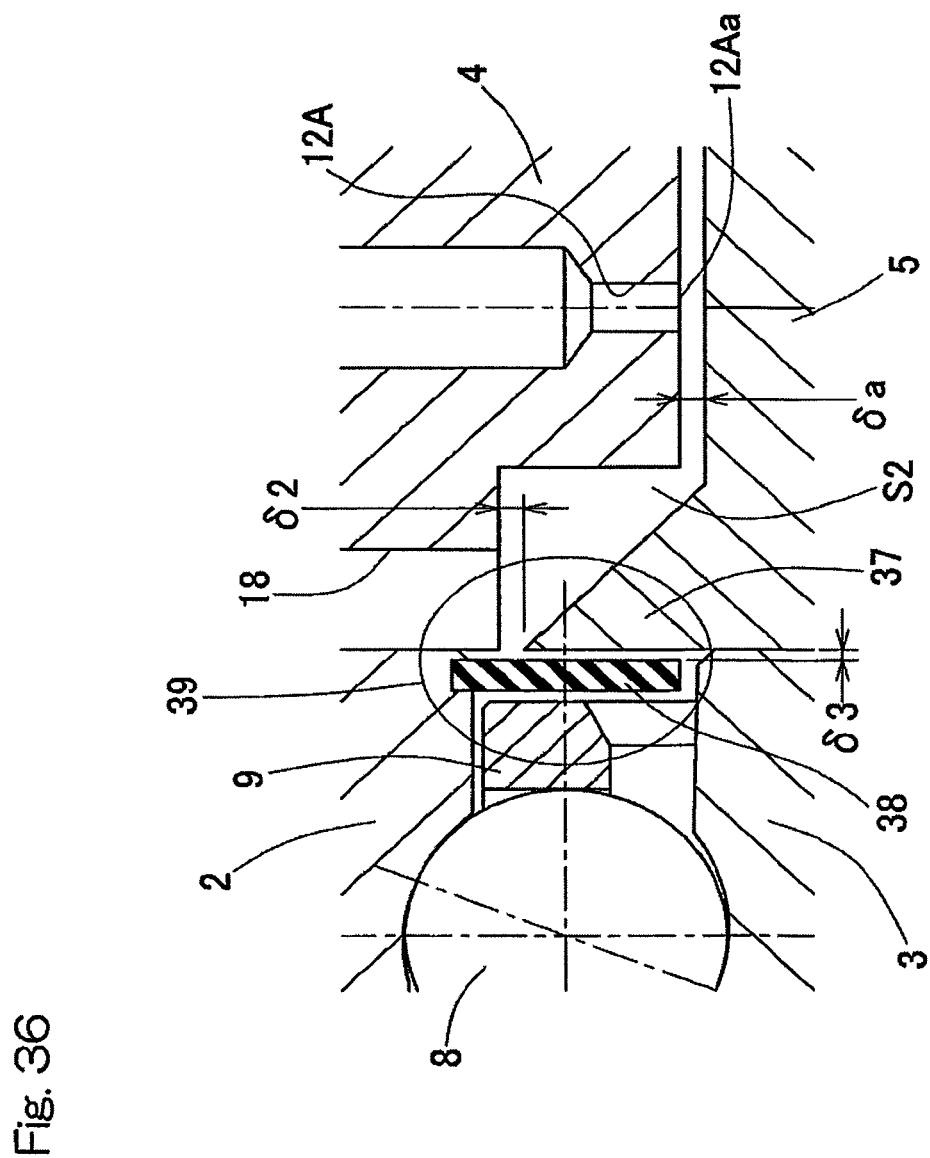
FIG. 36 is a fragmentary enlarged diagram showing a portion of FIG. 35.
Figure 37:
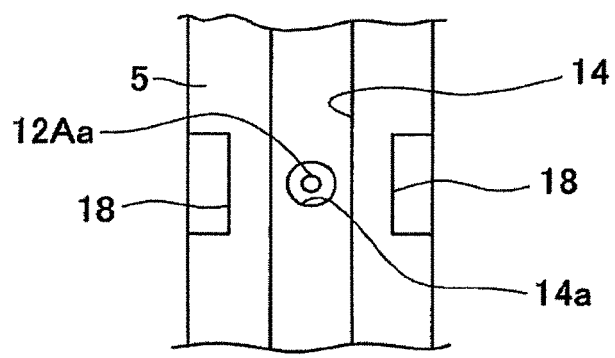
FIG. 37 is a diagram showing a portion of an outer ring spacer in the bearing device, which is shown as deployed.

As shown in FIG. 36 which is a fragmentary enlarged diagram of FIG. 35, the barrier wall 37 has an outer diametric end that is opposed to the inner peripheral surface of the outer ring spacer 4 through a minute radial gap δ2. Also, this barrier wall 37 has an end surface opposed to a sealing member 38 on the axially inner side through a minute axial gap δ3. Accordingly, the sealing member 38 and the barrier wall 37 cooperate with each other to form a labyrinth seal area 39 having a labyrinth sealing effect, and by the presence of this labyrinth seal area 39, the bearing space S1 and the spacer space S2 are separated from each other. As is the case with the foregoing first to fifth embodiments of the present invention, the nozzle 12A is inclined forwardly with respect to the direction of rotation, and the gap δa delimited between the inner peripheral surface of the outer ring spacer 4, where the discharge port 12Aa of the nozzle 12A exists, and the outer peripheral surface of the inner ring spacer 5 confronting the discharge port 12Aa is set within the range of 0.7 mm to half the diameter of the nozzle 12A.

According to the construction shown in and described with reference to FIGS. 35 and 36, the compressed air A discharged from the discharge port 12Aa does, after having impinged upon the inner ring spacer 5, flow towards the axially opposite sides along the outer peripheral surface of the inner ring spacer 5 and is subsequently guided towards the outer diametric side along a tapered outer diametric surface of the barrier wall 37 of the inner ring spacer 5 before finally discharged from the cutout 18 in the outer ring spacer 4. With the compressed air A so guided by the barrier wall 37 towards the outer diametric side, the flow of the compressed air A within the spacer space S2 and the discharge of the compressed air A from the spacer space S2 can be accomplished smoothly. During the passage of the compressed air A through the spacer space S2, heat is drawn from the bearing device J and the main shaft 7 (best shown in FIG. 19) supported by such bearing device J. Accordingly, the bearing device J and the main shaft 7 (best shown in FIG. 19) are efficiently cooled.

Thanks to the barrier wall 37 provided between the axial opposite ends of the inner ring spacer 5, the inflow of the compressed air A into the bearing space S1 is avoided. Particularly in the embodiment now under discussion, the bearing space S1 and the spacer space S2 are separated from each other by the presence of the labyrinth seal 39, the inflow of the compressed air A into the bearing space S1 can be further effectively avoided. Also, since the compressed air A smoothly flows in the spacer space S2, the internal pressure inside the spacer space S2 is lower than the internal pressure inside the bearing space S1 and, therefore, the compressed air A hardly flows into the bearing space S1. In view of these, the inflow of the compressed air A into the bearing space S1 can be suppressed as markedly as possible, and expulsion of the grease, filled in the bearing space S1, by the compressed air A can be avoided. For this reason, a favorable lubricating condition can be maintained.

Figure 38:
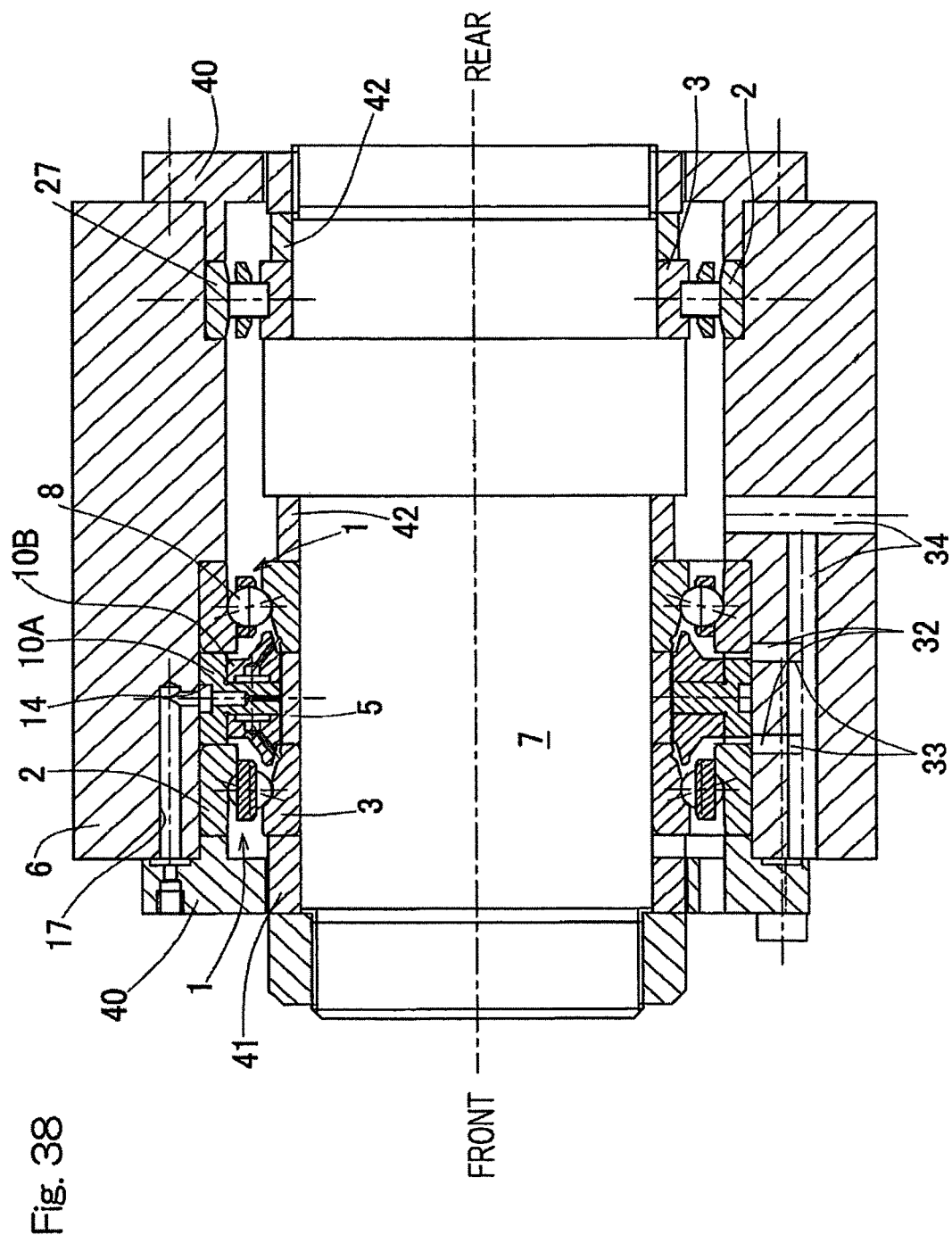
FIG. 38 is a longitudinal sectional view showing an example in which the cooling structure in the bearing device, which is designed in accordance with any one of the foregoing inventions, is applied to a machine tool main shaft device.

FIG. 38 illustrates a sectional view showing an example, in which the cooling structure for the bearing device designed in accordance in any one of the foregoing embodiments is applied to a machine tool main shaft device. As a rolling bearing of the bearing device according to any one of the foregoing embodiments, an angular contact ball bearing 1 for supporting the axial load and the radial load are disposed in back-to-back relation to each other on a front end side of the main shaft 7 to which a work is fitted. On a rear end side of the main shaft 7, a cylindrical roller bearing 27 is mounted for the purpose of avoiding the fluctuation of the shaft while supporting the radial load. The inner and outer rings 3 and 2 of the bearings 1 are fixed to the main shaft 7 and the housing 6, respectively, by means of, for example, a positioning spacer 41 and 42, which serve as an inner ring holding member, and an end surface wall 40 or the like which serves as an outer ring holding member.

Where the cooling structure for the bearing device designed in accordance with any of the foregoing embodiments is applied to the machine tool main shaft device, with no need to render the bearing device to be of a complicated structure and with no need to use any accessory equipment, the temperature of the bearing 1 and the main shaft 7 can be lowered, and also, the noises emanating to the outside can be reduced. Also, since the bearing temperature during the operation can be lowered, the increase of the bearing preload is relieved, and speed-up of the bearing 1, that is, the increase of the machining efficiency or prolongation of the bearing life can be accomplished. By a quantity for which the increase of the bearing preload is relieved as a result of the reduction in temperature of the main shaft 7 and the bearing during the operation, the initial preload can be increased, and the increase of the main shaft rigidity at a low speed and the increase of the machining accuracy can be achieved. During the operation the temperature of the main shaft 7 is lowered, and therefore, the deterioration in machining accuracy resulting from the thermal expansion of the main shaft 7 can be reduced.

The cooling structure for the bearing device in accordance with a seventh preferred embodiment of the present invention will now be described in detail with particular reference to FIGS. 39 to 44. This seventh embodiment of the present invention differs from the previously described first embodiment of the present invention in that, as will be detailed later, the compressed air is used for the cooling fluid and a plurality of circumferentially juxtaposed holes 56 are provided at the position of the outer peripheral surface of the inner ring spacer 5, where the compressed air discharged from the discharge port 12Ba is blown. Even the cooling structure for the bearing device according to this embodiment is, as is the case with any one of the previously described first to sixth embodiments of the present invention, applied also to the machine tool. It is however to be noted that the application is not necessarily be limited only to the machine tool. The description that follows includes the method of cooling the bearing.

Figure 39:
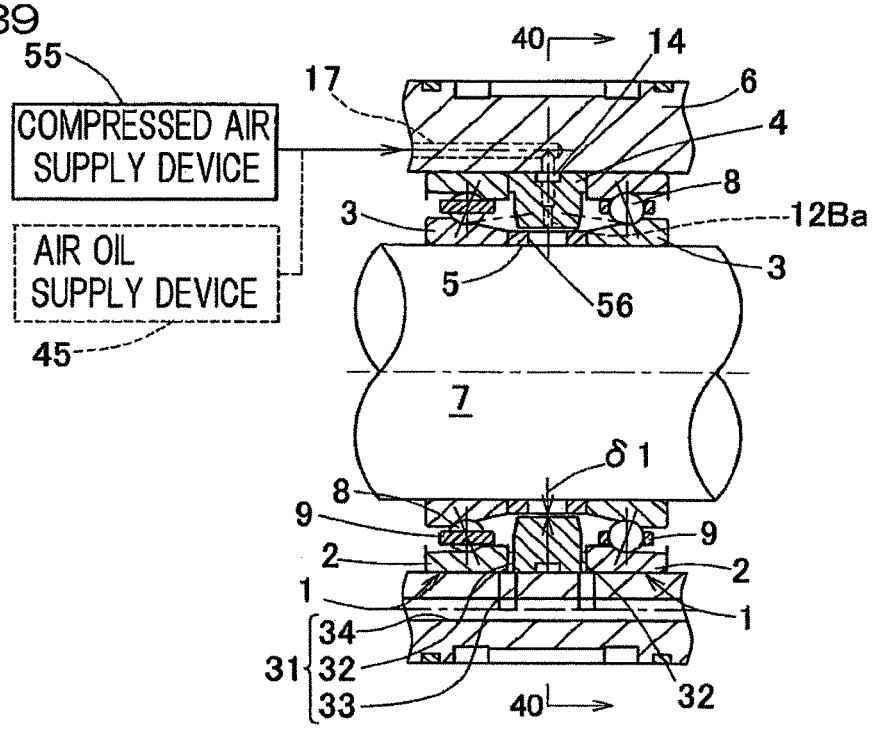
FIG. 39 is a longitudinal sectional view of the main shaft device in which the bearing device equipped with the cooling structure, which structure is designed in accordance with a seventh preferred embodiment of the present invention, is incorporated.
Figure 40:
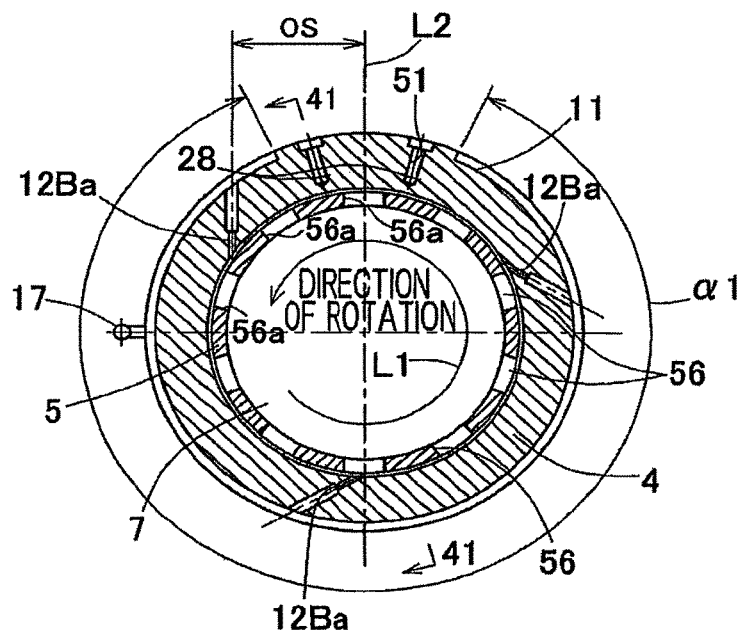
FIG. 40 is a cross sectional view taken along the line 40-40 in FIG. 39.

The cooling structure will now be described. As shown in FIG. 40 showing a cross sectional view taken along the line 40-40 in FIG. 39, a plurality of (for example, three in this embodiment) discharge ports 12Ba for discharging the compressed air towards the outer peripheral surface of the inner ring spacer 5 are provided in the outer ring spacer 4. The direction of discharge of the respective discharge ports 10 is inclined forwardly with respect to the direction L1 of rotation of the main shaft 7 and the inner ring 3 (best shown in FIG. 39). The plurality of those discharge ports 12Ba are circumferentially equidistantly disposed. Each of those discharge ports 12Ba is of a straight shape and is held at a position offset from the straight line L2, which extends in an arbitrary radial direction in the section perpendicular to the longitudinal axis of the outer ring spacer 4, in a direction perpendicular to the straight line L2. In this embodiment, the offset amount of the discharge port 12Ba of the outer ring spacer 4 is chosen to be of a value greater than 0.5 times relative to the radius of the main shaft 7 of a to-be-cooled portion but smaller than the inner diameter of the outer ring spacer 4.

The outer peripheral surface of the outer ring spacer 4 is provided with an outer introducing port 14 through which the compressed air, which serves as a cooling air, is introduced. This outer introducing port 14 is provided in an axially intermediate portion in the outer ring spacer 4 and is formed to represent an arcuate shape communicated with each discharge port 12Ba. In other words, the outer introducing port 14 is provided within an angular range al occupying a large circumferential portion of the outer peripheral surface of the outer ring spacer 4 excluding the circumferential position where an air oil supply port 29, as will be described later, is provided. An introducing path of the compressed air is in the form of an independent path separate from that of the air oil for bearing lubricating purpose. Accordingly, as shown in FIG. 39, the cooling air supply hole 17 is provided in the housing 6, and an introducing groove 11 is configured to communicate with the cooling air supply port 17. To the outside of the housing 6, a compressed air supply device 55 for supplying the compressed air to the cooling air supply hole 17 is provided to be fluid connected with the latter by means of tubing.

As shown in FIG. 40, a plurality of (for example, ten in this embodiment) radially oriented holes 56 are circumferentially equally defined in the inner ring spacer 5. The section of each hole 56 as viewed in plane perpendicular to the longitudinal axis of each of the inner ring spacer 5 is so formed as to represent a rectangular or oval shape. At a predetermined portion of the inner ring spacer 5 as viewed in the circumferential direction and in the axial intermediate portion thereof, each of the holes 56 is so formed as to represent the shape of a round hole that extends in the radial direction. Accordingly, when the compressed air discharged from the discharge port 12Ba of the outer ring spacer 4 during the operation is allowed to reach the outer surface of the main shaft 7 through the hole 56 in the inner ring spacer 5, the main shaft 7 is directly cooled.

As shown in FIG. 39, the radial gap $\delta 1$ is provided between the outer peripheral surface of the inner ring spacer 5 and the inner peripheral surface of the outer ring spacer 4. So that the radial sectional surface area of a radial gap portion formed between the outer peripheral surface of the inner ring spacer 5 and the inner peripheral surface of the outer ring spacer 4 may become larger than the total sectional surface area of the discharge port 12Ba of the outer ring spacer 4, such radial gap $\delta 1$ is defined. The "total sectional surface area" of the discharge port 12Ba referred to above means the sum of respective surface areas of the entire discharge ports in the cross section of each discharge port 12Ba in a plane perpendicular to the axial direction of the discharge port 12Ba. The "radial sectional surface area" referred to above means double of the surface area of the radial gap portion formed between the outer peripheral surface of the inner ring spacer 5 and the inner peripheral surface of the outer ring spacer 4, when the bearing device is viewed in section cut in a plane perpendicular to the axis of the bearing device. The reason that the surface area is doubled is that in the embodiment now under discussion, the compressed air discharged from the discharge port 12Ba flows the radial gap portion, formed between the outer peripheral surface of the inner ring spacer 5 and the inner peripheral surface of the outer ring spacer 4, towards axially opposed sides. Since the radial gap $\delta 1$ is so defined as discussed above, the compressed air discharged from each of the discharge ports 12Ba can smoothly flow along the direction of rotation while contacting the main shaft surface.

Figure 41:
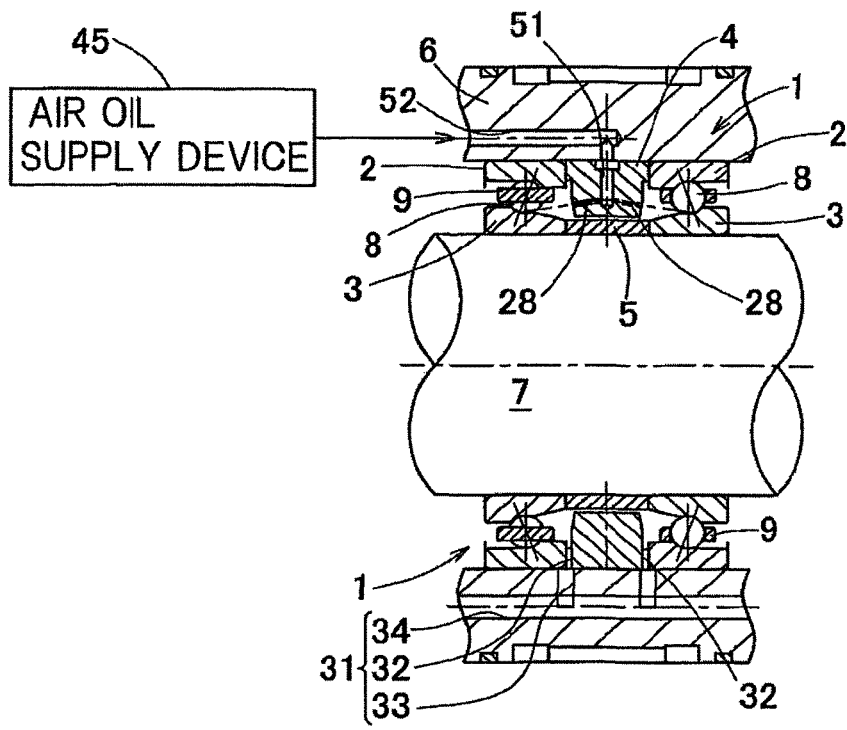
FIG. 41 is a cross sectional view taken along the line 41-41 in FIG. 40.

The lubricating structure will be hereinafter described. As shown in FIG. 41, the outer ring spacer 4 has an air oil support port 28 defined therein for supplying the air oil to the inside of the bearing. The air oil supply port 28 is provided in each of the rolling bearings 1 and 1. As shown in FIG. 40, the outer ring spacer 4 is has defined therein oil supply holes 51 and 51 each communicated with the air oil supply port 28. Each of the air oil supply holes 51 is formed in a predetermined depth from the outer peripheral surface of the outer ring spacer 4 and is communicated with the air oil supply port 28 in the vicinity of a hole bottom. As shown in FIG. 41, each of the air oil supply port 28 is formed to represent a throughhole shape having an angle of inclination so as to incline radially inwardly from the neighborhood of the hole bottom towards the bearing to-be-targeted. Each of those air oil supply ports 28 in this embodiment has its angle of inclination so determined as to allow the air oil, discharged under a predetermined pressure from the air oil supply port 28, to impinge upon, for example, the neighborhood of the boundary between the inner ring raceway surface and the rolling bearings 8.

A bearing box supply hole 52 for the air oil is provided in the housing 6, and the air oil supply hole 51 is communicated with the bearing box supply hole 52. In the outside of the housing 6, the air oil supply device 45 for supplying the air oil is provided to be fluid connected through tubing with the bearing box supply hole 52. During the operation, the air oil supplied from the air oil supply device 45 is discharged sequentially to the inner ring raceway surface through the bearing box supply hole 52→the air oil supply hole 51→the air oil supply port 28.

A discharging structure will be hereinafter described. In this bearing device, an air oil outlet port 31 for discharging the air oil is employed. The air oil outlet port 31 includes an outlet groove 32, provided in a portion of the outer ring spacer main body 10A in the circumferential direction, a bearing box outlet groove 33 and a bearing box outlet hole 34, both of which are defined in the housing 6 and communicated with the outlet groove 32. The outlet groove 32 of the outer ring spacer 4 is formed at a circumferential position diagonal to the position, where the air oil supply hole 51 is provided in the form of a slit, in the end surface of the outer ring spacer 4 that confronts the outer ring end surface on a bearing rear surface side. The bearing box outlet grove 33 of the housing 6 is formed over the same circumferential position as that of the outlet groove 32 of the outer ring spacer 4 and is communicated with the axially extending bearing box outlet hole 34. The air and the oil provided for lubrication of the rolling bearing 1 are discharged to the outside after having passed axially through the inside of the bearing and is discharged to the outside by the outlet groove 32 through the bearing box outlet groove 33 and the bearing outlet hole 34. Also, in this embodiment, the cooling air, after the inner ring spacer 5 has been cooled, is discharged from the air oil outlet port 31. In other words, the discharge path for the air oil and the outlet path for the cooling air are commonalized.

Figure 42:
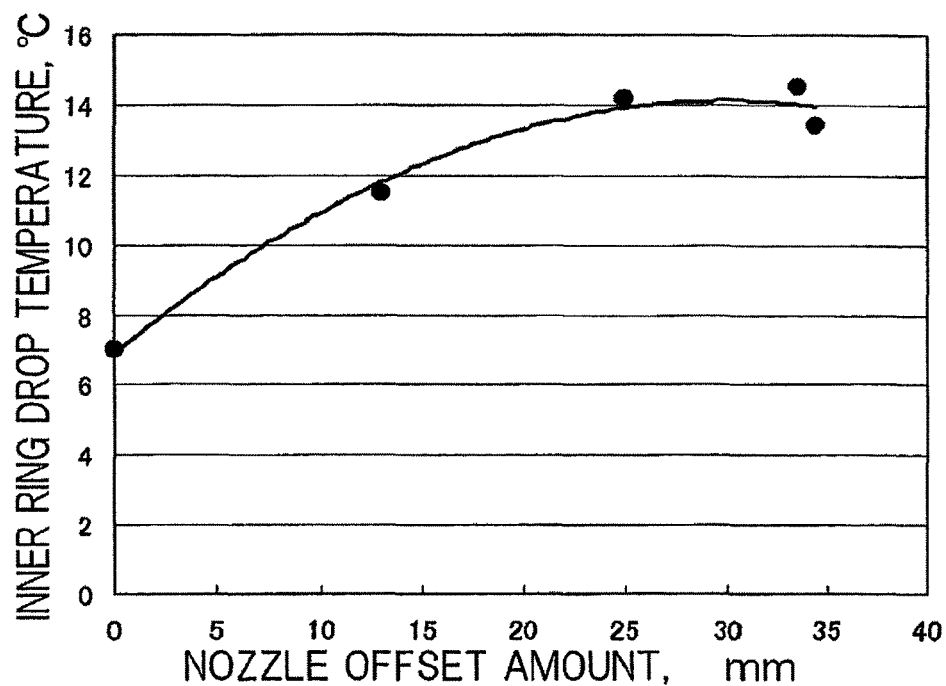
FIG. 42 is a characteristic chart showing the relationship between the offset amount of a discharge port for a compressed air and the drop temperature of the inner ring.

FIG. 42 is a diagram showing the relationship between the drop temperature of the inner ring 3 and the offset amount of the discharge port 12Ba of the cooling air in this cooling structure. During the test, the angular contact ball bearing having the inner ring 3 of φ 70 mm in inner diametric dimension was operated at 17,000 $min^{-1}$ under the air oil lubrication and the drop temperature of the inner ring 3 when no cooling (at the air supply pressure of 0 kPa) took place and the cooling (at the air supply pressure of 4,00 kPa) tool place was reviewed in the light of the relationship with the offset amount of the discharge port 12Ba. The direction of offset of each discharge port 12Ba was so determined that the flow of the air discharged from each of the discharge ports 12Ba might be in the same direction as the direction of rotation of the inner ring 3 and the main shaft 7.

As a result of the test, it will readily be understood that as the offset amount OS of the discharge port 12Ba increases, the temperature drop of the inner ring 3 increases, and that the maximum drop temperature occurs with a range from about 0.5 times of the main shaft radius (inner diameter of the inner ring 3) to the vicinity of the tangential position of the main shaft surface. When the discharge port 12Ba of the outer ring spacer 4 is offset and the air flow is made to conform to the inner ring rotational direction, it is suspected that the cooling air flows stably in the direction of rotation and heat evolved from the surface of the inner ring spacer 5 is effectively absorbed.

Figure 43:
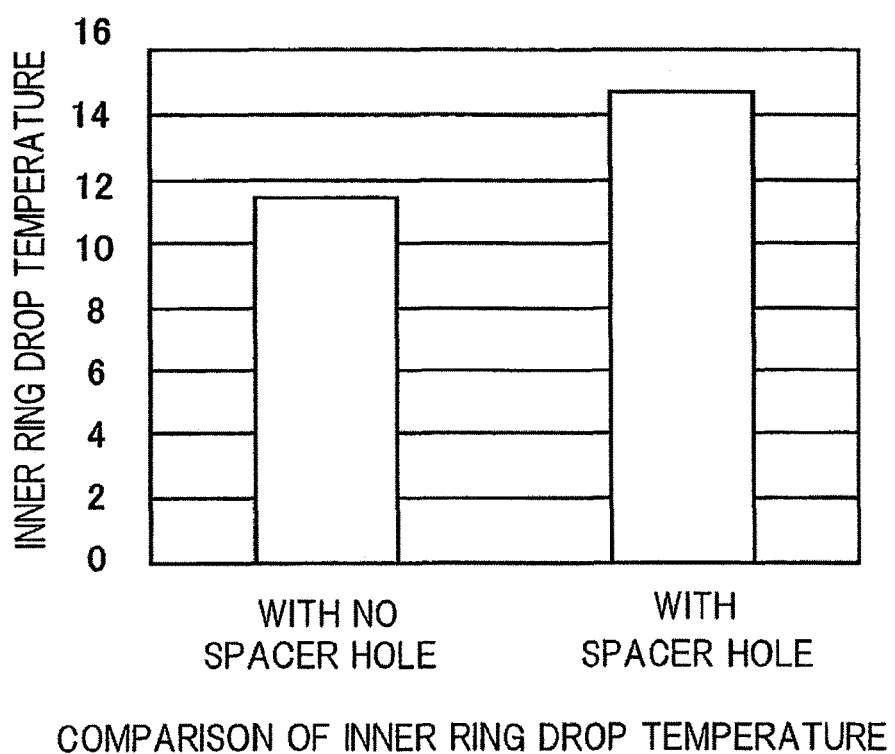
FIG. 43 is a chart showing the comparative result of the inner ring drop temperature dependent on the presence or absence of a hole in the inner ring spacer.

FIG. 43 illustrates a chart showing the result of comparison of the inner ring drop temperature in dependence on the presence or absence of the hole 56 (best shown in FIG. 40) in the inner ring spacer 5. As shown therein, when the radial hole 56 exists in the inner ring spacer 5, it will readily be seen that as compared with the case with no hole 56 existing, the temperature drop of the inner ring 3 is marked. It is suspected that this has resulted from the fact that the cooling air discharged from the discharge port 12Ba of the outer ring spacer 4 flows to the outer surface of the main shaft 7 through the hole 56 to thereby cool the main shaft 7 directly.

Figure 44:
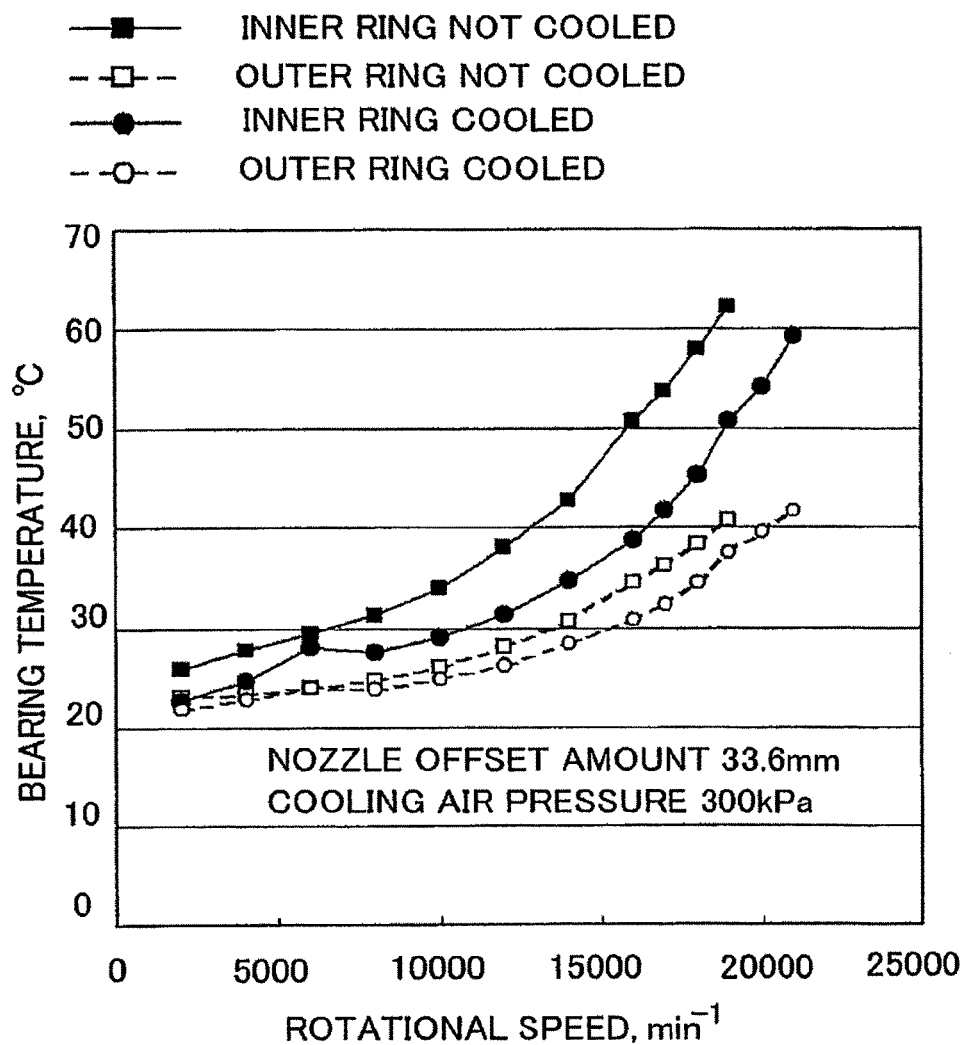
FIG. 44 is a characteristic chart showing the relationship between the rotational speed and the bearing temperature.

The result of an operating test, in which in the construction of this embodiment the bearing 1 having a ceramic inner ring is actually incorporated as shown in FIG. 39, is shown in FIG. 44. The offset amount OS of each of the discharge ports 12Ba during the operating test was 33.6 mm, respectively, and comparison was made between the case with the cooling air not employed (at the air supply pressure of 0 kPa) and the case with the cooling air employed (at the air supply pressure of 300 kPa), and respective temperatures of the inner ring 3 and the outer ring 2 were detected. As shown in FIG. 44, it has been ascertained that when the cooling was performed while the rotational speed was 19,000 min$^{-1}$, the inner ring temperature exhibited a temperature drop of 10° C. or higher. Also, if the arrival of the inner ring temperature at 60° C. is assumed as be the high speed limit, the high speed when the cooling is performed can be attained up to the rotational speed of 21,000 min$^{-1}$ against the rotational speed of 19,000 min$^{-1}$ attained when no cooling is performed. Lowering of the inner ring temperature with cooling leads to the reduction of the bearing preload and, thus, the high speed can be attained.

According to the cooling structure for the bearing device as hereinabove discussed, by discharging the compressed air onto the outer peripheral surface of the inner ring spacer 5 by means of the discharge port 12Ba provided in the outer ring spacer 4, the cooling of the bearing 1 can be performed indirectly in addition to cooling the inner ring spacer directly. Since the position of the discharge port 12Ba of the outer ring spacer 4 is so offset as hereinbefore described, the discharge port 12Ba is oriented in the tangential direction of the main shaft surface and also in the direction of rotation to perform the cooling of the main shaft 7. As the result of the test, the larger the offset amount OS, the higher the drop of the inner ring temperature. When the discharge port 12Ba of the outer ring spacer 4 is offset and the air flow is made to take place in the direction of rotation of the inner ring, the cooling air flows stably in the direction of rotation and the heat evolved from the surface of the inner ring spacer 5 and also from the main shaft 7 can be effectively absorbed.

The discharge port 12Ba of the outer ring spacer 4 for the compressed air is inclined forwardly with respect to direction of rotation of the inner ring and the main shaft 7 is as the result of a series of experiments which have confirmed that it is effective particularly where the direction of rotation is fixed as is the case with, for example, that of the main shaft of the machine tool, and, in the gap δ1 between the outer ring spacer 4 and the inner ring spacer 5, a favorable air flow can be obtained and the cooling effect becomes large. Also, the compressed air discharged from the outer ring spacer 4 is, after having cooled the inner ring spacer 5 and the main shaft 7, allowed to flow within the bearing space, and the cooling within the bearing space is simultaneously accomplished. As discussed above, by the utilization of the compressed air, the bearing can be efficiently and reasonably cooled.

Accordingly, with no need to render the bearing device to be of a complicated structure, and, also with on need to use any expensive accessory equipment, the temperature of each of the bearing 1 and the main shaft 7 can be lowered with an inexpensive device. In view of the fact that the bearing temperature can be lowered during the operation, the increase of the bearing preload can be relieved and the bearing or the bearing device can be further speeded up, that is the machining efficiency or the bearing life can be increased. Since the amount of radial expansion of the inner ring resulting is suppressed by the reduction of both of the bearing temperature and the main shaft temperature during the operation, the initial preload can be increased by a quantity corresponding to the increase of the bearing preload relieved, and therefore, the main shaft rigidity at a low speed can be increased, and also the increase of the machining accuracy can be achieved.

Since the radial hole 56 is provided in the inner ring spacer 5, the compressed air discharged in the manner described above reaches to the outer surface of the main shaft 7, after having passed through the hole 56 in the inner ring spacer 5, and, therefore, the inner ring spacer 5 and the main shaft 7 can be cooled. Since the main shaft 7 can be directly cooled with the compressed air in the manner described above, as compared with the case with no hole provided in the inner ring spacer 5, the temperature drop of the inner ring 3 can be increased.

Since the hole 56 of the inner ring spacer 5 is provided in a plural number along the circumferential direction, as compared with the case in which only one hole 56, for example, is provided in the inner ring spacer 5, the cooling effect to cool the main shaft 7 directly can be enhanced. Also, since the discharge path for the air oil and the outlet path for the cooling air are commonalized, the device construction can be simplified and the reduction of the manufacturing cost can be achieved.

Figure 45:
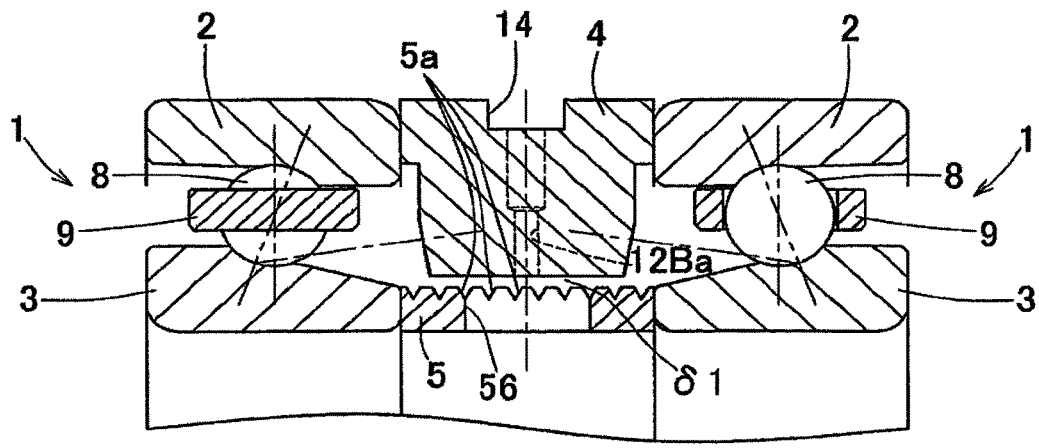
FIG. 45 is a longitudinal sectional view of the cooling structure for the bearing device designed in accordance with an eighth preferred embodiment of the present invention.

As is the case with an eighth preferred embodiment of the present invention shown in FIG. 45, the outer peripheral surface of the inner ring spacer 5 may be rendered to have a groove 5*a*. In the embodiment as shown, the groove 5*a* of the inner ring spacer 5 is so formed as to have a V-shaped section when viewed as cut in a plan containing the longitudinal axis of the inner ring spacer 5. Also, the groove 5*a* having this V-shaped section is rendered to be a plurality of circumferential grooves or spiral grooves disposed axially equidistantly spaced relation. By increasing the surface area of the inner ring spacer 5 in the presence of the groove 5*a*, heat dissipation from the spacer surface can be accomplished efficiently. The groove 5a may have any shape other than the V-sectioned groove, for example, a section of a recessed shape. Also, the inner ring spacer 5 is preferably made of a material having a higher thermal emissivity than that of a steel material such as, for example, a bearing steel and, in this case, the cooling effect can be further increased.

Figure 46:
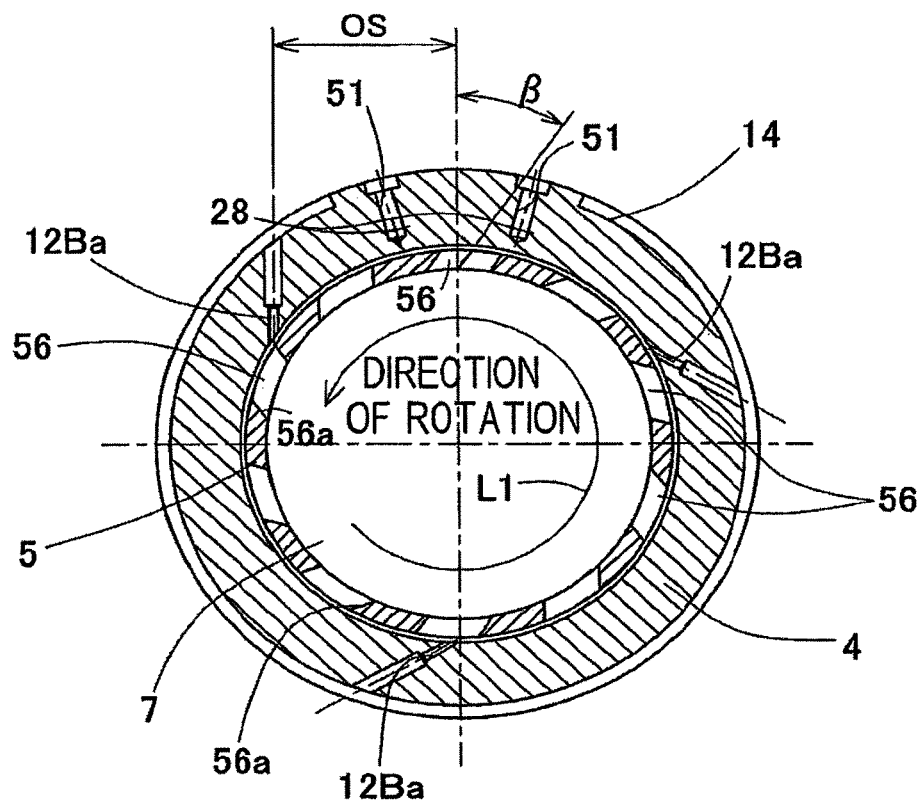
FIG. 46 is a cross sectional view of the cooling structure for the bearing device designed in accordance with a ninth preferred embodiment of the present invention, showing a hole in an inner ring spacer in the bearing device, as viewed from an outer diameter side.

As is the case with a ninth preferred embodiment of the present invention shown in FIG. 46, the hole 56 of the inner ring spacer 5 may be inclined at angle reverse to the direction L1 of rotation of the inner ring 3 and the main shaft 7 (shown as an angle β in FIG. 46) towards the radial outside. In this case, the compressed air discharged from the discharge port 12Ba of the outer ring spacer 4 can be effectively trapped with the hole 56 of the inclined shape. As a result thereof, the amount of the air towards the surface of the main shaft 7 increases to effectively cool the main shaft 7.

Figure 47:
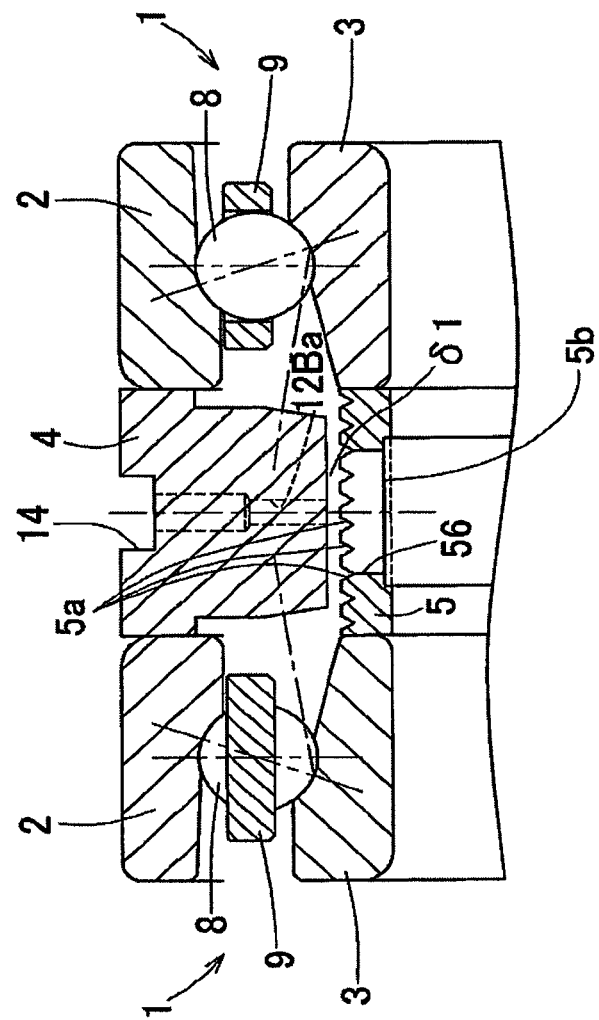
FIG. 47 is a longitudinal sectional view of the cooling structure for the bearing device designed in accordance with a tenth preferred embodiment of the present invention.

As is the case with a tenth preferred embodiment of the present invention shown in FIG. 47, in the construction in which the groove 5a is provided in the outer peripheral surface of the inner ring spacer 5, a circumferential groove 5b of a width greater than the diametric dimension of the hole 56 may be provided in the inner peripheral surface of the inner ring spacer 5. In such case, the compressed air discharged from the discharge port 12Ba of the outer ring spacer 4 flows into the hole 56 and then flows within the circumferential groove 56. As a result, the cooling air is distributed over the entire main shaft surface, and the surface area in which the cooling air contacts the main shaft surface directly can be increased. Accordingly, the cooling effect to cool the main shaft 7 directly can further be enhanced.

Figure 48:
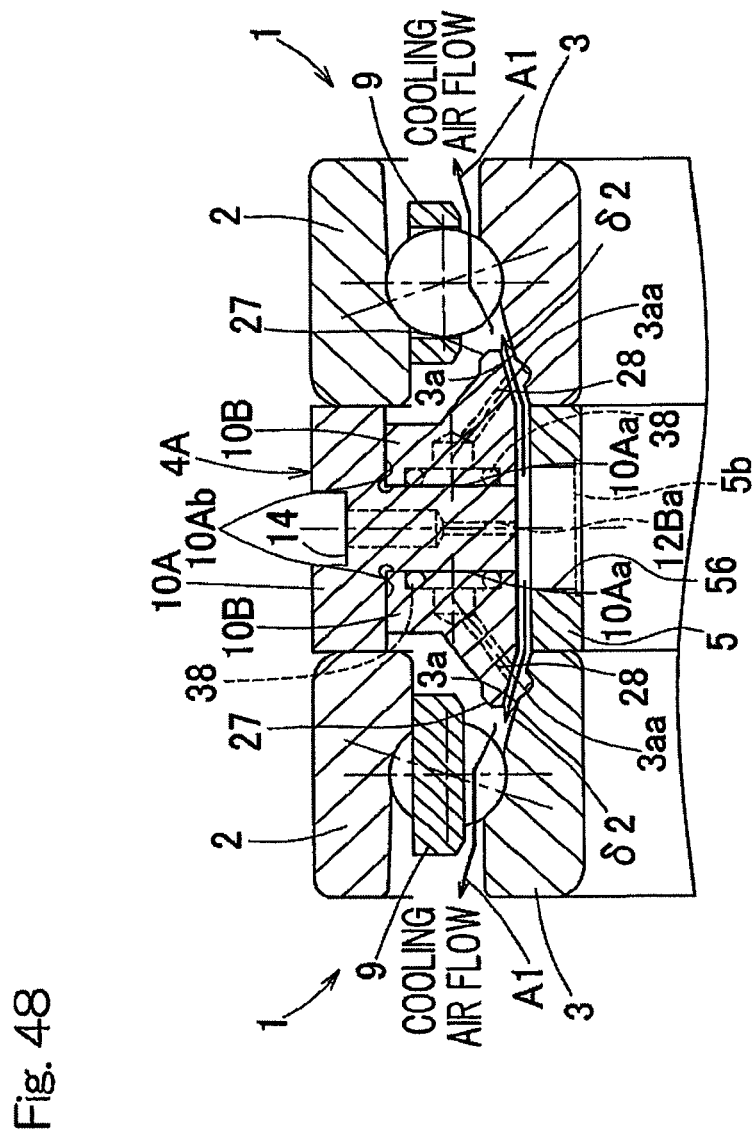
FIG. 48 is a longitudinal sectional view of the cooling structure for the bearing device designed in accordance with an eleventh preferred embodiment of the present invention.

As is the case with an eleventh preferred embodiment of the present invention shown in FIG. 48, the outer ring spacer 4A may have an air oil supply port 28 for supplying the air oil within the bearing space, in which case this outer ring spacer 4A has a projection 27 that protrudes into the bearing space and confronts through an annular gap δ2 for the passage of the air oil between the inner ring outer diametric surface 3a and the projection 27. The outer ring spacer 4A in this embodiment includes an outer ring spacer main body 10A and nozzles 10B and 10B formed separate from the outer ring spacer main body 10A. The outer ring spacer main body 10B is formed to have a generally T-shaped sectional area and the respective ring shaped nozzles 10B and 10B are engaged in the opposite side portions of the outer ring spacer main body 10A to assume a symmetrical configuration to each other. Each of the nozzles 10B is provided with the projection 27 that protrude into the bearing space.

In the outer ring spacer main body 10A, opposite side surfaces 10Aa and 10a and inner peripheral surfaces 10Ab and 10Ab, each of which contacts each nozzle 10B, are all subjected to a grinding process. Respective corner portions of each side surface 10Aa and the inner peripheral surface 10Ab are provided with indents for grinding. The grinding process referred to above is also applied to an inner side surface and an outer peripheral surface of each lubricating nozzle 10B. Also, the contact surface of each nozzle 10B with each side surface 10Aa is provided with an annular sealing member 38 for avoiding the leakage of the air oil from the air oil supply port 28. An annular recess 3aa is provided at a position of the inner ring outer diametric surface 3a which confronts the air oil supply port 28. The annular gap δ2 is set as follows as is the case with the radial gap δ1 hereinbefore discussed. The annular gap δ2 is so defined that the radial sectional surface of the annular gap δ2 formed between the inner ring outer diametric surface 3a and the inner peripheral surface of the projection 27 may become larger than the total sectional surface area of the discharge port 12Ba of the outer ring spacer 4A.

According to the construction shown in and described with particular reference to FIG. 48, the air oil discharged from the air oil supply port 28 is introduced into the annular recess 3aa of the inner ring outer diametric surface 3a and is then deposited therein. The oil so deposited is introduced in the inner ring raceway surface by the utilization of the surface tension of the oil and the centrifugal force to lubricate the bearing 1. Since with the projection 27 having been inserted into the bearing space, the air oil can be discharged with the air oil brought close to the inner ring 3, the lubrication and the cooling function of the bearing 1 can be enhanced. The compressed air discharged from the discharge port 12Ba for cooling purpose is introduced into the bearing space through the annular gap δ2 referred to above and is subsequently discharged after the heat has been absorbed within the bearing. As discussed above, along with the cooling in the inner ring spacer 5, the cooling function within the bearing can be achieved, and therefore, it is possible to accomplish the further effective bearing cooling. With the annular gap δ2 so defined as hereinbefore described, the compressed air discharged from the discharge port 12Ba for cooling purpose can be assuredly introduced into the bearing space through the annular gap δ2 delimited between the inner ring outer diametric surface 3a and the nozzle 10B as shown by the arrow lines in FIG. 48. Accordingly, the compressed air comes to be discharged after the heat has been absorbed within the bearing.

Also, according to the construction described above, in view of the fact that the compressed air so discharged from the discharge port 12Ba of the outer ring spacer 4A is assuredly discharged after having passed through the bearing space, configuration may be made so that the air oil can be blown off from the discharge port 12Ba, rather than the configuration in which, as is the case with any one of the previously described embodiments of the present invention the oil supply port 28 for bearing lubrication purpose is provided separately from the discharge port 12Ba. In other words, the air oil supply port 28 may be concurrently used as the discharge port 12Ba for the compressed air. In this case, the air amount reduction for the supply of the air oil and the hole number reduction dedicated for the air oil can be achieved and, hence, the device construction can be simplified. Thereby, the reduction of the manufacturing cost can be achieved.

Figure 49:
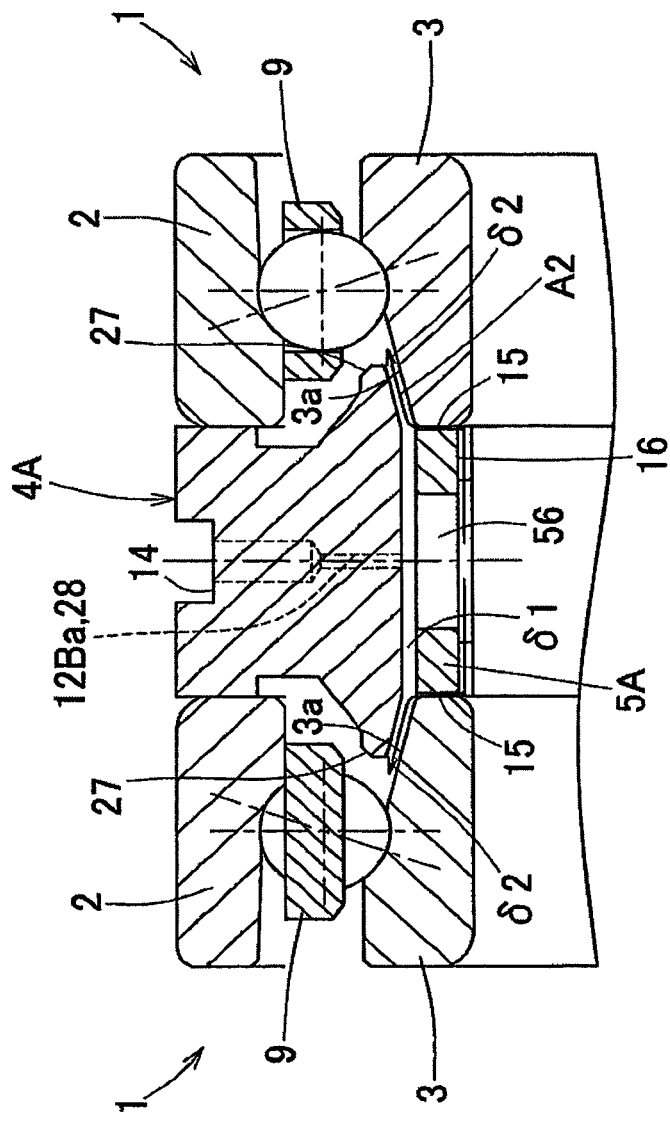
FIG. 49 is a longitudinal sectional view of the cooling device for the bearing device designed in accordance with a twelfth preferred embodiment of the present invention.

FIG. 49 shows a twelfth preferred embodiment of the present invention. Specifically, the dedicated air oil supply port 28 (shown in FIG. 48) is dispensed with and the discharge port 12Ba for the compressed air is allowed to concurrently serve as the air oil supply port 28. Also, an axially extending axial groove 16 is provided in a circumferential portion of the inner peripheral surface of the inner ring spacer 5A, where it is mounted on the main shaft. Yet, a circumferential portion of the axially opposite end surfaces in the inner ring spacer 5A is provided with radial grooves 15 and 15 which are communicated with the axial grove 16 and extend in the radial direction. According to this construction, as shown by the arrow lines A2 in FIG. 49, the air oil discharged onto the inner peripheral surface of the inner ring spacer 5A can, after having passed through the hole 56 in the inner ring spacer 5A, flows sequentially through the axial groove 16 and the radial grooves 15 and 15 to effectively perform the cooling of the inner ring 3 along with the cooling of the main shaft 7 and the inner ring spacer 5A. Also, at the time the air oil passes through the radial groove 15, the oil deposits on the inner ring end surface to form an attachment flow, and therefore, it can be utilized as a lubricant oil for the rolling bearing 1.

Figure 50:
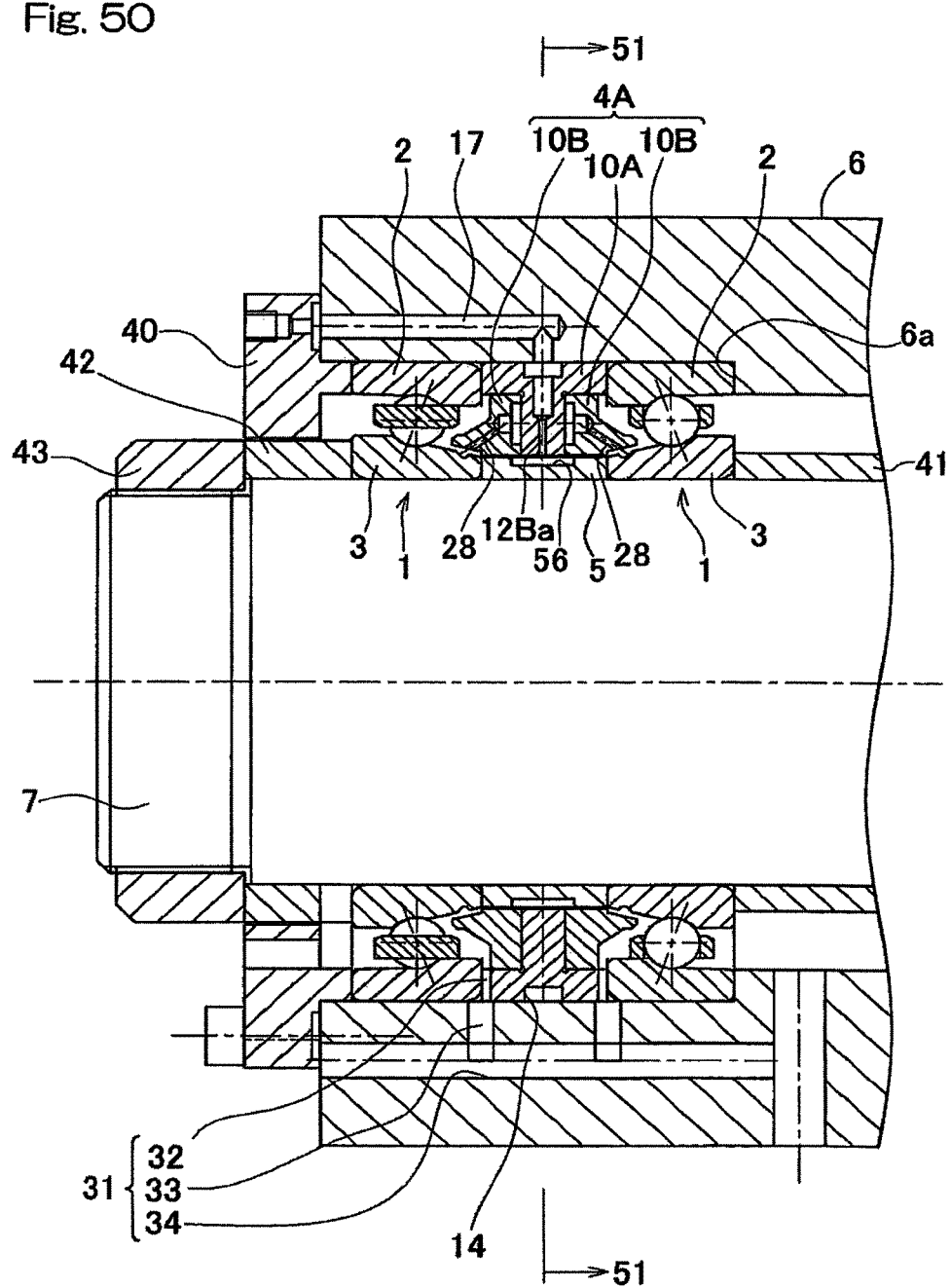
FIG. 50 is a longitudinal sectional view of the main shaft device in which the bearing device equipped with the cooling structure, which structure is designed in accordance with a thirteenth preferred embodiment of the present invention, is incorporated.
Figure 51:
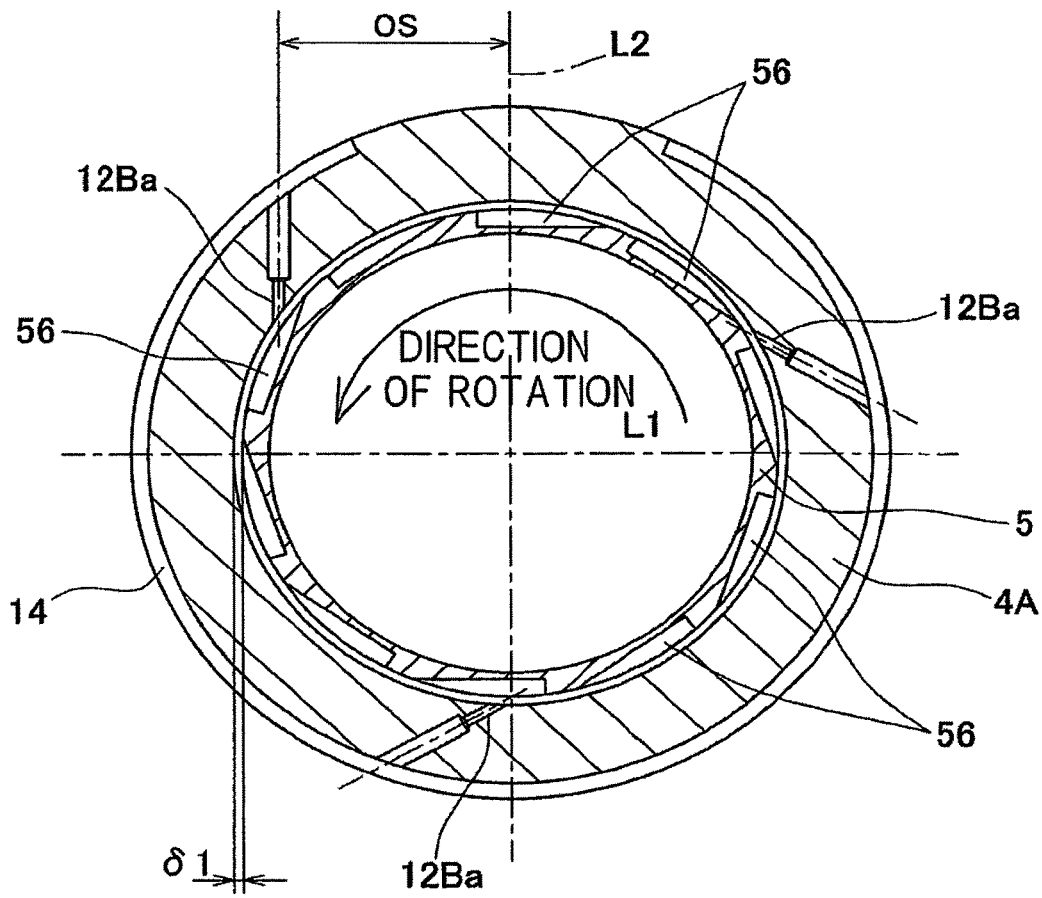
FIG. 51 is a cross sectional view taken along the line 51-51 in FIG. 50.
Figure 52:
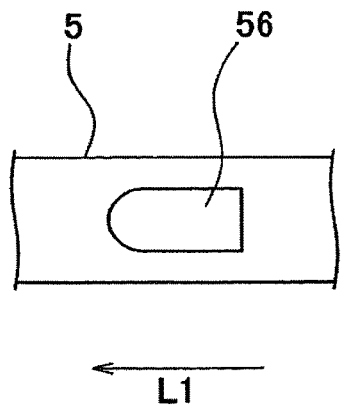
FIG. 52 is a diagram showing the hole in the inner ring spacer in the bearing device as viewed from an outer diametric side.

A thirteenth preferred embodiment of the present invention is shown in FIGS. 50 to 52. This cooling structure is suitably used in the bearing device in the form of an angular contact ball bearing for use with a high speed main shaft in which the temperature rise of the inner ring tends to be large and, hence, the preload exorbitance tends to become a problem. As shown in FIG. 50, the outer rings 1 and 1 of each of the rolling bearings 1 and 1 and the outer ring spacer 4A are axially positioned by a stepped portion 6a of the housing 6 and the end face lid 40. Also, the inner rings 3 and 3 of each of the rolling bearings 1 and 1 and the inner ring spacer 5A are axially positioned by the positioning spacers 41 and 42 on both sides. The positioning spacer 42 on the left side as shown is fixed by the nut 43 threadingly engaged on the outer periphery of the main shaft 7. The outer ring spacer 4A includes an outer ring spacer main body 10A and a pair of nozzles 10B and 10B for the air oil as is the case with those in the eleventh embodiment of the present invention shown in FIG. 48, and is used with the initial preload of the rolling bearing 1 set by the widthwise dimensional difference between the outer ring spacer main body 10A and the inner ring spacer 5.

In this cooling structure for the bearing device, as the hole 56 provided in the outer peripheral surface of the inner ring spacer 5, a hole, in the form of a non-throughhole, of a bucket shape that is relative to the outer peripheral surface of the inner ring spacer 5 is provided. As shown in FIG. 51, the hole 56 of the bucket shape is of an inclined shape having its bottom depth gradually increasing towards forward with respect to the direction L1 of rotation. The hole 56 of the bucket shape in the illustrated embodiment has a forward end of the direction of shaft rotation L1 as viewed from the outer diametric side, which end is rendered to represent an arcuate shape as shown in FIG. 52, but it may not be necessarily limited to the arcuate shape.

If the hole 56 is rendered to have a bucket shape as discussed above, the compressed air discharged from the discharge port 12Ba of the outer ring spacer 4A is effectively received by the hole 56, and therefore, a driving force of the main shaft 7 can be further assisted. In order to ascertain an effect delivered by the provision of the hole 56 of the bucket shape, the bearing device of the construction according to the thirteenth embodiment of the present invention shown in FIG. 49 has been tested.

Figure 53:
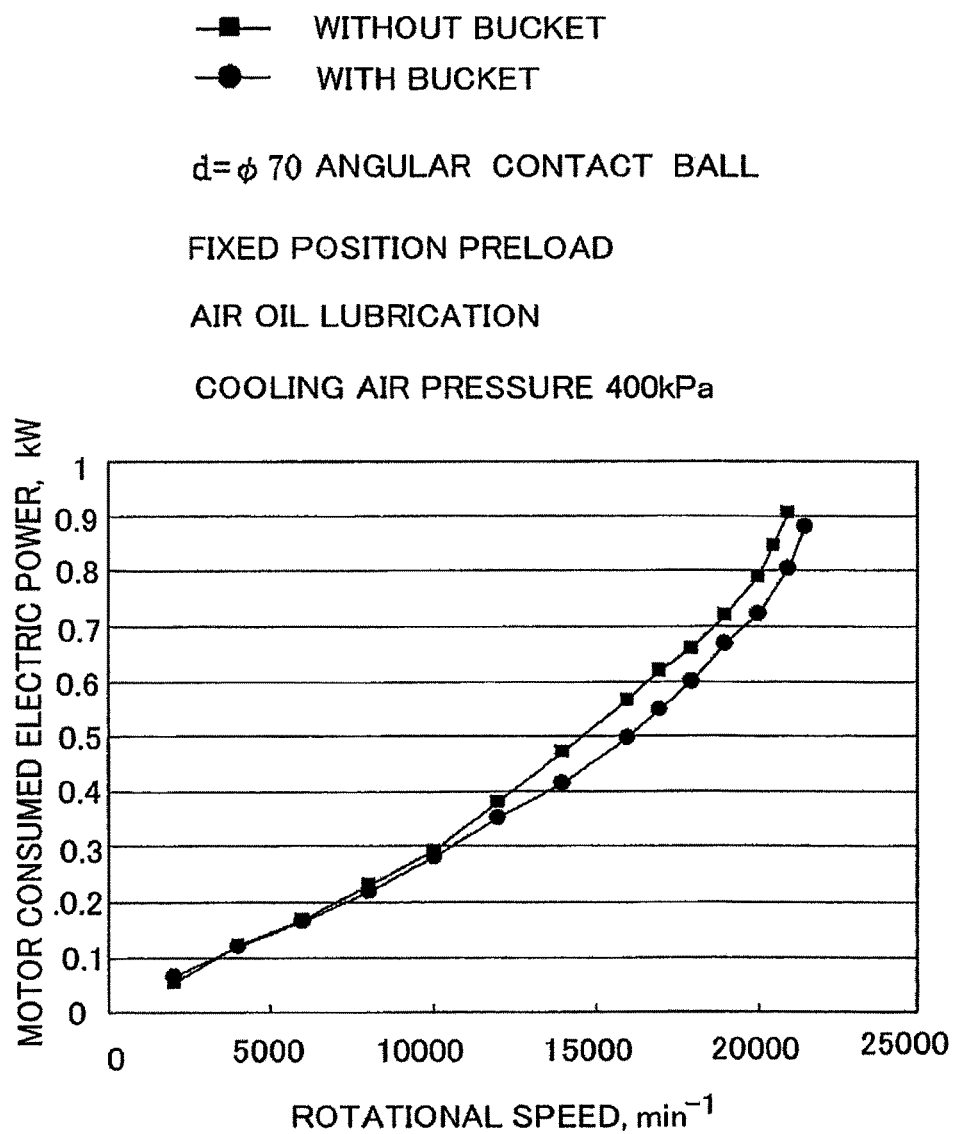
FIG. 53 is a characteristic chart showing the relationship between the rotational speed and the consumption of an electric power by a motor.
Figure 54:
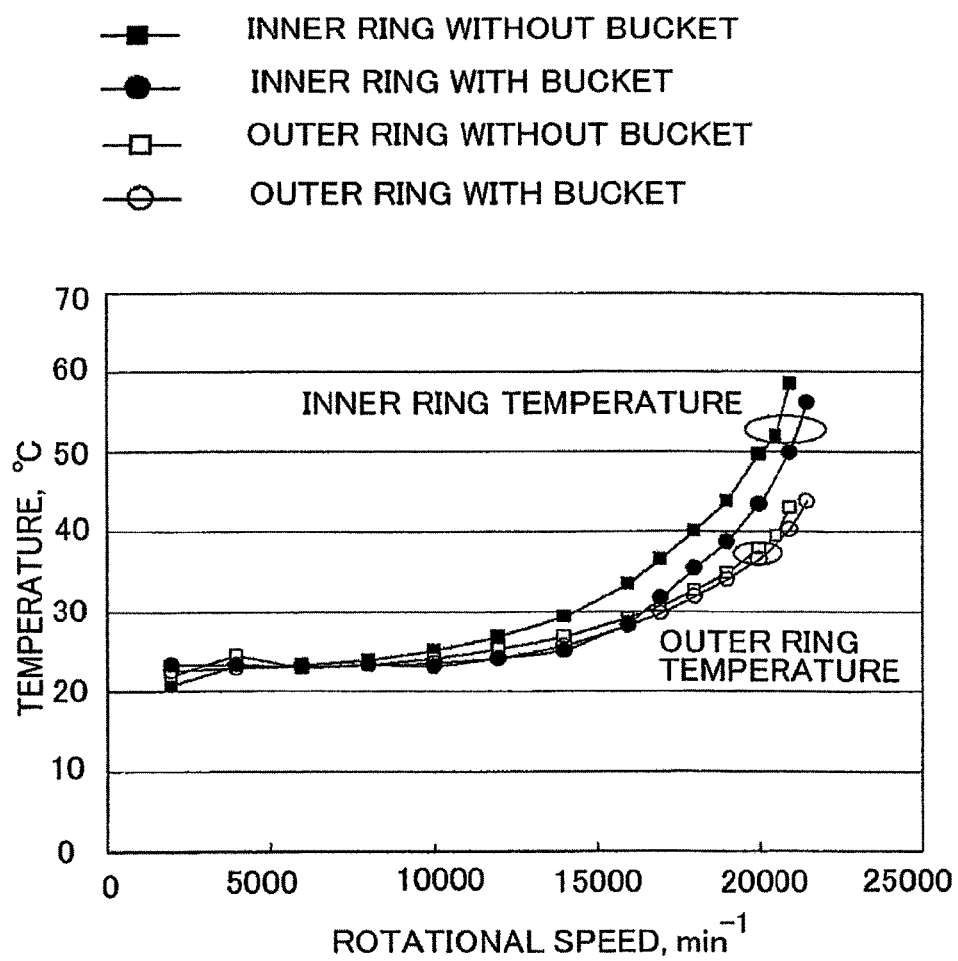
FIG. 54 is a characteristic chart showing the relationship between the rotational speed and the bearing temperature.

The test was conducted in such a manner that while the assisting the driving force of the main shaft 7 by means of the compressed air is accomplished by a method of replacing it with the electric power consumption of a drive motor, and the difference in electric power consumption is examined when the hole 56 of the bucket shape is employed in the inner ring spacer 5 and when it is not employed in the inner ring spacer 5. For the rolling bearing 1, an angular contact ball bearing of φ 70 mm in inner diameter was used. The injection pressure of the compressed air was 400 KPa. Drive of the main shaft 7 is accomplished by a built-in motor (not shown). FIG. 53 illustrates a relationship between a rotational speed and a motor consumed electric power. FIG. 54 illustrates the temperature result of the rolling bearing 1 at that time.

From the result of the test discussed above, it is readily understood that when the hole 56 of the bucket shape is provided, the motor electric power consumption is low, as compared with the case that such a hole is not provided. From this it may be said that the electric power consumption of the motor has been reduced as a result of the increase of the driving force brought about by the hole 56 of the bucket shape. In this connection, the motor electric power consumption at 20,000 $min^{-1}$ was reduced by about 100W thanks to the presence of the hole 56 of the bucket shape. The bearing temperature, also, was low in the presence of the hole 56 of the bucket shape as compared with that in the absence of the hole 56 of the bucket shape. This has led to the presumption that since the heat generation from the motor is alleviated as a result of reduction of the electric power consumption of the motor, heat transmitted from a motor section to the rolling bearing 1 was reduced. In particular, it is readily be understood that the temperature of the inner ring 3 decreased considerably as compared with the temperature of the outer ring 2 and the temperature rise of a motor rotor was suppressed.

When the compressed air is injected from the discharge port 12Ba of the outer ring spacer 4A towards the bucket shaped hole 56 of the inner ring spacer 5 then being rotated, the injection noise is generated within a space of the hole 56 and a wind noise is also generated by the plurality of the holes 56. In order to reduce those noises, such configurations are recommended as shown in FIGS. 55 and 56 which pertain respectively to fourteenth and fifteenth preferred embodiments of the present invention.

Figure 55:
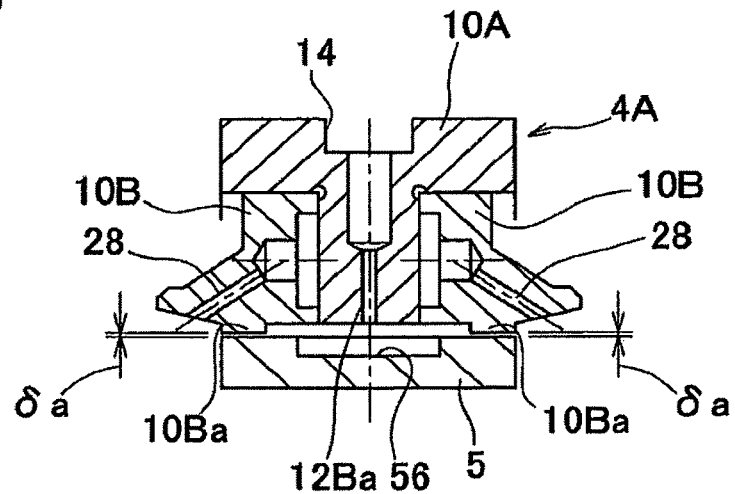
FIG. 55 is a longitudinal sectional view showing a portion of the cooling structure in the bearing device, which is designed in accordance with a fourteenth preferred embodiment of the present invention.

The cooling structure for the bearing device shown in FIG. 55 and designed in accordance with the fourteenth embodiment of the present invention is such that the dimension of the radial gap δa delimited between the axially outer end portion of the inner peripheral surface of the nozzle 10B of the outer ring spacer 4A and the axially outer end portion of the hole 56 in the outer peripheral surface of the inner ring spacer 5 is reduced. In this embodiment, the dimension of the radial gap δa referred to above is reduced by the provision of the projection 10Ba in the axially outer end portion of the nozzle 10B so as to protrude towards the inner diametric side, but the dimension of the radial gap δa referred to above may be reduced by the provision of a projection (not shown) in the axially opposite end portions of the inner ring spacer 5 so as to project towards the outer diametric side.

Figure 56:
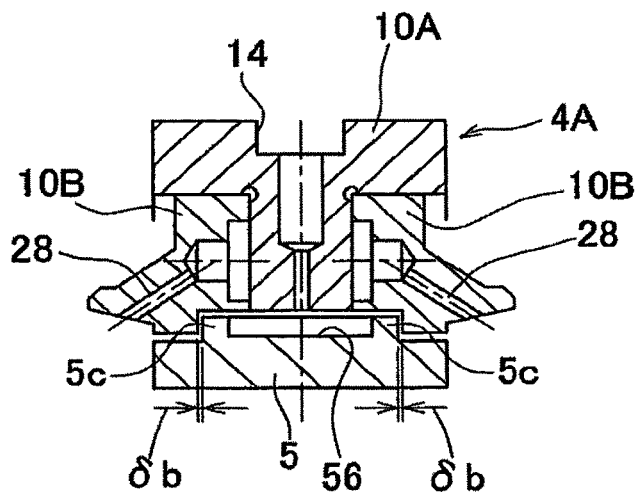
FIG. 56 is a longitudinal sectional view showing a portion of the cooling structure in the bearing device, which is designed in accordance with a fifteenth preferred embodiment of the present invention.

The cooling structure for the bearing device shown in FIG. 56 and designed in accordance with the fifteenth embodiment of the present invention is such that the axially intermediate portion of the outer peripheral surface of the inner ring spacer 5 including the hole 56 of the bucket shape is rendered to be a projection 5C that protrudes towards the outer diametric side and, also, the inner peripheral surface of the nozzle 10B is rendered to have a stepped shape with the inner diameter of the axially intermediate portion being large, the axial gap δb being formed by the opposite side surfaces of the projection 10Ba of the inner ring spacer 5 and a step of the nozzle 10B.

The gap surface area of the radial gap δa and that of the axial gap δb are so chosen, in consideration of the discharge of the compressed air for cooling purpose, as to be about ten times the total sectional surface area of the discharge port 12Ba for the compressed air. The "gap surface area" referred to above means a surface area of one of the radial and axial gaps δa and δb on the axially opposite sides, which is on one side. It is to be noted that the gap surface area of the radial gap δa is calculated by (the gap dimension of the radial gap δa) multiplied by (the circumferential length of the radial gap δa) and, on the other hand, the gap surface area of the axial gap δb is calculated by (the gap dimension of the axial gap δb)) multiplied by (the circumferential length of the axial gap δb). This is a numerical value delivered from the result of the test, and by associating the total sectional surface area of the discharge port 12Ba and the gap surface area with each other, the flow of the compressed air for cooling purpose is small and the reasonable noise reduction can be achieved.

Figure 57:
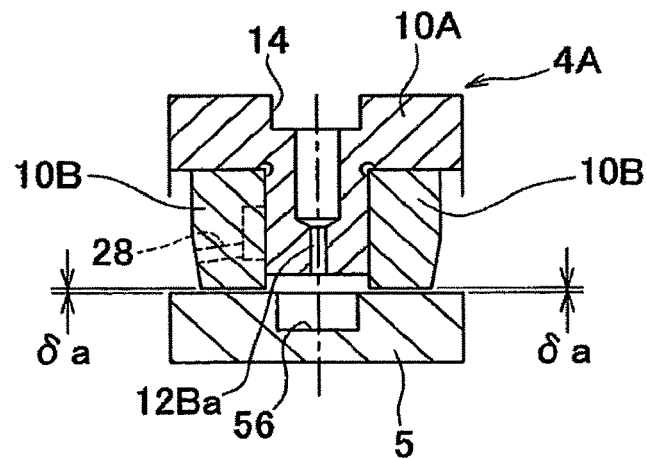
FIG. 57 is a longitudinal sectional view showing a portion of the cooling structure in the bearing device, which is designed in accordance with a sixteenth preferred embodiment of the present invention.
Figure 58:
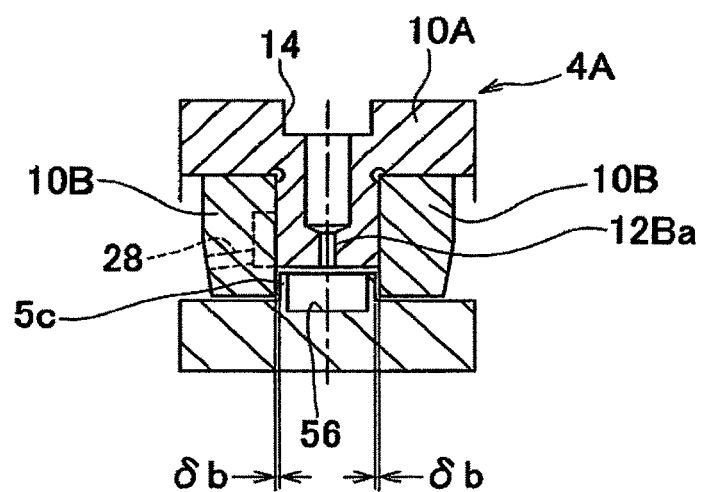
FIG. 58 is a longitudinal sectional view showing a portion of the cooling structure in the bearing device, which is designed in accordance with a seventeenth preferred embodiment of the present invention.

As shown in FIGS. 57 and 58 pertaining respectively to sixteenth and seventeenth preferred embodiments of the present invention, the structure for reducing the noise by means of the compressed air can be equally applied, in a manner similar to that described hereinabove, even to the construction in which the outer ring spacer 4A is of a structure having the air oil supply port 28 for discharging the air oil directly onto the raceway surface of the inner ring 3. In other words, as is the case with the sixteenth embodiment shown in FIG. 57, the gap dimension δa of the radial gap delimited between the inner peripheral surface of the nozzle 10B of the outer ring spacer 4 and the axially outer portion of the hole 56 in the outer peripheral surface of the inner ring spacer 5 is reduced. Also, as is the case with the seventeenth embodiment shown in FIG. 58, the axially intermediate portion including the bucket shaped hole 56 in the outer peripheral surface of the inner ring spacer 5 is rendered to be a projection 5c protruding towards the outer diametric side and, also, the nozzle 10B is rendered to project towards the inner diametric side beyond the outer ring spacer main body 10A, so that the axial gap δb is formed by the opposite side surfaces of the projection 5c of the inner ring spacer 5 and the side surface of that portion of the nozzle 10B protruding towards the inner diametric side.

Figure 59:
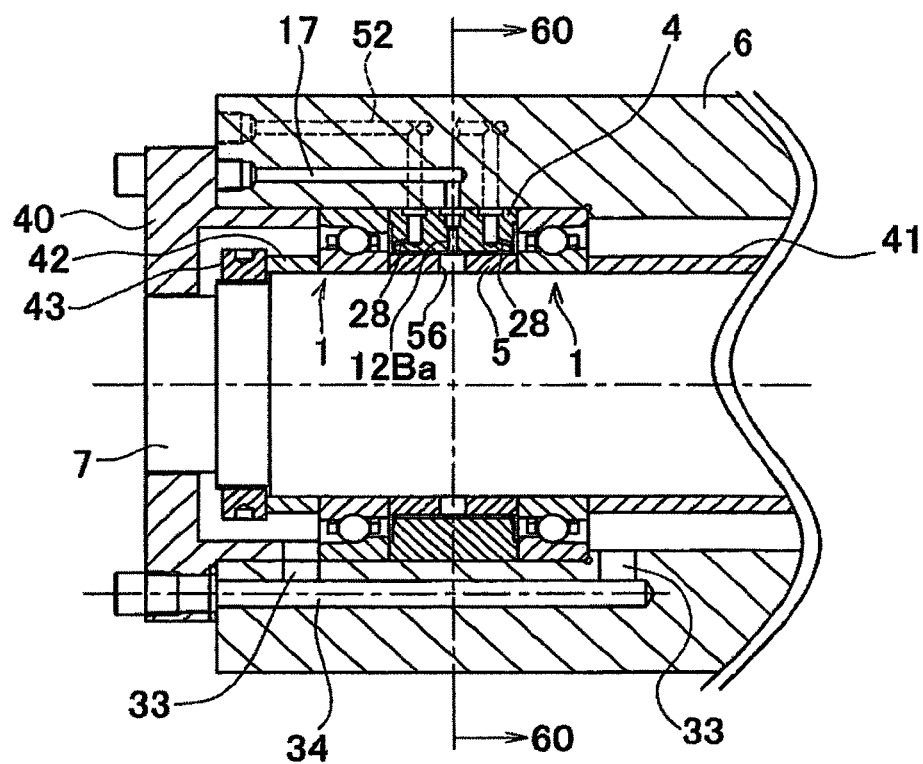
FIG. 59 is a longitudinal sectional view of the main shaft device in which the bearing device equipped with the cooling structure, which structure is designed in accordance with an eighteenth preferred embodiment of the present invention, is incorporated.
Figure 60:
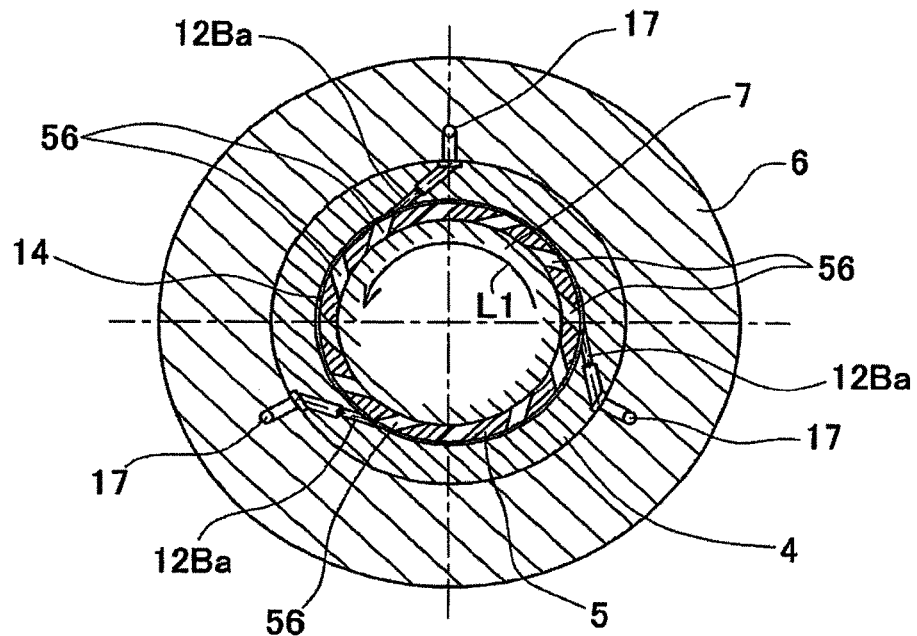
FIG. 60 is a cross sectional view taken along the line 60-60 in FIG. 59.

FIGS. 59 and 60 illustrate the cooling structure for the bearing device designed in accordance with an eighteenth preferred embodiment of the present invention. As shown in FIG. 60, the hole 56 of the inner ring spacer 5 may be gradually inclined on a rotational direction L1 side of the main shaft 7 from the outer peripheral surface of the inner ring spacer 5 towards the inner peripheral surface thereof. If the hole 56 is in the form of the inclined hole, the injection pressure of the compressed air discharged from the discharge port 12Ba can be efficiently received by the hole 56 and, hence, the effect to assist the driving force of the main shaft 7 is high. In this embodiment, the compressed air is supplied from the individual cooling air supply holes 17 to each of the discharge ports 12Ba of the outer ring spacer 4.

Figure 61:
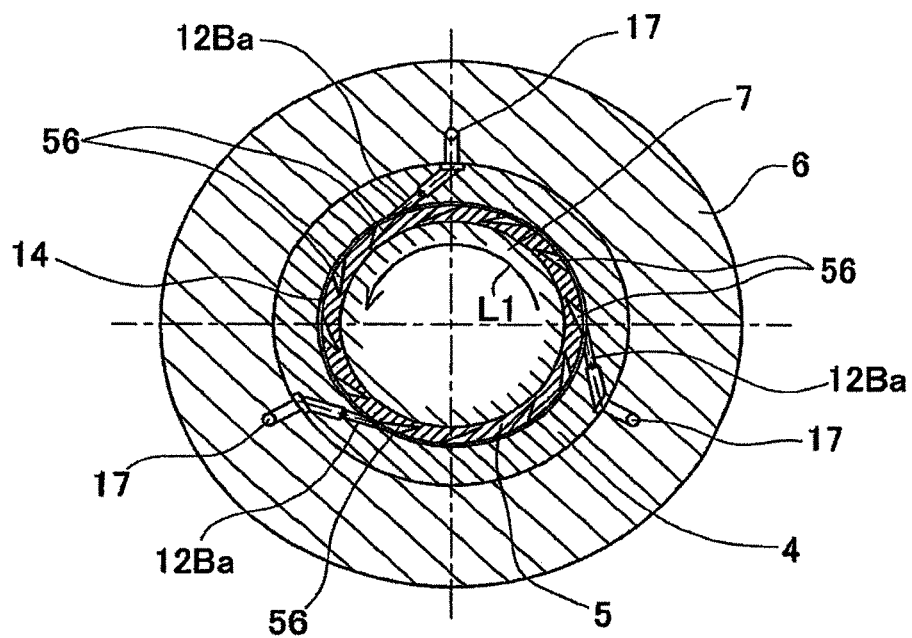
FIG. 61 is a sectional view of a plane, corresponding to the line 60-60 in FIG. 59, of the cooling structure for the bearing device designed in accordance with a nineteenth preferred embodiment of the present invention.
Figure 62:
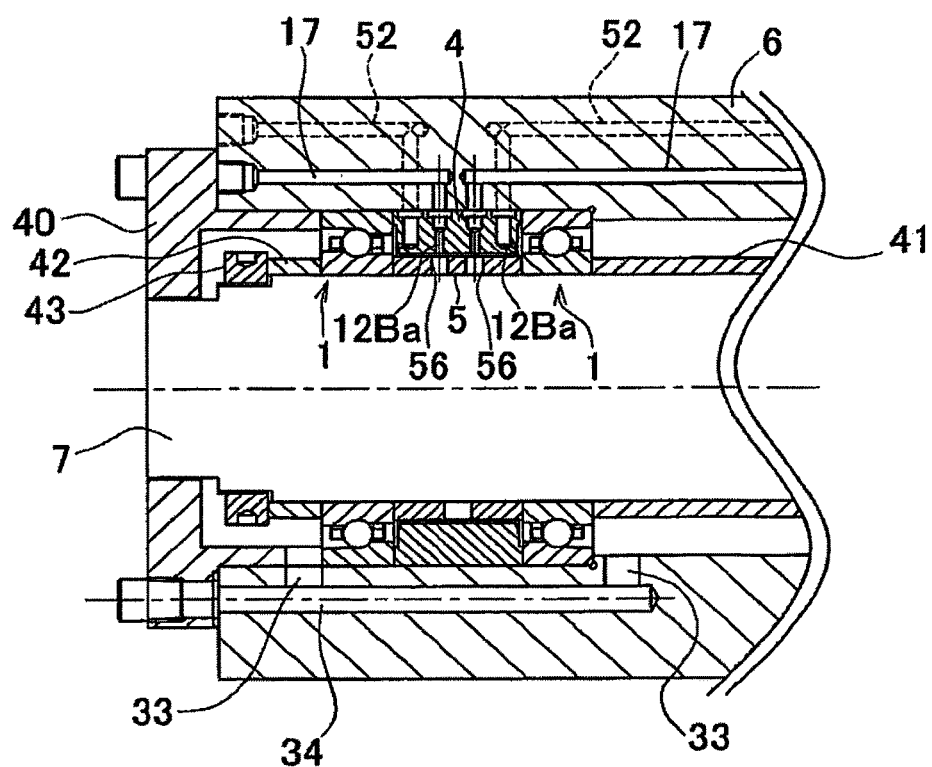
FIG. 62 is a longitudinal sectional view of the main shaft device in which the bearing device equipped with the cooling structure, which structure is designed in accordance with a twentieth preferred embodiment of the present invention, is incorporated.

As shown in FIG. 61 in connection with a nineteenth preferred embodiment of the present invention, the hole 56 of the inner ring spacer 5 may be formed to represent an inclined recess portion, which is inclined in the direction L1 of rotation of the main shaft 7 towards a bottom side. Even in this case, a effect similar to that afforded by the previously described inclined hole can be obtained.

Where the axial length of the outer ring spacer 4 can have a relatively large value, the discharge ports 12Ba and 12Ba for the compressed air may be disposed at a plurality of different axial sites of the outer ring spacer 4 as shown in FIG. 62 which shows a twenties preferred embodiment of the present invention. Each of the discharge ports 12Ba is caused to incline forwardly with respect to the direction of rotation of the main shaft 7. The provision of the discharge ports 12Ba and 12Ba in the plurality of the axial site is effective to further assist the driving force of the main shaft 7.

Figure 63:
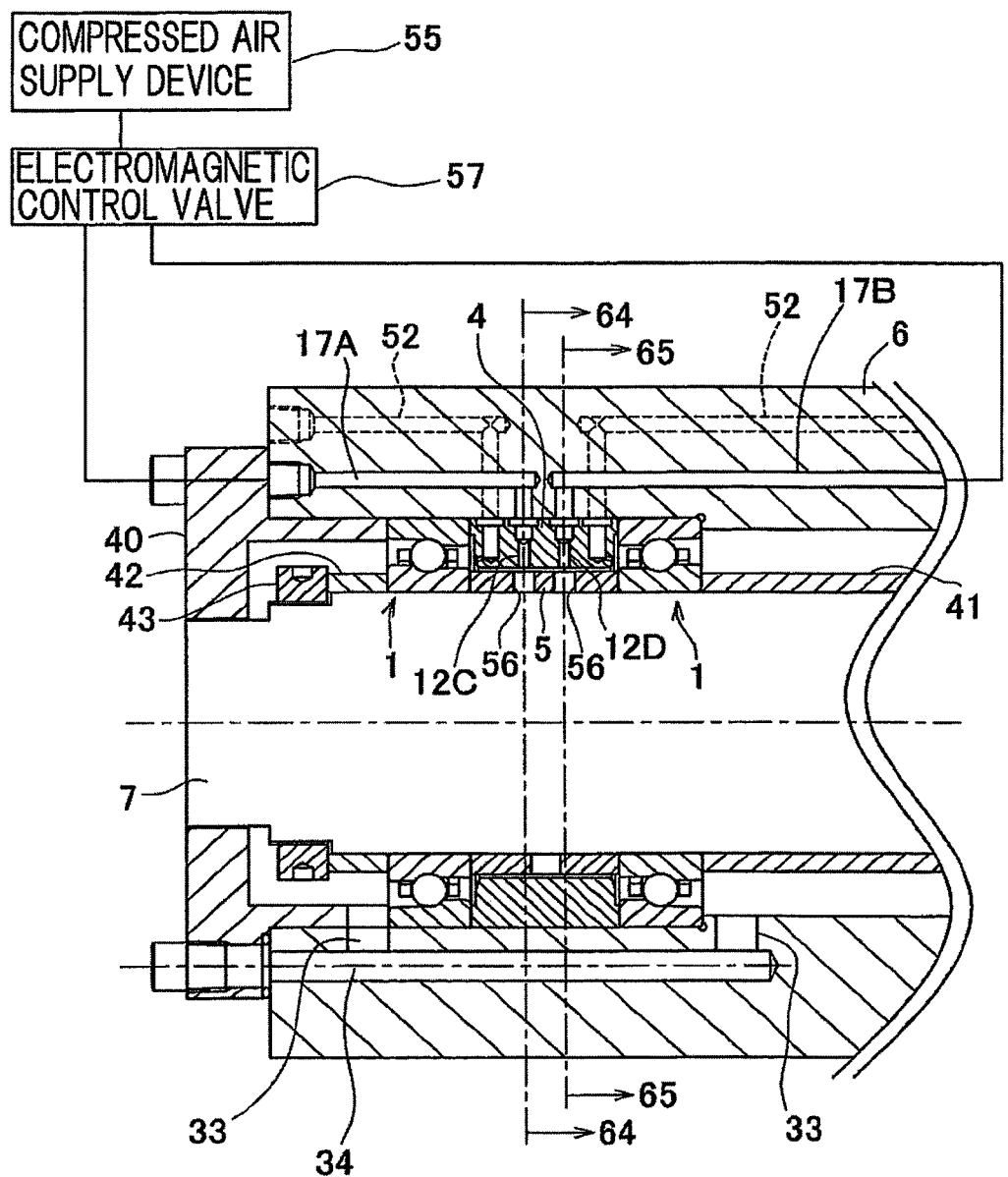
FIG. 63 is a longitudinal sectional view of the main shaft device in which the bearing device equipped with the cooling structure, which structure is designed in accordance with a twenty first preferred embodiment of the present invention, is incorporated.
Figure 64:
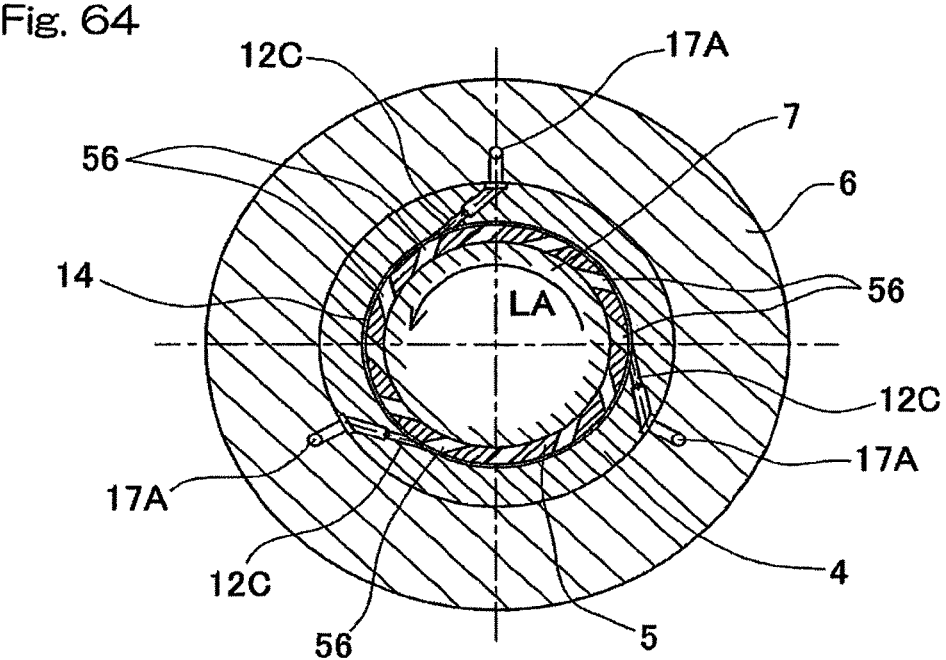
FIG. 64 is a cross sectional view taken along the line 64-64 in FIG. 63.
Figure 65:
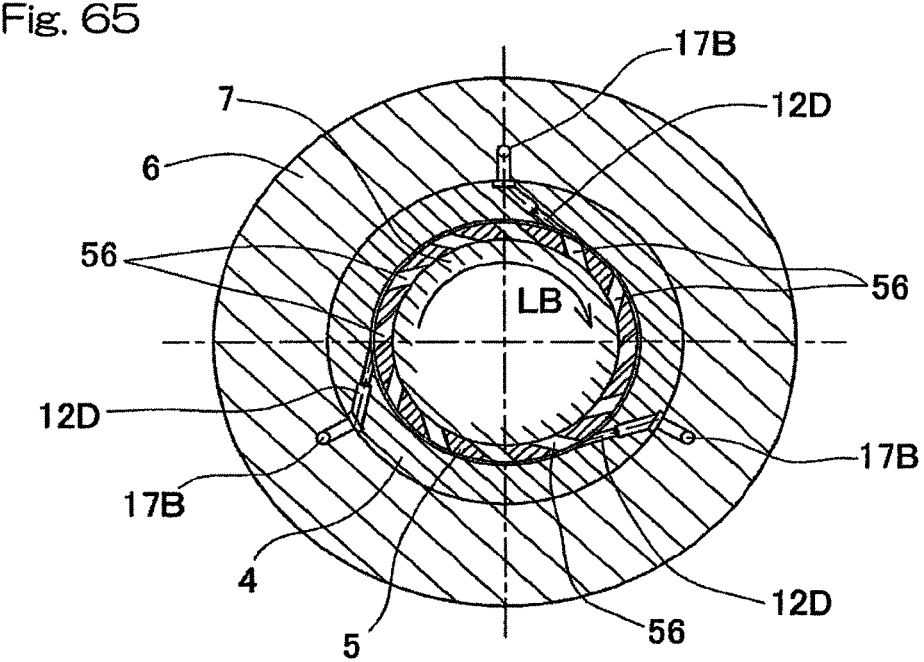
FIG. 65 is a cross sectional view taken along the line 65-65 in FIG. 63.

A twenty first preferred embodiment of the present invention shown in FIGS. 63 to 65 is directed to the cooling structure for the bearing device that is suited to support the main shaft that rotates in positive and negative directions opposite to each other as is the case with a main shaft used in a machining center. As shown in FIG. 63, the outer ring spacer 4 of this cooling structure is provided with discharge ports 12O and 12D for the compressed air at two axially different sites. One discharge port 12O is, as shown in FIG. 64, inclined forwardly with respect to the positive direction LA of rotation of the main shaft 7, whereas the other discharge port 12D is, as best shown in FIG. 65, inclined forwardly of the direction LB of reverse rotation of the main shaft 7. As shown in FIG. 63, an electromagnetic control valve 57 is provided on a path through which the compressed air can be supplied from the compressed air supply device 55 to the cooling air supply holes 17A and 17B of the housing 6 and, by controlling this electromagnetic control valve 57, the compressed air can be supplied to one of the discharge ports 12O and 12D through the associated cooling air supply hole 17A or 17B.

According to the above described construction, during the positive rotation of the main shaft 7 the compressed air is discharged from the discharge port 12C, but the compressed air is discharged from the discharge port 12D during the reverse rotation to thereby assist the driving force of the main shaft 7 during the positive and negative rotations, respectively. Also, if the compressed air is discharged from the discharged port 12D when the main shaft 7 is stopped from the state of positive rotation, and on the other hand, is discharged from the discharge port 12O when the main shaft 7 is stopped from the state of negative rotation, it can be utilized as a brake for the main shaft 7.

Figure 66:
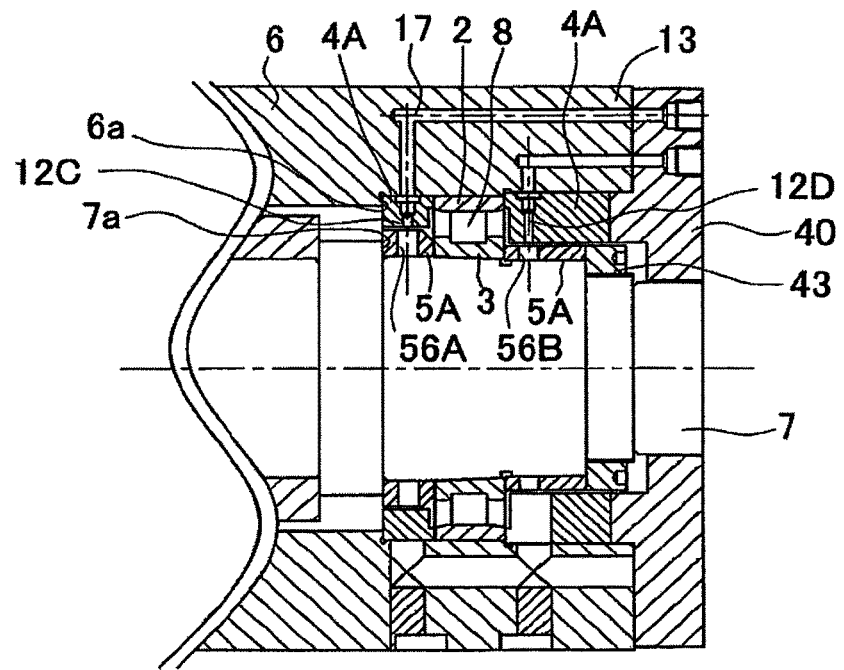
FIG. 66 is a longitudinal sectional view showing the cooling structure for the bearing device designed in accordance with a twenty second preferred embodiment of the present invention.

A twenty second preferred embodiment of the present invention is shown in FIG. 66 in connection with a cylindrical roller bearing used for the rolling bearing 1. This bearing device is such that two outer ring spacers 4A and 4B are disposed on both sides of the rolling bearing 1 in the form of the cylindrical roller bearing and, also, two inner ring spacers 5A and 5B are disposed on both sides of the inner ring 3. The outer ring 2 and the outer ring spacers 4A and 4B are axially positioned by the stepped portion 6a of the housing 6 and the end surface lid 40, and the inner ring 3 and the inner ring spacers 5A and 5B are positioned by a stepped portion 7a of the main shaft 7 and a nut 43 mounted on the outer peripheral surface of the main shaft 7.

Figure 67:
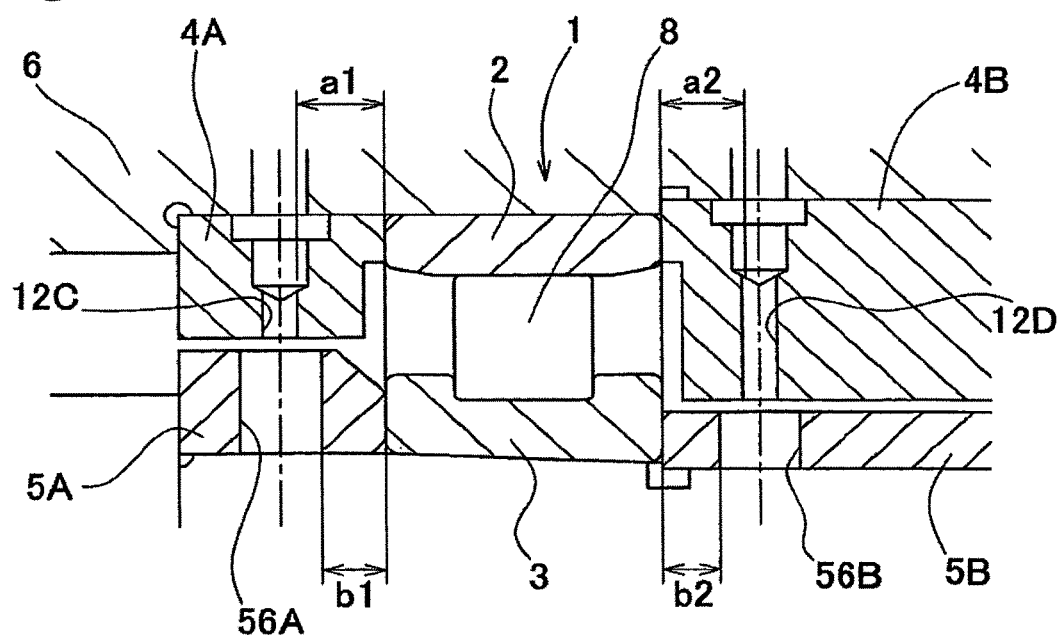
FIG. 67 is a fragmentary enlarged diagram of FIG. 66.

Respective inner peripheral surface of the outer ring spacers 4A and 4B are provided with the discharge ports 12C and 12D for discharging therethrough the compressed air for cooling purpose, and respective inner peripheral surfaces of the inner ring spacers 5A and 5B are provided with holes 56A and 56B for receiving the compressed air discharged from the discharge ports 12C and 12D. As shown in FIG. 67, respective positional relationship between the discharge ports 12C and 12D in the outer ring spacers 4A and 4B and the holes 56A and 56B of the inner ring spacers 5A and 5B, which are opposed to each other, are so chosen as to be a1>b1 and a2>b2, wherein a1 and a2 each represent the distance from an end surface of the outer ring 2 to the discharge port 12C and 12D and b1 and b2 each represent the distance from an end surface of the inner ring 3 to the hole 56A and 56B.

Figure 68:
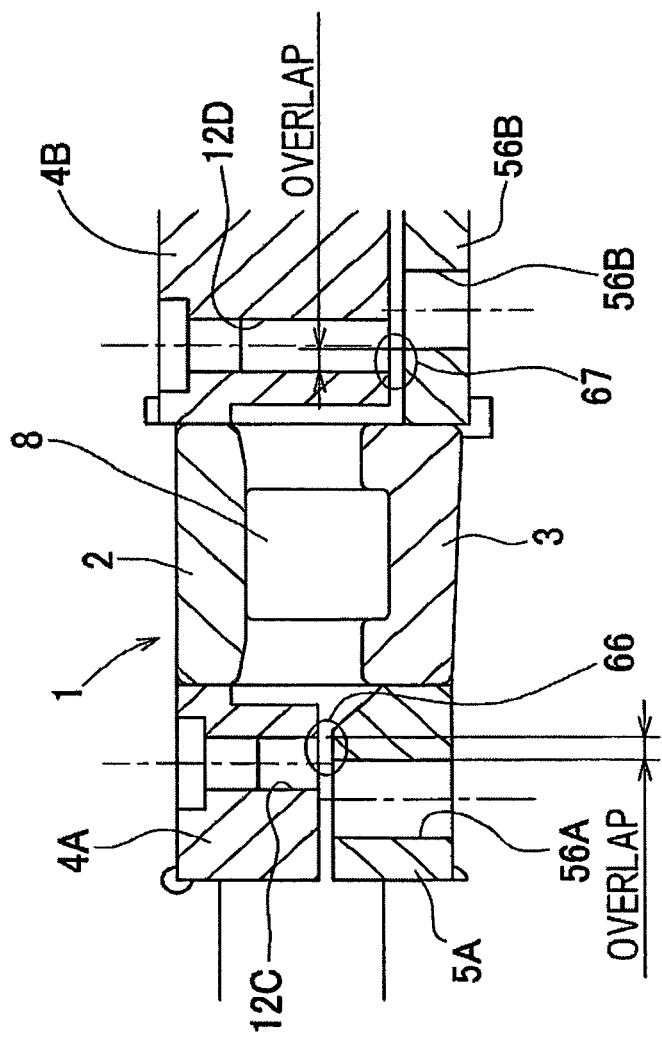
FIG. 68 is a longitudinal sectional view used to explain the positional relationship between a discharge port in the outer ring spacer and the hole in the inner ring spacer.

Since the cylindrical roller bearing is such that a line contact takes place between cylindrical rollers, which form the rolling elements 8, and the inner and outer rings 3 and 2, it is desirable that the cooling is applied uniformly from both sides of the bearing. Also, where the discharge port 12C and 12D for the compressed air are provided in the outer ring spacers 4A on both sides, when the cooling air discharged from the discharge ports 12C and 12D on both sides flows mutually towards the rolling bearing 1, the cooling air and the air oil will stagnate within the bearing space, which thus appears to constitute a cause of the excessive temperature rise. As is the case with, for example, FIG. 68, if the discharge ports 12C, 12D of the outer ring spacers 4A, 4B and the holes 56A, 56B of the inner ring spacers 5A, 5B are overlapped in the axial direction, the inner ring spacers 5A and 5B will receive the cooling air at respective overlapped portions 66 and 67 and, hence, a portion of the cooling air will come to flow towards the inside of the bearing. If the positional relationships between those discharge ports 12C, 12D and the holes 56A, 56B are so defined as hereinabove described, the compressed air for cooling, which is discharged to the discharge ports 12C and 12D, can be effectively utilized for the assist of the driving force of the main shaft 7, resulting in a smooth discharge thereof.

A twenty third preferred embodiment of the present invention, which is a grease lubrication, will now be described. The basic construction of this twenty third embodiment is similar to the construction shown in and described with particular reference to FIGS. 35 and 36 in connection with the previously described sixth embodiment of the present invention, and therefore, those drawings are invoked, and drawings similar to those drawings are not reiterated. Even in this bearing device J, as shown in FIGS. 35 and 36, as is the case with the bearing device of air oil lubrication type, the outer ring spacer 4 is interposed between the outer rings 2 and 2 of the plurality of the rolling bearings 1 and 1, and the inner ring spacer 5 is interposed between the inner rings 3 and 3 of the plurality of the rolling bearings 1 and 1. For each of the rolling bearings 1, an angular contact ball bearing is employed. The plurality of rolling elements 8 are interposed between the respective raceway surfaces of the inner and outer rings 3 and 2, and those rolling elements 8 are retained by the retainer 9 in the circumferentially equidistantly spaced relation to each other. In addition, the bearing device J, which employs the grease lubrication, makes use of sealing members 38 and 38 for sealing the bearing space S1 delimited between the outer ring 2 and the inner ring 3, which members 38 and 38 are respectively fitted to opposite axial ends of the outer ring 2.

Figure 70:
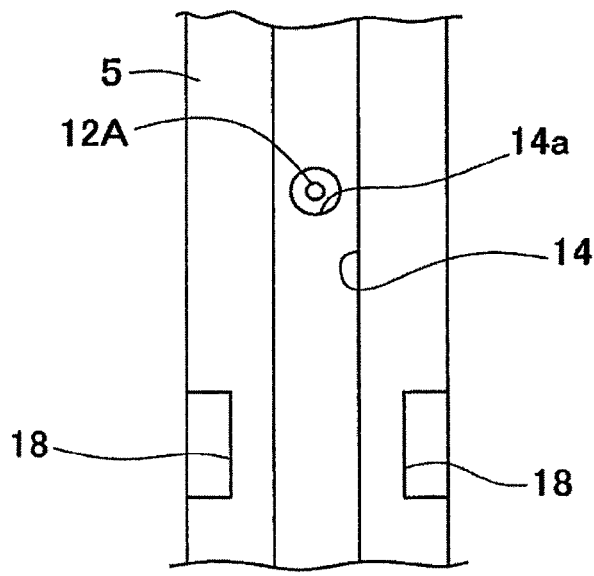
FIG. 70 is a diagram showing a portion of the outer ring spacer, employed in the bearing device, which is deployed.
Figure 71:
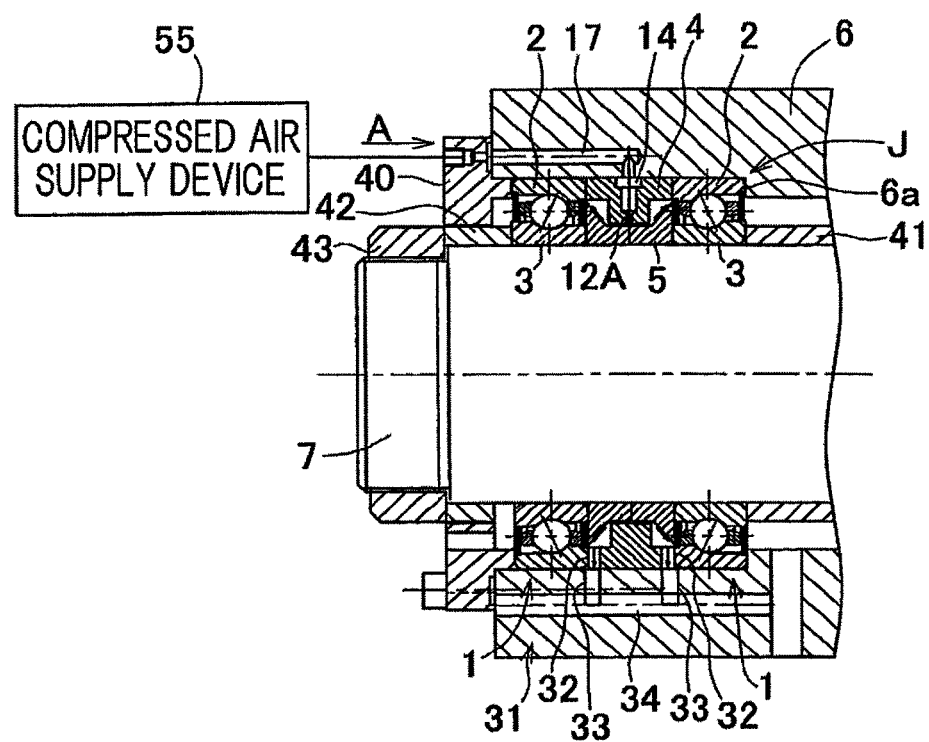
FIG. 71 is a longitudinal sectional view showing the main shaft device of the machine tool in which the bearing device shown in FIGS. 69 and 70 is incorporated.

In the above described embodiment, the discharge port 12Ba and the cutout 18 are disposed in the same circumferential position, but as in a twenty fourth preferred embodiment of the present invention shown in FIGS. 70 and 71, the discharge port 12Ba and the cutout 18 may be disposed with their respective circumferential positions displaced relative to each other. If the respective circumferential positions of discharge port 12Ba and the cutout 18 are displaced relative to each other, the compressed air A supplied from the discharge port 12Ba to the spacer space S2, when flowing up to the cutout 18 along the outer peripheral surface of the inner ring spacer 5, undergoes a movement in the circumferential direction besides the movement in the axially outer side. Therefore, the compressed air A contacts the inner ring spacer 5 a substantial length of time and, hence the effect of cooling the bearing device J and the main shaft 7 is enhanced.

Figure 69:
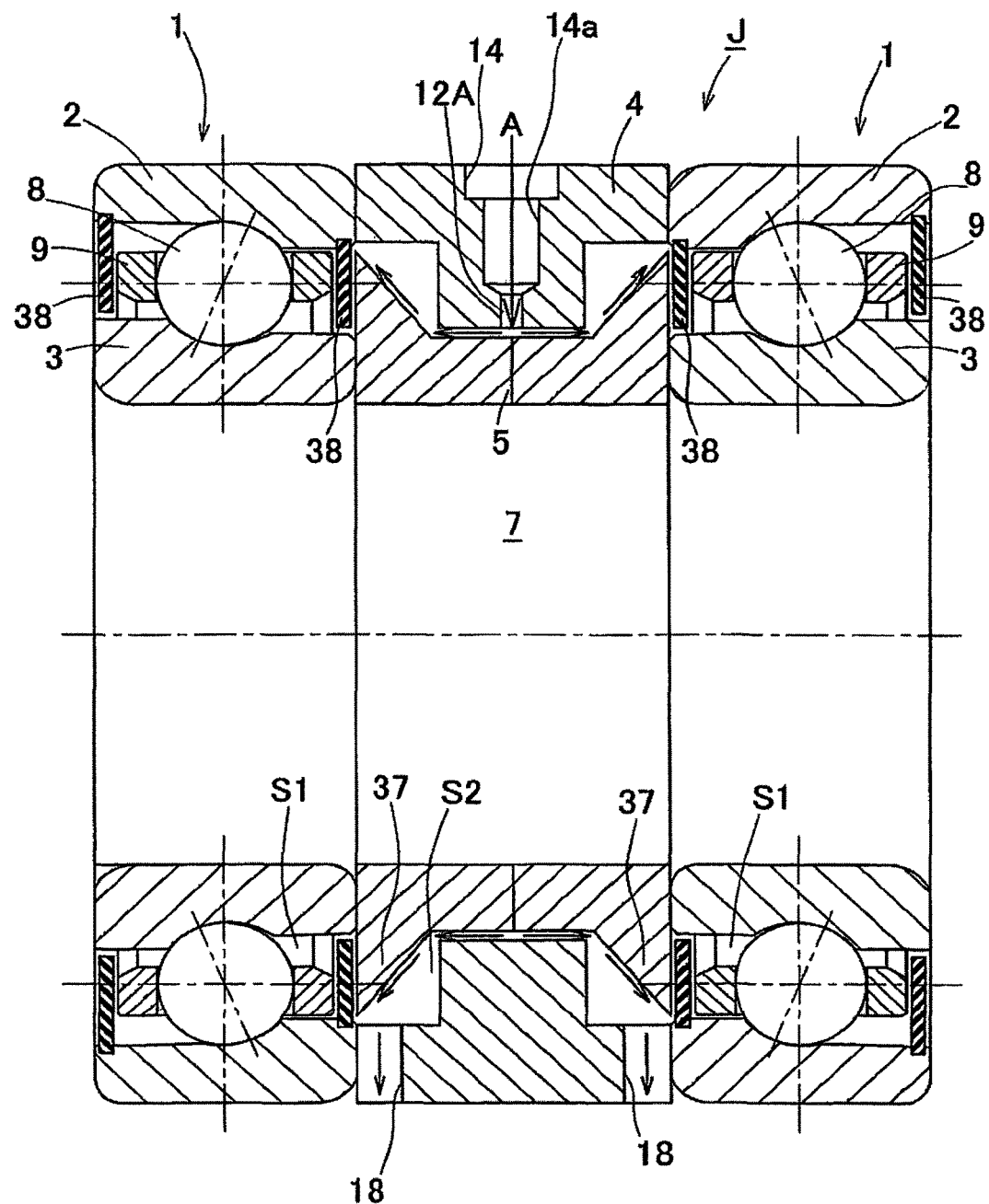
FIG. 69 is a longitudinal sectional view of the bearing device equipped with the cooling structure designed in accordance with a twenty fourth preferred embodiment of the present invention.

FIG. 71 is a sectional view showing a portion of the main shaft device of the machine tool, in which the bearing device designed in accordance with the previously described twenty third or twenty fourth embodiment of the present invention shown in FIG. 69 or FIG. 70 has been incorporated. The structure of the main shaft device is identical with that employed in the practice of the thirteenth embodiment of the present invention shown in and described with reference to FIG. 50 and, therefore, the details of the various parts of the main shaft device will not be reiterated.

Figure 72A:
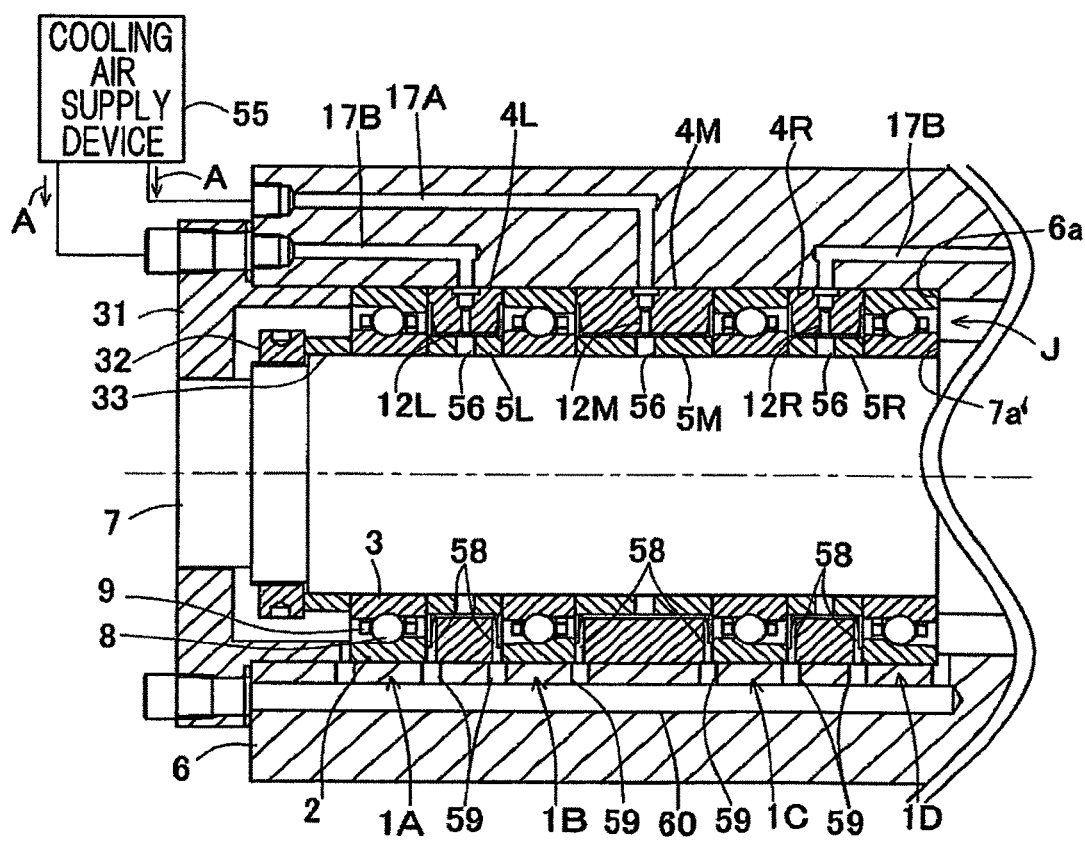
FIG. 72A is a longitudinal sectional view of the main shaft device in which the bearing device equipped with the cooling structure, which structure is designed in accordance with a twenty fifth preferred embodiment of the present invention, is incorporated.

The cooling structure for the bearing device designed in accordance with a twenty fifth preferred embodiment of the present invention will be hereinafter described with particular reference to FIGS. 71A and 72B to FIG. 74. As will be described later, the twenty fifth preferred embodiment of the present invention is different from the previously described first embodiment in that each of the outer ring spacers 4 includes oil supply ports 28A, 28B for supplying an air oil (a mixture of air with oil) AO defined in an axial end portion of such spacer 4. Also, the inner peripheral surface of each of the outer ring spacers 4 is provided with cooling air discharge port 12L, 12M or 12R for discharging the cooling air A towards the outer peripheral of the inner ring spacer 5. The relationship of the flow or the pressure of the cooling air A discharged respectively from the cooling air discharge ports 12L, 12M and 12R is such a relationship that the cooling air A discharged from the cooling air discharge port 12L, 12M and 12R of the outer ring spacer 4 positioned downstream with respect to the direction of flow of the air oil AO does not run counter to the flow of the air oil AO. Although FIG. 72A illustrates the bearing device J in a condition having been incorporated in the main shaft device of the machine tool, the present invention is not necessarily limited to the machine tool. As shown therein, the bearing device J makes use of four rolling bearings 1A, 1B, 1C and 1D juxtaposed axially relative to each other, in which outer ring spacers 4L, 4M and 4R are interposed between the outer rings 2 of the neighboring rolling bearings, and inner ring spacers 5L, 5M and 5R are interposed between the inner rings 3 of the neighboring rolling bearings.

In the bearing device J, the outer ring 2 of each of the rolling bearings 1A, 1B, 1C or 1D and the outer ring spacers 4L, 4M and 4R are mounted on the inner peripheral surface of the housing 6, and the inner ring 2 of each of the rolling bearings 1A, 1B, 1C or 1D and the inner ring spacers 5L, 5M and 5R are mounted on the outer peripheral surface of the main shaft 7 of the machine tool. By way of example, the outer ring 2 and the outer ring spacers 4L, 4M, 4R are loosely mounted on the housing 6, and the inner ring 3 and the inner ring spacers 5L, 5M, 5R are mounted under interference fit on the main shaft 7. The outer ring 2 of the rolling bearing 1D on the right end of the drawing is axially positioned by the stepped portion 6a of the housing 6, and the inner ring 3 of such rolling bearing 1D is axially positioned by the stepped portion 7a of the main shaft 7. Also, an outer ring stopper 31 is applied under pressure to the outer ring 2 of the rolling bearing 1A on the left end of the drawing whereas a positioning spacer 33 is applied under pressure to the inner ring 3 of such rolling bearing 1A by means of a nut 32, whereby the bearing device J is fixed to the housing 6 in a state with the preload applied thereto.

Each of the rolling bearings 1A, 1B, 1C and 1D is in the form of an angular contact ball bearing, and includes a plurality of rolling elements 8 sandwiched between the raceway surfaces of the inner and outer rings 3 and 2, with the rolling elements 8 being circumferentially equidistantly retained by the retainer 9. The two rolling bearings 1A and 1B on the left side and the two rolling bearings 1C and 1D on the right side are each in a parallel combination, and the rolling bearings 1B and 1C at an intermediate portion are in back-to-back combination. The outer ring 2 of each of the rolling bearings 1A, 1B, 1C and 1D and the outer ring spacers 4L, 4M and 4R are disposed in the housing 6 of the main shaft device whereas the inner ring 3 of each of the rolling bearings 1A, 1B, 1C and 1D and the inner ring spacers 5L, 5M and 5R are mounted on the outer peripheral surface of the main shaft 7.

The cooling structure of the above described bearing device J will now be described in detail. As shown in FIGS.

Figure 74:
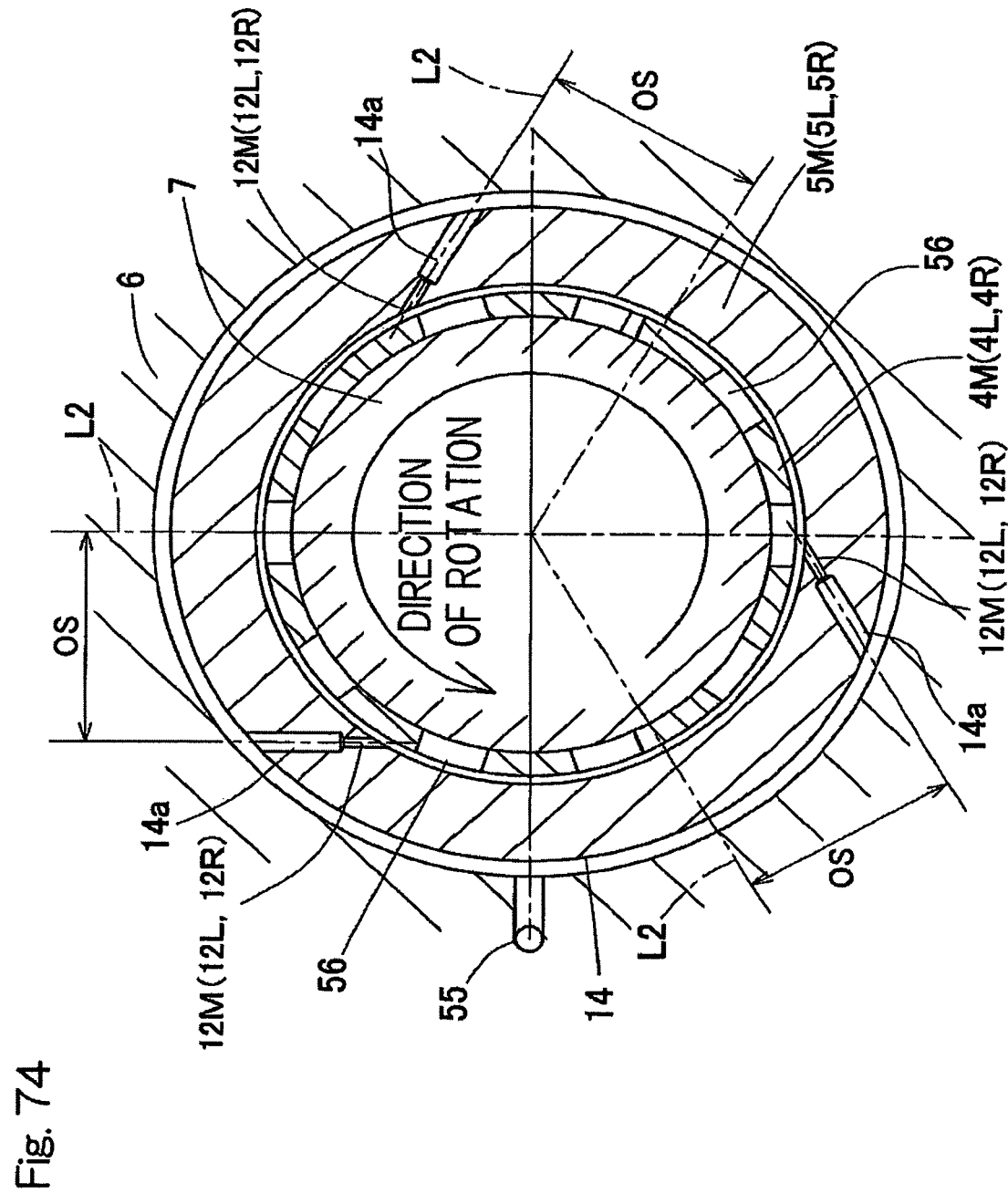
FIG. 74 is a longitudinal sectional view showing the main shaft device sectioned in a plan perpendicular to an axial direction thereof.

72A and 72B to FIG. 74, the radial gap δ (best shown in FIG. 72B) is provided between the inner peripheral surface of each of the outer ring spacers 4L, 4M and 4R and the associated inner ring spacer 5L, 5M or 5R, and a cooling air discharge port 12L, 12M and 12R for discharging the cooling air A towards the outer peripheral surface of the corresponding inner ring spacer 5L, 5M and 5R is provided in the inner peripheral surface of each of the outer ring spacer 4L, 4M and 4R. Those cooling air discharge ports 12L, 12M and 12R are provided at, for example, a plurality of sites in equidistantly spaced relation to each other. It is however to be noted that each of the cooling air discharge port 12L, 12M and 12R may be one for each of the outer ring spacers 4L, 4M and 4R.

In the case of this embodiment of the present invention, as shown in FIG. 74, each of the cooling air discharge ports 12L, 12M and 12R has its air discharging direction inclined forwardly with respect to the direction L1 of rotation of the inner ring 3 and the main shaft 7. In other words, each of the cooling air discharge ports 12L, 12M and 12R is of a straight shape as is the case with that in the previously described embodiment of the present invention and is held at a position offset (the offset amount OS) from the straight line L2, which extends in an arbitrary radial direction in the section transverse to the axis of each of the outer ring spacer 4L, 4M, 4R, in a direction perpendicular to the straight line L2. Also, each of the inner ring spacers 5L, 5M, 5R is provided with a plurality of circumferentially equidistantly spaced holes 56, which extend in the radial direction, at the same positions as those of the cooling air discharge ports 12L, 12M and 12R.

The outer peripheral surface of each of the outer ring spacers 4L, 4M and 4R is provided with an annular outer introducing port 14 defined therein for introducing the cooling air A. This outer introducing port 14 is provided at an axially intermediate portion of the outer peripheral surface of the respective outer ring spacer 4L, 4M and 4R, and is communicated with the associated cooling air discharge port 12L, 12M and 12R through a connecting hole 14a that extends in the same direction as that of the cooling air discharge port 12L, 12M and 12R. By the cooling air supply device 55 such as, for example, a blower disposed in the outside of the bearing device J, the cooling air A is supplied to the outer introducing port 14 through the cooling air introducing hole 17A and 17B provided in the housing 6. More specifically, the compressed air is supplied by the cooling air introducing hole 17A to the cooling air discharge port 12M provided in the intermediate outer ring spacer 4M, and the compressed air is supplied by the two cooling air introducing holes 17B to the cooling air discharge ports 12L and 12R that are provided in the left and right outer ring spacers 4L and 4R.

In the case of this embodiment, the cooling air discharge ports 12L, 12M and 12R have the same diameters, but the respective flows of the cooling air A fed from the cooling air supply device 55 to the cooling air introducing holes 17A and 17B are differentiated relative to each other, so that the flow rate of the cooling air A discharged from the cooling air discharge port 12M provided in the intermediate outer ring spacer 4M may be larger than the flow rate of the cooling air A discharged from the cooling air discharge ports 12L and 12R provided respectively in the outer ring spacers 4L and 4M on both sides. The flow control of the cooling air A to be fed from the cooling air supply device 55 is carried out by means of, for example, a flow control valve or the like. By way of example, assuming that the flow rate of the cooling air A discharged from the cooling air discharge port 12M is "100", the flow rate of the cooling air A discharged from each of the cooling air discharge ports 12L and 12R is rendered to be "50".

In other words, with respect to the two outer ring spacers 4M and 4R (4M and 4R) which adjoin to each other through the rolling bearing 1B (1C) and through which an air oil AO is supplied from one outer ring spacer 4M to the intermediate rolling bearing 1B (1C), the flow rate of the cooling air discharged from the cooling air discharge port 12M of the outer ring spacer 4M positioned upstream of the direction of flow rate of the air oil AO supplied to the intermediate rolling bearing 1B (1C) is made larger than the flow of the cooling air A discharged from the cooling air discharge port 12L (12R) of the outer ring spacer 4L (4R) positioned downstream thereof. The reason therefor will be discussed in detail later.

Each of the outer ring spacers 4L, 4M and 4L has axially opposed end surfaces each provided with an outlet port 58 for the cooling air A, which port 58 is in the form of a cutout. With the outer ring 2 of each of the rolling bearings 1A, 1B, 1C and 1D disposed in adjoining relation to the outer ring spacers 4L, 4M and 4R, the cutout referred to above forms the outlet port 58 that communicates a space between the outer ring spacers 4L, 4M and 4R and the inner ring spacers 5L, 5M and 5R with the outside of the bearing device J. The housing 6 is provided with an outlet hole 60, and this outlet hole 60 is communicated with the outlet port 58 of each of the outer ring spacer 4L, 4M and 4R through a connecting hole 59.

In the next place, the lubricating structure for the bearing device J will be described. This bearing device j is lubricated by means of a mixture of oil with air such as, for example, an air oil which transports a liquefied oil by air. In place of the air oil, it may be an oil mist which transports an atomized oil by means of the air.

Figure 73:
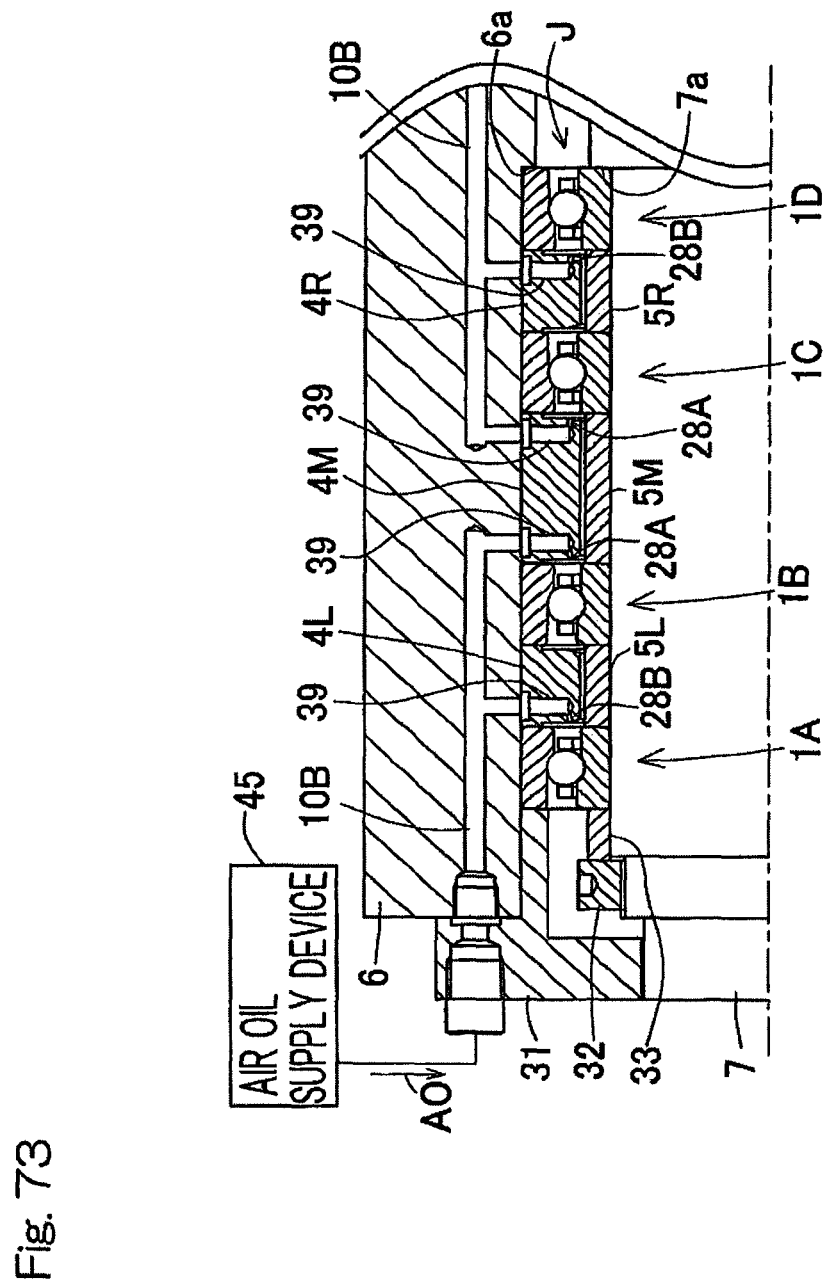
FIG. 73 is a diagram showing an upper half of the sectional view of the main shaft device taken along the section different from that shown in FIG. 72A.

As shown in FIG. 73, oil supply ports 28A and 28B for supplying the air oil AO into bearing spaces of the rolling bearings 1A, 1B, 1C and 1D are provided in the end surface of the outer ring spacers 4L, 4M and 4R. More specifically, the intermediate outer ring spacer 4M has its opposite end surfaces formed with a first oil supply port 28A for supplying the air oil AO to each of the rolling bearings 1B and 1C on both sides. On the other hand, the outer ring spacers 5L and 5R on both sides have one of the opposite end surfaces thereof provided with respective second oil supply ports 28B for supplying the air oil AO to the neighboring rolling bearings 1A and 1D, that is, an end rolling bearing 1A or 1D.

Each of the outer ring spacer 4L, 4M and 4R is provided with an oil introducing hole 39 communicated with the oil supply ports 28A and 28B. The oil introducing port 39 is formed in a predetermined depth radially inwardly from the outer peripheral surface of each of the outer ring spacer 4L, 4M and 4R, and is communicated with the oil supply ports 28A and 28B at the neighborhood of the hole bottom. Each of the oil supply ports 28A and 28B is formed to represents a throughhole shape inclined so that it extends from the oil introducing hole 39 to an inner diametric side in a direction towards the rolling bearing 1A, 1B, 1C and 1D. By the air oil supply device 45 provided in the outside of the bearing device J, the air oil AO is supplied to the oil introducing hole 39 through the air oil supply hole 10B provided in the housing 6.

Figure 72B:
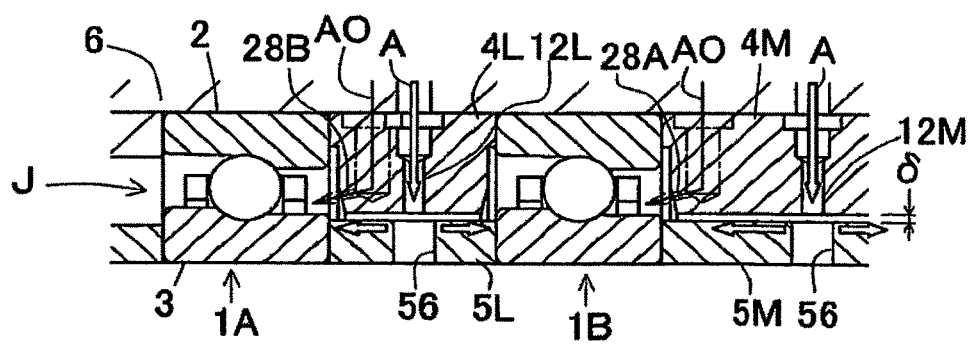
FIG. 72B is a fragmentary enlarged diagram of FIG. 72A.

In this bearing device J, during the operation or the like, the cooling air A fed from the cooling air supply device 45 in the manner as indicated by the arrow A in the fragmentary enlarged view of FIG. 72B is discharged from the cooling air discharge ports 12L and 12M of the outer ring spacers 4L, 4M towards the outer peripheral surface of the inner ring spacer 5L and 5M. Accordingly, the inner ring spacers 5L and 5M are cooled and the main shaft 7 is subsequently cooled by the cooled inner ring spacers 5L and 5M. Also, since the hole 56 is provided at the same axial position as that of the cooling air discharge ports 12L and 12M is provided in the inner ring spacers 5L and 5M, the cooling air A discharged from the cooling air discharge ports 12L and 12M can impinge upon the main shaft 7 after having flowed through the hole 56 to thereby efficiently cool the main shaft 7. Since the air discharging direction of each of the cooling air discharge ports 12L and 12M is inclined forwardly with respect to the direction L1 of rotation of the inner ring 3 and the main shaft 7, the injecting force of the cooling air A can be applied to the inner ring spacers 5L and 5M at the time the cooling air A impinges on the outer peripheral surface of the inner ring spacer 5L and 5M and a wall surface of the hole 56 and, therefore, an assist to drive the main shaft 7 can be expected.

A greater part of the cooling air A discharged from the cooling air discharge ports 12L, 12M and 12R are discharged from the outlet port 58 of the outer ring spacers 4L, 4M and 4R, where the cooling air discharge ports 12L, 12M and 12R are provided, to the outside of the main shaft device J through the connecting hole 59 and the outlet hole 60. Since the flow rate of the cooling air A discharged from the cooling air discharge port 12M provided in the intermediate outer ring spacer 4M is made greater than the flow rate of the cooling air A discharged from the cooling air discharge ports 12L and 12R provided in the outer ring spacers 4L and 4M on both sides, the pressure inside a space delimited between the intermediate outer ring spacer 4M and the inner ring spacer 5M is higher than the pressure inside a space delimited between the outside outer ring spacer 4L (4R) and the inner ring spacer 5L (5R). For this reason, a portion of the cooling air A discharged from the cooling air discharge port 12M flows through the bearing space of the rolling bearing 1B (1C) on both sides and then into the space between the outside outer ring spacer 4L (4R) an the inner ring spacer 5L (5R), but no cooling air A flows from the space between the outside outer ring spacer 4L (4R) and the inner ring spacer 5L (5R) to the space between the intermediate outer ring spacer 4M and the inner ring spacer 5M.

Also, during the operation or the like of the bearing device J, as shown by arrow AO, the air oil AO fed from the air oil supply device 45 is supplied from the first oil supply port 28A to the bearing space of the intermediate rolling bearing 1B (1C), and from the second oil supply port 28B to the bearing space of the rolling bearing 1A (1D) on both ends. As hereinbefore described, the pressure between the outer ring spacer 4L, 4M and 4R and the inner ring spacer 5L, 5M and 5R is such that the pressure on the intermediate side is higher than the pressure on the outside. In other words, a pressure gradient of the cooling air A is established from an upstream side to a downstream side with respect to the direction of flow of the air oil AO. Accordingly, in the intermediate rolling bearing 1B (1C), the cooling air A does not flow counter to the flow of the air of the air oil AO For this reason, the air of the air oil AO flows smoothly and the oil can be favorably supplied to each of the rolling bearings 1A, 1B, 1C and 1D.

Figure 75:
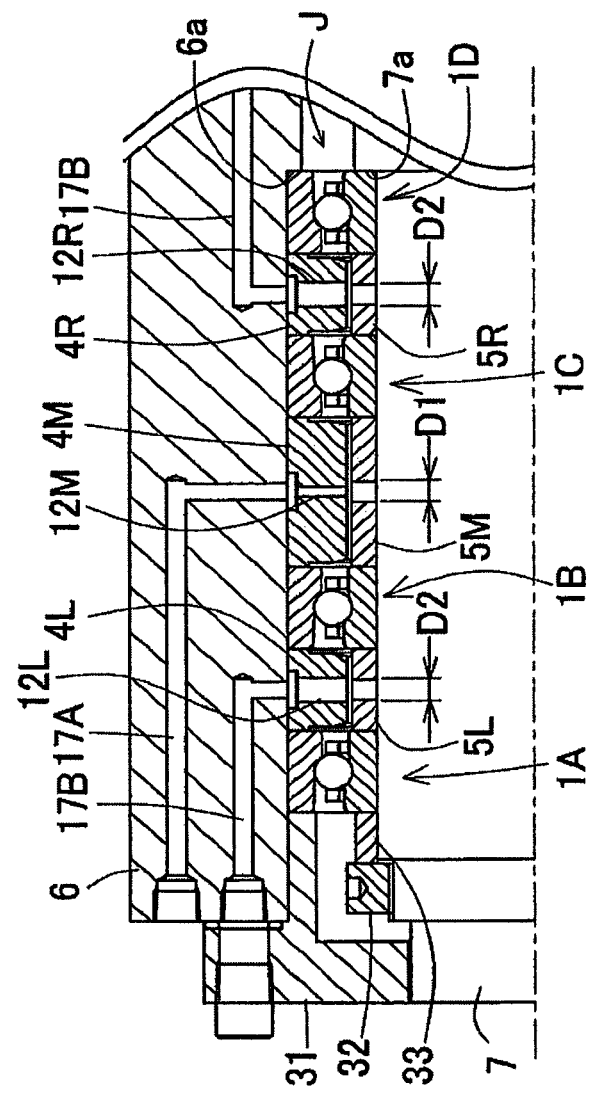
FIG. 75 is a diagram showing an upper half of the longitudinal sectional view of the main shaft device in which the bearing device equipped with the cooling structure designed in accordance with a twenty sixth preferred embodiment of the present invention is incorporated.

FIG. 75 illustrates a twenty sixth preferred embodiment of the present invention. The cooling structure for this bearing device J differs from the previously described twenty fifth embodiment of the present invention in that, in respect of the two neighboring outer ring spacers 4M and 4L (4M and 4R), the diameter D2 of the cooling air discharge port 12L (12R) of the outer ring spacer 4L (4R) positioned on the downstream side with respect to the direction of flow of the air oil AO supplied to the intermediate rolling bearing 1B (1C) is made larger than the diameter D1 of the cooling air discharge port 12M of the outer ring spacer 4M positioned on the upstream side with respect to the direction of flow of such air oil AO. Respective flow rate of the cooling air A supplied from the cooling air supply device (not shown) and discharged from the cooling air discharge ports 12L, 12M and 12R remain the same. Others are of a structure similar to those shown and described in connection with the previously described twenty fifth embodiment of the present invention.

In the case of this construction, since the respective diameters D1 and D2 of the cooling air discharge ports 12M, 12L (12R) are so defined as discussed above, the pressure inside the space between the outer ring spacer 4L (4R) and the inner ring spacer 5L (5R), positioned on the downstream side, becomes lower than the pressure inside the space between the outer ring spacer 4M and the inner ring spacer 5M, positioned on the upstream side. Accordingly, from the upstream side towards the downstream side with respect to the direction of flow of the air oil AO, the pressure gradient of the cooling air A establishes and, hence, it is possible to avoid the counter flow of the cooling air A in the intermediate rolling bearing 1B (1C).

Figure 76:
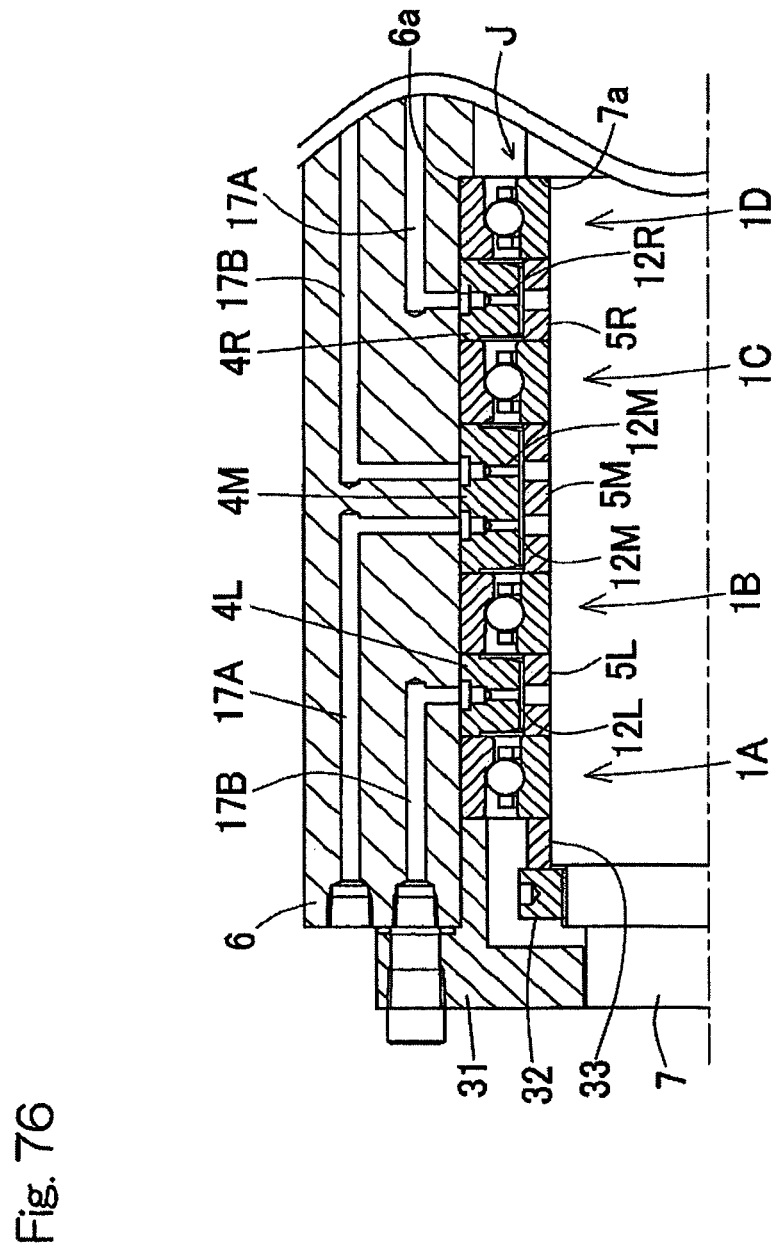
FIG. 76 is a diagram showing an upper half of the longitudinal sectional view of the main shaft device in which the bearing device equipped with the cooling structure designed in accordance with a twenty seventh preferred embodiment of the present invention is incorporated.

FIG. 76 illustrates a twenty seventh preferred embodiment of the present invention. The cooling structure for this bearing device J differs from that according to the previously described twenty fifth embodiment in respect of the two cooling air discharge ports 12M provided in the intermediate outer ring spacer 4M. In other words, with respect to the two neighboring outer ring spacers 4M and 4L (4M and 4R), the number of the cooling air discharge port 12M of the outer ring spacer 4M positioned on the upstream side of the direction of flow of the mixture of the air oil AO supplied to the intermediate rolling bearing 1B (1C) is so chosen to be larger than the number of the cooling air discharge port 12L (12R) of the outer ring spacer 4L (4R) positioned on the downstream side thereof. The respective flow rate of the cooling air A supplied from the cooling air supply device (not shown) and discharged from the cooling air discharge ports 12L, 12M and 12R remain the same. Others are of a structure similar to shown and described in connection with the previously described twenty fifth embodiment of the present invention.

In this case, because of the two cooling air discharge ports 12M provided in the intermediate outer ring spacer 4M, the flow rate of the cooling air A discharged from the cooling air discharge port 12M of the outer ring spacer 4M positioned on the upstream side becomes larger than the flow rate of the cooling air A discharged from the cooling air discharge port 12L (12R) of the outer ring spacer 4L (4R) positioned on the downstream side. Accordingly, the pressure gradient of the cooling air A from the upstream side to the downstream side with respect to the direction of flow of the air oil AO establishes and it is possible to avoid the counter flow of the cooling air A in the intermediate rolling bearing 1B (1C).

Figure 77:
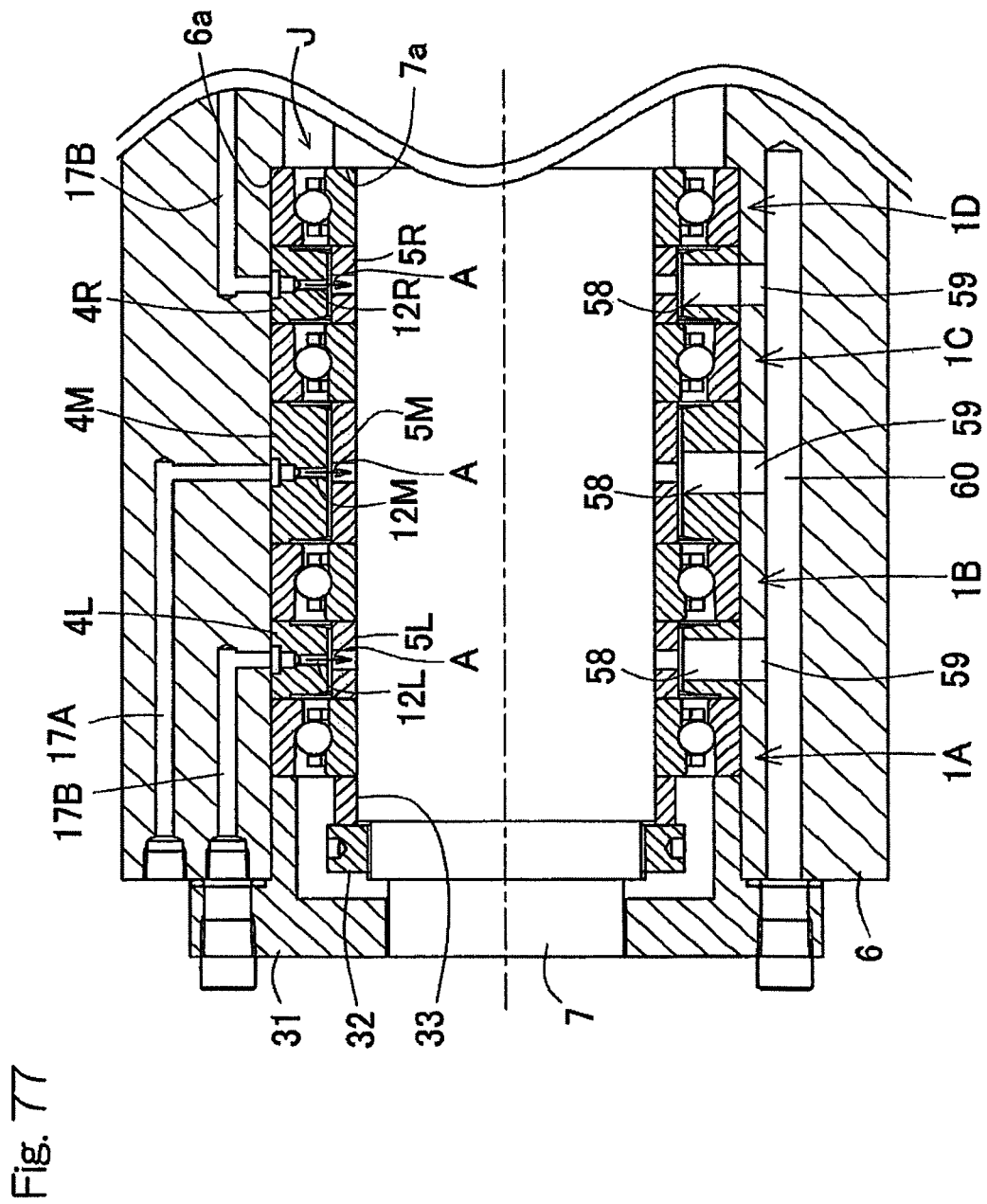
FIG. 77 is a longitudinal sectional view showing the main shaft device, in which the bearing device equipped with the cooling structure designed in accordance with a twenty eighth preferred embodiment of the present invention is incorporated.

FIG. 77 illustrates a twenty eighth preferred embodiment of the present invention. The cooling structure for this bearing device j is such that in each of the outer ring spacers 4L, 4M and 4R, the outlet port 58 for the cooling air A and the air of the air oil AO is provided at the same axial positions as the cooling air discharge ports 12L, 12M and 12R. Accordingly, the connecting hole 59 is, also, rendered at the same axial position as the outlet port 58. With the outlet port 58 so positioned as described above, the cooling air A discharged from the cooling air discharge ports 12L, 12M and 12R is spread in the circumferential direction in the space between the outer ring spacers 4L, 4M and 4R and the inner ring spacers 5L, 5M and 5R, but the flow in the axial direction becomes difficult. For this reason, the flow of the cooling air A in a direction counter to the flow of the air oil AO flowing within the intermediate rolling bearing 1B (1C) occurs hardly.

Figure 78:
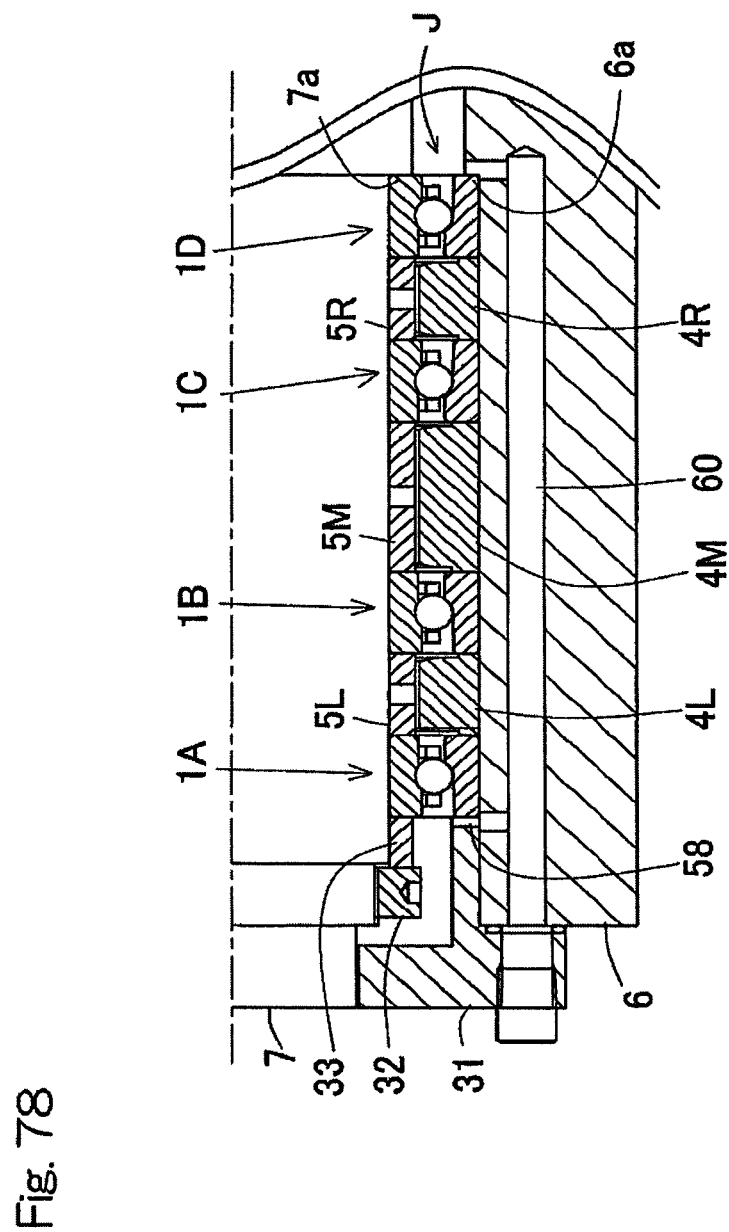
FIG. 78 is a diagram showing a lower half of the longitudinal sectional view of the main shaft device in which the bearing device equipped with the cooling structure designed in accordance with a twenty ninth preferred embodiment of the present invention, is incorporated.
Figure 79:
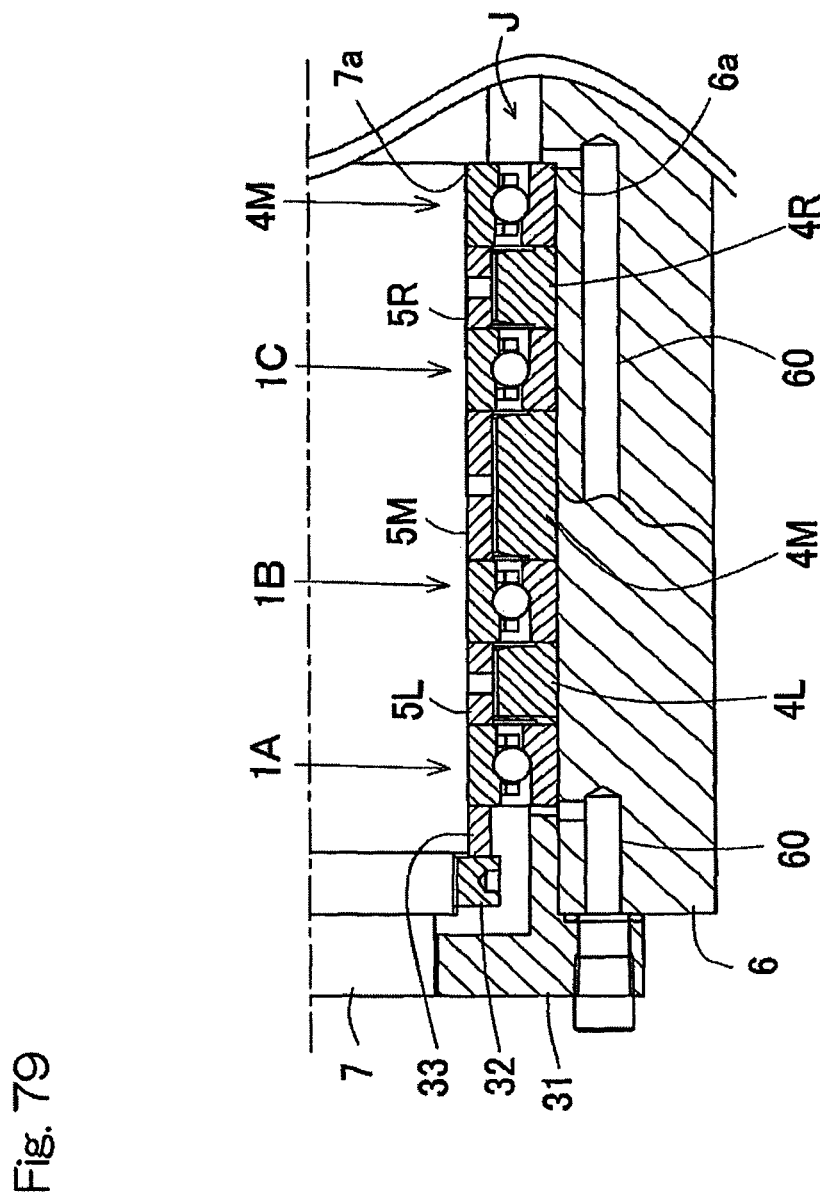
FIG. 79 is a diagram showing a lower half of the longitudinal sectional view of the main shaft device in which the bearing device equipped with the cooling structure designed in accordance with a thirtieth preferred embodiment of the present invention, is incorporated.
Figure 80:
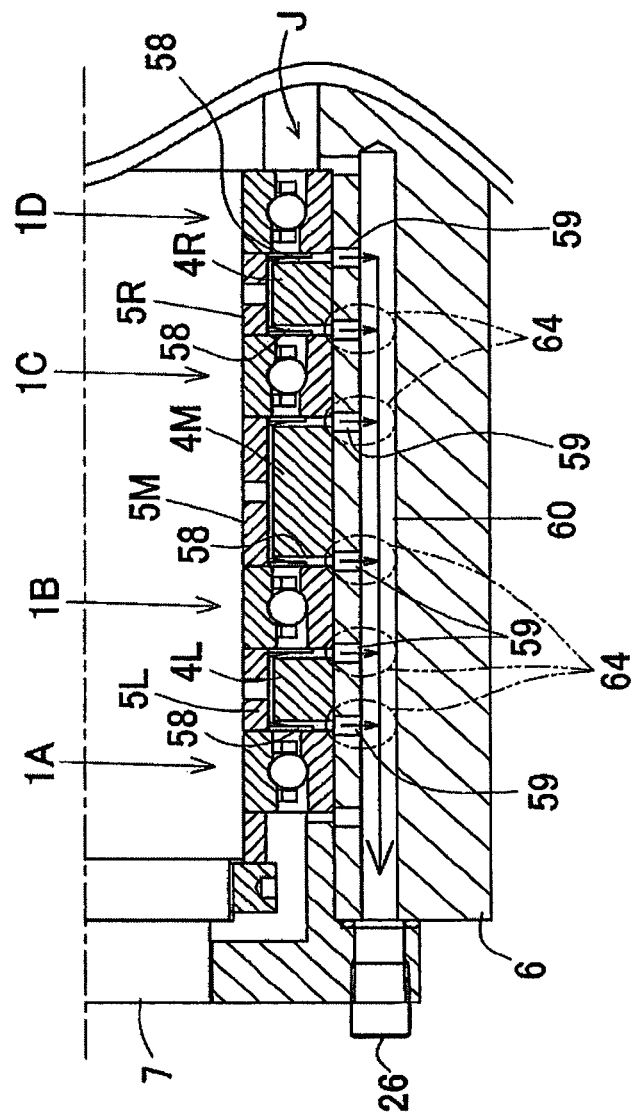
FIG. 80 is an explanatory diagram used to explain a problem associated with an air discharge path.
Figure 81:
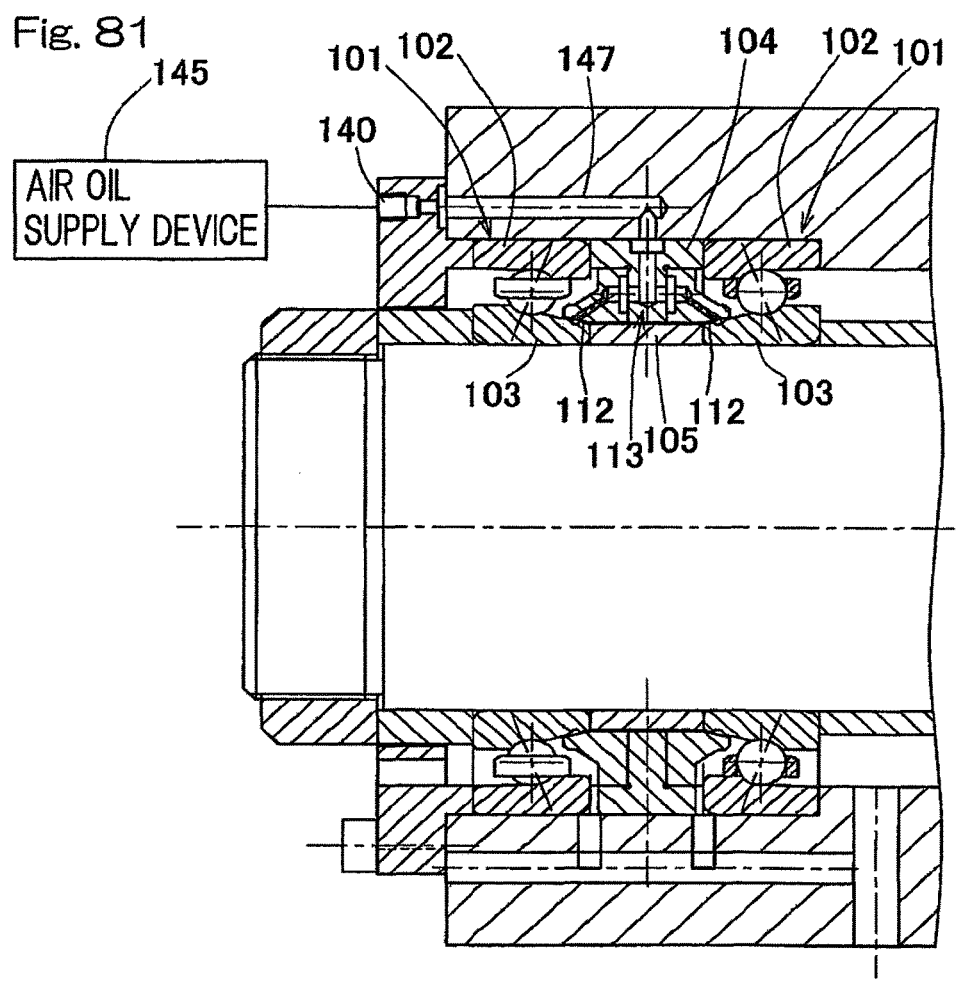
FIG. 81 is a longitudinal sectional view showing the bearing device equipped with a lubricating structure designed in accordance with the previously discussed suggested example 1.
Figure 82:
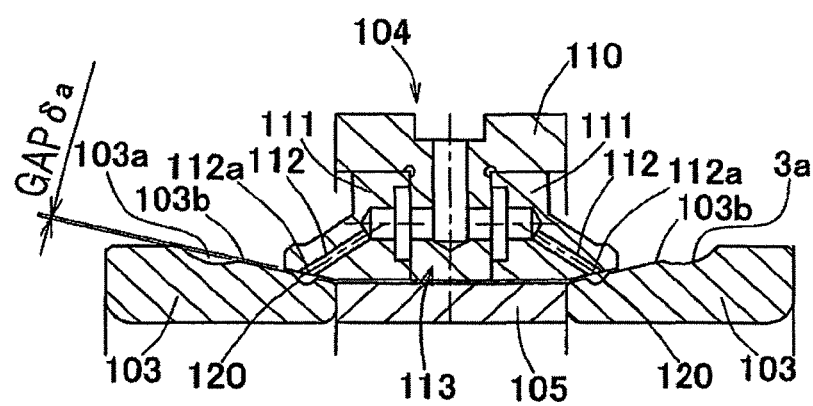
FIG. 82 is an enlarged diagram showing a portion of FIG. 81.

FIGS. 78 and 79 illustrate twenty ninth and thirtieth preferred embodiments of the present invention, respectively, in which the outlet path for the cooling air A and the air of the air oil AO (the both are hereinafter referred to as "air" collectively) employed therein is differentiated from that employed in the practice of the previously described twenty fifth embodiment of the present invention. As shown in FIG. 80, although the air is discharged from the outlet port 58 of each of the outer ring spacers 4L, 4M and 4R, such a factors as, for example, the pressure balance of each outlet port 58 affects the discharge of the air and, therefore, it is not known exactly which outlet port 58 the air is easily discharged. In general, there is a tendency that discharge takes place easily through the outlet port 58 proximate to an atmosphere open port and no smooth discharge takes place from the outlet port 58 that is remote from it. Also, at a site where the outlet hole 60 intersects the connecting hoe 59, the air flowing through those holes 59 and 60 collides with each other and, therefore, the air does not flow smoothly. Then, the air discharge capability from the outlet port 58 becomes worse and, therefore, there is the possibility that the oil of the air oil AO stagnates enough to induce, for example, seizure.

In the cooling structure for the bearing device J pertaining to a twenty ninth preferred embodiment of the present invention shown in FIG. 78, the outlet port 58 which is provided in each of the outer ring spacers 4L, 4M and 4R in the previously described twenty fifth embodiment is dispensed with, but the outlet port 58 is provided only at one site which will become a downstream side end of the flow direction of the air oil AO. Accordingly, the site, at which the air flowing through the outlet hole 60 and the air flowing from the outlet port 58 to the outlet hole 60 collide against with each other, is reduced and, hence, the flow of the air oil AO within the bearing space of the rolling bearings 1A, 1B, 1C and 1D becomes good.

Also, in the cooling structure for the bearing device J pertaining to a thirtieth preferred embodiment of the present invention shown in FIG. 79, the outlet port 58 is provided at only one site which will become a downstream side end of the flow direction of the air oil AO, and also the outlet hole 60 fluid connected with this outlet port 58 is provided for each of the outlet ports 58. Accordingly, the site at which the air flowing through the outlet hole 60 and the air flowing from the outlet port 58 to the outlet hole 60 collide against with each other, is completely eliminated and, hence, the flow of the air oil AO within the bearing space of the rolling bearings 1A, 1B, 1C and 1D becomes further good.

The cooling structure for the bearing device of the present invention has a high effect of cooling the bearing device and the main shaft 7, and can favorably supply the lubricant oil to each of the rolling bearings 1, 1A, 1B, 1C and 1D as hereinbefore fully discussed in connection with each of the foregoing embodiments of the present invention. Accordingly, it becomes possible to allow the main shaft device to be operated at a region of high speed. For this reason, this bearing device can be suitably used to support the main shaft of the machine tool.

Although each the foregoing embodiments of the present invention can be constructed standalone, the concurrent use of those embodiments of the present invention results in the increase of the cooling effect. Also, this cooling structure and the cooling method can be equally applied to, for example, a tapered roller bearing or the like which utilizes a spacer for positioning the bearing, beside the angular contact ball bearing and the cylindrical roller bearing. The cooling structure and cooling method for the bearing device can also be applied to the machine tool device and a turbo machine device.

Hereinafter, the cooling structure for the bearing device pertaining to some variants of the present invention will be described with the aid of FIGS. 35 to 37, FIG. 18, FIGS. 69 to 71 and FIG. 3.

At the outset, in Variant 1, the bearing device J shown in and described with reference to FIGS. 35 to 37 is used in, for example, supporting the main shaft of the machine tool and, in such case, as shown in FIG. 3, the outer ring 2 of each of the rolling bearings 1 is fixed with the housing 6 and the inner ring 3 thereof is mounted on the outer peripheral surface of the main shaft 7.

In FIG. 35, the radial gap $\delta a$ is provided between the inner peripheral surface of the outer ring spacer 4 and the outer peripheral surface of the inner ring spacer 5, and the nozzle 12A which defines a supply port for supplying therethrough the compressed air A for cooling purpose towards the outer peripheral surface of the inner ring spacer 5 is provided in the inner peripheral surface of the outer ring spacer 4. In this variant, as shown in FIG. 18, the number of the nozzle 12A is chosen to be three and those nozzles 12A are equidistantly disposed in the circumferential direction.

As shown in FIGS. 35 and 37, the outer peripheral surface of the outer ring spacer 4 is provided with the outer introducing port 14 which is an annular introducing groove for introducing the compressed air A. This outer introducing port 14 is provided at the axially intermediate portion of the outer peripheral surface of the outer ring spacer 4 and is communicated with each of the nozzles 12A through the connecting hole 14a. By the compressed air supply device (not shown) provided in the outside of the bearing device J, the compressed air A is supplied to the outer introducing port 14 through the compressed air introducing hole 68 provided in the housing 6.

As shown in FIG. 35, the axially opposite ends of the inner ring spacer 5 are rendered to form a barrier wall 37 that protrudes towards the outer diametric side. In this variant 1, the barrier wall 37 is of a tapered shape having a larger amount of protrusion towards the outer diametric side towards the rolling bearing 1 in the axial direction. Also, the axial end surface of the outer ring spacer 4 is provided with the cutout 18 which forms the outlet port for the compressed air A that is supplied from the nozzle 12A. The cutout 18 is of a sectional shape such as, for example, a rectangle shown in FIG. 37 and, with the outer ring 2 of the rolling bearing 1 positioned in the neighborhood of the outer ring spacer 4, the cutout 18 comes to represent an open shape communicating the spacer space S2, delimited between the outer ring spacer 4 and the inner ring spacer 5, with the outside of the bearing device J. It is to be noted that in this construction, in order to enable the assemblage of the outer ring spacer 4 (in order to avoid the interference between the inner periphery of the outer ring spacer 4 and the barrier wall 37), the inner ring spacer 5 is made of, for example, two split inner ring spacer components that has an axially intermediate portion split.

As shown in FIG. 36 which is a fragmentary enlarged view of FIG. 35, even in this Variant 1, the bearing space S1 and the spacer space S2 are separated from each other by the labyrinth seal area 39.

In this bearing device J, the compressed air A for cooling purpose which is supplied from the compressed air supply device, provided in the outside of the bearing device J, during the operation or the like is supplied from the nozzle 12A of the outer ring spacer 4 towards the outer peripheral surface of the inner ring spacer 5. This compressed air, after having impinged upon the inner ring spacer 5, flows towards the axially opposite sides along the outer peripheral surface of the inner ring spacer 5, then guided towards the outer diametric side along the tapered outer diametric surface of the barrier wall 37 of the inner ring spacer 5 and is finally discharged from the cutout 18 of the outer ring spacer 4. With the compressed air A guided towards the outer diametric side by the barrier wall 37, the flow of the compressed air A within the spacer space S2 and the discharge of the compressed air A from the spacer space S2 take place smoothly. During the passage of the compressed air A through the spacer space S2, heats evolved in the bearing device J and the main shaft 7 supported by this bearing device J are absorbed. Accordingly, the bearing deice J and the main shaft 7 can be efficiently cooled.

Considering that the barrier wall 37 is provided in the axially opposite ends of the inner ring spacer 5, the flow of the compressed air A into the bearing space S1 is inhibited. Particularly in this variant 1, since the bearing space S1 and the spacer space S2 are separated from each other by the labyrinth seal area 39, the flow of the compressed air A into the bearing space S1 can be further effectively prevented. Also, since the compressed air A smoothly flows in the spacer space S2, the internal pressure inside the spacer space S2 is held lower than the internal pressure inside the bearing space S1 and, therefore, the compressed air A does hardly flow into the bearing space S1. In view of this, the flow of the compressed air A into the bearing space S1 can be suppressed as much as possible, and the grease filled in the bearing space S1 is therefore prevented from being removed by the compressed air A. For this reason, a good lubricating state can be maintained.

In the above described Variant, the nozzle 12A and the cutout 18 are disposed at the same circumferential position, but as shown in FIGS. 69 and 70, in Variant 2 and Variant 3, the nozzle 12A and the cutout 18 may be disposed at respective circumferential positions displaced from each other. If the nozzle 12A and the cutout 18 have their circumferential positions so displaced from each other, the compressed air A supplied form the nozzle 12A to the spacer space S2, during its flow along the outer peripheral surface of the inner ring spacer 5 to the cutout 18, accompanies the movement towards the axial outer side as well as the movement in the circumferential direction and, therefore, the length of time of contact of the compressed air A with the inner ring spacer 5 can be increased enough to increase the effect of cooling the bearing device J and the main shaft 7.

Also, where the direction of rotation of the shaft supported by the bearing device J is fixed such as exhibited by the main shaft 7 of the machine tool, as shown in FIG. 3 which is here quoted, the air discharge direction of each of the nozzles 12 (12A) may be inclined forwardly with respect to the direction L1 of rotation of the inner ring 3 (shown in FIG. 35 that is quoted here) and the main shaft 7. Each of the nozzles 12 (12A) is of a straight shape and is held at the position offset (the offset amount OS) from the straight line L2, which extends in an arbitrary radial direction in the section perpendicular to the axis of the outer ring spacer 4, in the direction perpendicular to such straight line L2. As discussed above, if each of the nozzles 12 (12A) is inclined, at the time the compressed air A discharged impinges upon the outer peripheral surface of the inner ring spacer 5, a pressing force of the compressed air A can be applied to the inner ring spacer 5 and, hence, the function to drive the main shaft 7 can be expected.

Even the bearing device J, pertaining to each of those Variants 1 to 3, is used having been incorporated in the main shaft device of the machine tool as a part thereof. The description of such structure and function is dispensed with.

The cooling structure for this bearing device J has a high cooling effect in cooling the bearing device 1 and the main shaft 7 as hereinbefore described and, therefore, it is possible to operate the main shaft device in a high speed region. For this reason, this bearing device J can be suitably used in supporting the main shaft of the machine tool.

The foregoing Variants 1 to 3 include the following modes.

[Mode 1]

The cooling structure for the bearing device J according to this mode is a cooling structure for a bearing device J in which an outer ring spacer 4 is interposed between outer rings 2 and 2 of a plurality of axially juxtaposed rolling bearings and an inner ring spacer 5 is interposed between inner rings 3 and 3 of such rolling bearings, the outer rings 2 and the outer ring spacer 4 being disposed in a housing whereas the inner ring 3 and the inner ring spacer 5 are mounted on a main shaft 7, such rolling bearings being lubricated with a grease filled in a bearing space delimited between the outer ring 2 and the inner ring 3, in which: an inner peripheral surface of the outer ring spacer 4 is provided with a nozzle 12A, which serves as a supply port for supplying a compressed air for cooling purpose towards an outer peripheral surface of the inner ring spacer 5, and a barrier wall 37 is provided in axially opposite end portions of the inner ring spacer 5 so as to protrude towards an outer diametric side so that the compressed air supplied from the nozzle 12A can be inhibited from flowing into the bearing space.

According to this mode 1, by the nozzle 12A provided in the outer ring spacer 4, the compressed air A for cooling purpose is supplied towards the outer peripheral surface of the inner ring spacer 5, and the compressed air impinging upon the inner ring spacer 5 absorbs heats evolved in the bearing device J and the main shaft 7 supported by this bearing device J. Accordingly, the bearing device and the main shaft 7 can be efficiently cooled. Since the barrier 37 is provided at the axially opposite end portions of the inner ring spacer 5 to habit the flow of the compressed air A into the bearing space, removal of the grease, filled within the bearing space, by the compressed air A is prevented. For this reason, it is possible to maintain a good lubricating state.

[Mode 2]

In the cooling structure as defined in Mode 1 above, the barrier wall 37 has an outer diametric surface of a tapered shape having a large amount of protrusion towards the outer diametric side in the axial direction, and the outer ring spacer 4 has an axial end surface provided with the cutout 18 which will become an outlet port for the compressed air A that is supplied from the nozzle 12A. According to this mode 2, the compressed air A supplied from the nozzle 12A flows through the spacer space, which is delimited between the inner ring spacer 5 and the outer ring spacer 4, towards an axial outside along the outer peripheral surface of the inner ring spacer 5 and is then guided towards the outer diametric side along the tapered outer diametric surface of the barrier wall 37 of the inner ring spacer 5 before being discharged from the cutout 18 provided in the axial end surface of the outer ring spacer 4. Accordingly, the flow of the compressed air A within the spacer space and the discharge of the compressed air A from the spacer space take place smoothly. Also, since the smooth flow of the compressed air A through the spacer space takes place, the internal pressure of the spacer space becomes lower than the internal pressure of the bearing space and, therefore, the flow of the compressed air A into the bearing space can be suppressed.

[Mode 3]

In the cooling structure for the bearing device as defined in Mode 2 above, the nozzle 12A and the cutout 18 have their circumferential positions displaced relative to each other. If the circumferential positions are displaced as described above, the compressed air A supplied from the nozzle 12A to the spacer space, when flowing to the cutout 18 along the outer peripheral surface of the inner ring spacer 5, accompanies the movement towards the axial outside as well as the movement in the circumferential direction and, therefore, the length of time of contact of the compressed air A with the inner ring spacer 5 is large enough to increase the effect of cooling the bearing device J and the main shaft 7.

[Mode 4]

In the cooling structure for the bearing device J as defined in any one of Modes 1 to 3 referred to above, the rolling bearing includes a sealing member 38 provided at the axial end of the outer ring 2 for sealing the bearing space, and the barrier wall 37 has an end surface which is so shaped as to confront the sealing member 38 through the gap, both of the sealing member 38 and the barrier wall 37 exhibiting a labyrinth seal effect. By so doing, the flow of the compressed air A into the bearing space can be further effectively prevented.

[Mode 5]

The cooling structure for the bearing device J as defined in any one of Modes 1 to 4 referred to above can be suitably used in supporting the main shaft of the machine tool. In such case, the cooling effect of the main shaft 7 is high and, therefore, it is possible to operate in a high speed region.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A bearing device having a plurality of axially juxtaposed rolling bearings, each of the rolling bearings having an inner ring mounted on a main shaft and an outer ring accommodated in a housing; an inner ring spacer interposed between the inner rings of the neighboring rolling bearings and mounted on the main shaft; an outer ring spacer interposed between the outer rings of the neighboring rolling bearings and accommodated in the housing; and a cooling structure, the cooling structure comprising:

a nozzle provided in the outer ring spacer and configured to supply a cooling fluid to the rolling bearings by blowing the cooling fluid to an outermost peripheral surface of the inner ring spacer, the cooling fluid including at least one of air and oil, wherein the nozzle has a discharge port side that is inclined forwardly with respect to a direction of rotation of the main shaft, the outermost peripheral surface of the inner ring spacer is V-shaped and continuous to guide the cooling fluid, discharged from the nozzle, towards the neighboring rolling bearings on both sides, and an innermost peripheral surface of the outer ring spacer has a constant diameter along an entire axial length of the outer ring spacer.

2. The bearing device as claimed in claim 1, wherein the outer peripheral surface of the inner ring spacer is inclined such that a minimum outer diameter of the outermost peripheral surface axially overlaps the nozzle such that the outer diameter increases towards the neighboring rolling bearings on both sides, and the outer diameter at axial ends of the outermost peripheral surface of the inner ring spacer is equal to or larger than the outer diameter of an inner ring spacer side end of the inner ring of the neighboring rolling bearings on both sides.

3. The bearing device as claimed in claim 1, wherein the cooling fluid is an air oil for transporting a liquefied oil by means of air or an oil mist for transporting an atomized oil by means of the air.

4. The bearing device as claimed in claim 1, wherein the outermost peripheral surface of the inner ring spacer has two inclined surfaces arranged in the V-shape, and each of the two inclined surfaces is continuously sloped.

5. A bearing device having: a plurality of axially juxtaposed rolling bearings, each of the rolling bearings having an inner ring mounted on a main shaft and an outer ring accommodated in a housing; an inner ring spacer interposed between the inner rings of the neighboring rolling bearings and mounted on the main shaft; an outer ring spacer interposed between the outer rings of the neighboring rolling bearings and accommodated in the housing, and a cooling structure, the cooling structure comprising:

a nozzle provided in the outer ring spacer and configured to supply a cooling fluid to the rolling bearings by blowing the cooling fluid to an outer peripheral surface of the inner ring, the cooling fluid including a compressed air, wherein the nozzle has a discharge port side that is inclined forwardly with respect to a direction of rotation of the main shaft, the nozzle for discharging the compressed air towards the outer peripheral surface of the inner ring spacer is provided in the outer ring spacer so as to incline forwardly with respect to the direction of the rotation, and a gap between the inner peripheral surface of the outer ring spacer, where the discharge port of the nozzle exists, and the outer peripheral surface of the inner ring spacer, that confronts the discharge port, is chosen to be equal to 0.7 mm or larger, but smaller than half the diameter of the nozzle.

* * * * *